(12) United States Patent
Hatanaka et al.

(10) Patent No.: US 11,283,914 B2
(45) Date of Patent: Mar. 22, 2022

(54) ELECTRONIC APPARATUS FOR COMMUNICATING WITH TARGET APPARATUS BASED ON INFORMATION ACQUIRED FROM THE TARGET APPARATUS

(71) Applicant: KYOCERA Corporation, Kyoto (JP)

(72) Inventors: Akihito Hatanaka, Yokohama (JP); Tomoki Iwaizumi, Osaka (JP); Youji Hamada, Kyoto (JP); Hisae Honma, Yokohama (JP); Kousuke Nagase, Yokohama (JP); Tomohiro Sudou, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 17/035,299

(22) Filed: Sep. 28, 2020

(65) Prior Publication Data
US 2021/0014351 A1    Jan. 14, 2021

Related U.S. Application Data

(63) Continuation of application No. PCT/JP2019/005385, filed on Feb. 14, 2019.

(30) Foreign Application Priority Data

Mar. 28, 2018    (JP) .............................. JP2018-062309

(51) Int. Cl.
*H04M 1/72412*    (2021.01)
*H04M 1/72415*    (2021.01)
*H04M 1/72454*    (2021.01)

(52) U.S. Cl.
CPC .... *H04M 1/72412* (2021.01); *H04M 1/72415* (2021.01); *H04M 1/72454* (2021.01)

(58) Field of Classification Search
CPC .......... H04M 1/72412; H04M 1/72415; H04M 1/72454
See application file for complete search history.

(56) References Cited

U.S. PATENT DOCUMENTS

| | | | |
|---|---|---|---|
| 2008/0058000 A1 | 3/2008 | Tanaka et al. | |
| 2013/0316746 A1* | 11/2013 | Miller ................... | H04W 4/12 455/466 |
| 2016/0050315 A1* | 2/2016 | Malhotra ............ | H04M 1/6075 455/414.1 |
| 2016/0191694 A1* | 6/2016 | Kim ....................... | H04M 1/56 455/418 |

(Continued)

FOREIGN PATENT DOCUMENTS

| CN | 10436569 | * | 2/2015 |
|---|---|---|---|
| CN | 104363569 A | | 2/2015 |

(Continued)

*Primary Examiner* — Ankur Jain
*Assistant Examiner* — Angelica M Perez
(74) *Attorney, Agent, or Firm* — Procopio Cory Hargreaves and Savitch LLP

(57) ABSTRACT

An electronic apparatus comprises a communication unit and a controller. The communication unit acquires first information regarding another side device. The controller performs first processing based on first information in response to a transmission instruction from a user regarding a first telephone communication with the another side device.

15 Claims, 54 Drawing Sheets

(56) References Cited

U.S. PATENT DOCUMENTS

2018/0027144 A1    1/2018  Yokoyama

FOREIGN PATENT DOCUMENTS

| | | | |
|---|---|---|---|
| JP | H07-250132 A | | 9/1995 |
| JP | 2001-119749 A | | 4/2001 |
| JP | 2006-211435 | * | 8/2006 |
| JP | 2006-211435 A | | 8/2006 |
| JP | 2008-061015 A | | 3/2008 |
| JP | 2008-252196 A | | 10/2008 |
| JP | 2013-192010 A | | 9/2013 |
| JP | 2016-042692 A | | 3/2016 |
| JP | 2018-014545 A | | 1/2018 |
| WO | 2013/124944 A1 | | 8/2013 |
| WO | 2019/187748 A1 | | 10/2019 |

* cited by examiner

F I G. 1
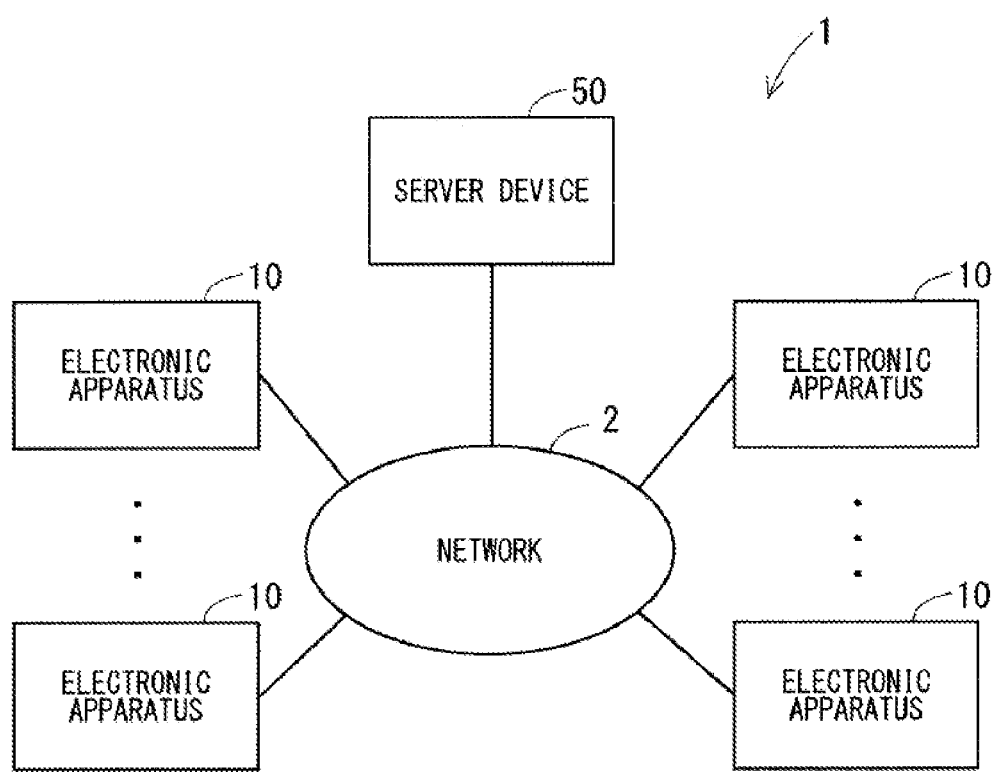

F I G. 9
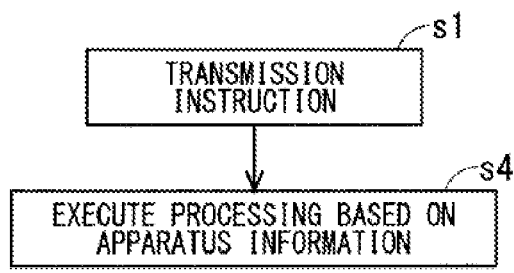

F I G. 18
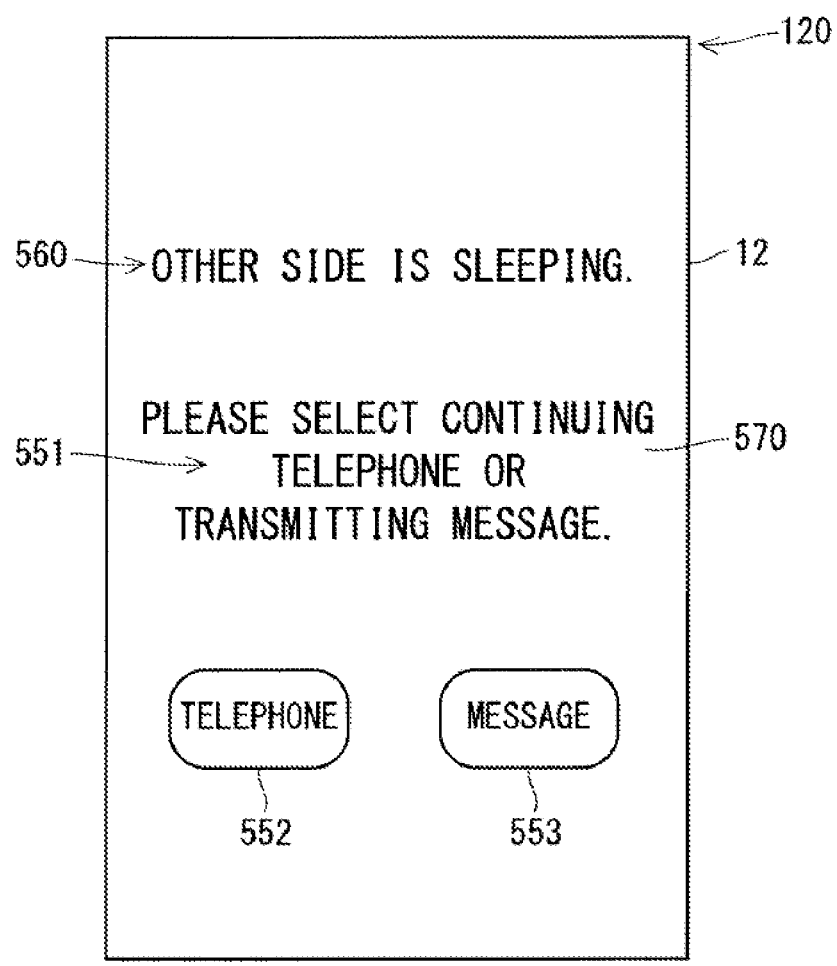

FIG. 20

601 → DATE MARCH 25, 2018

| PERIOD OF TIME | TEXT | DETAILED CONTENT |
|---|---|---|
| 9:00~11:00 | COMPANY MEETING | CONVERSATION ON NEW ITEM |
| 11:30~12:30 | FORM DATA | FORM DATA FOR PRESENTATION ON APRIL 10 |
| 15:30~17:30 | NEGOTIATION | MAKE SUGGESTION OF NEW SYSTEM TO ○○ COMPANY |
| 19:00~21:00 | FAREWELL PARTY | FAREWELL PARTY FOR □□ AT RESTAURANT △△ |

603 — 604 — 605

600

602 (602a), 602 (602b), 602 (602c), 602 (602d)

F I G. 3 0
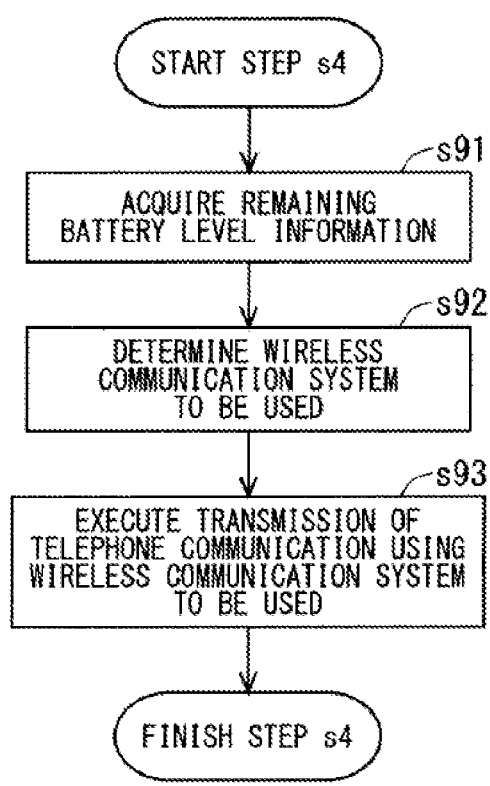

F I G. 3 6
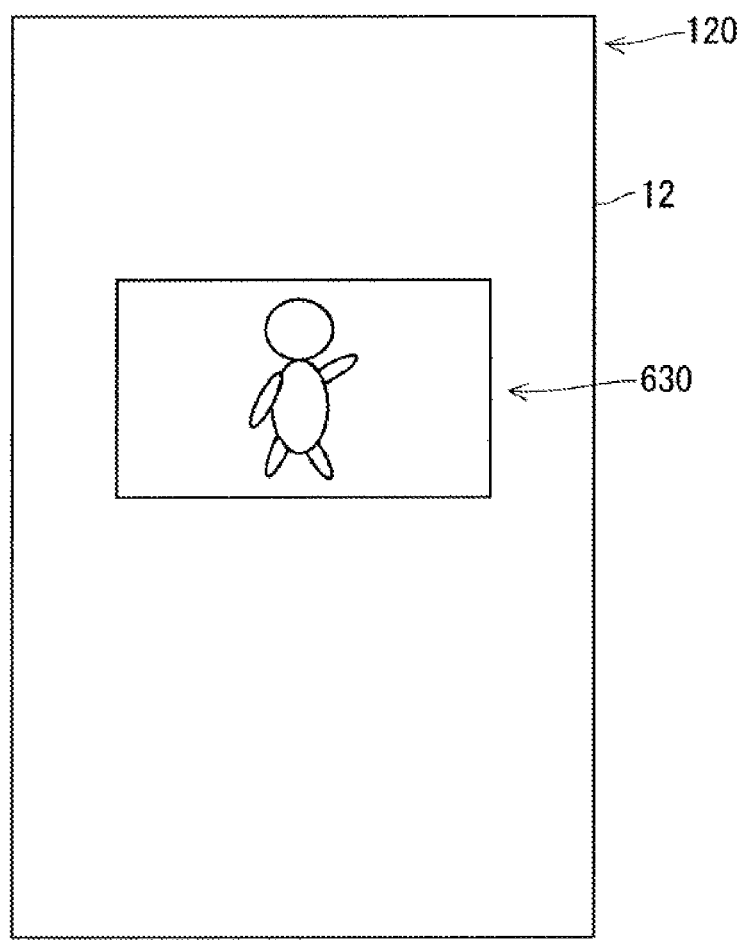

F I G. 3 7
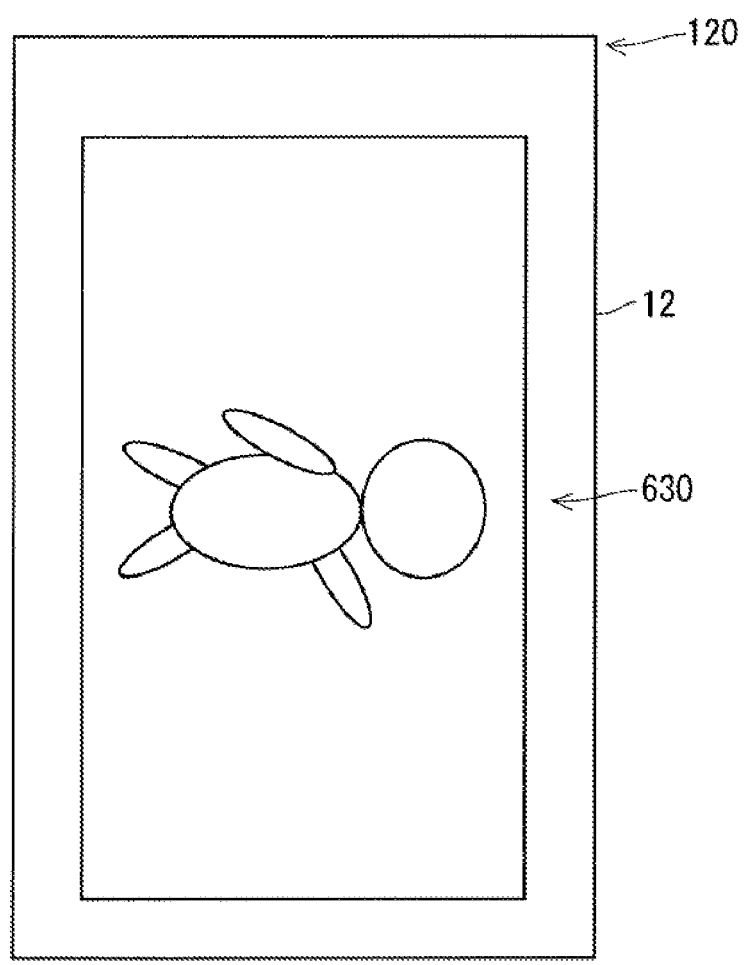

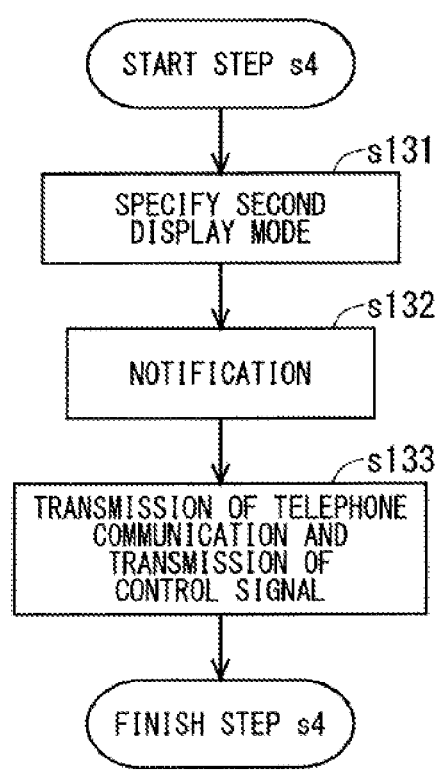
F I G. 4 1

F I G. 4 4
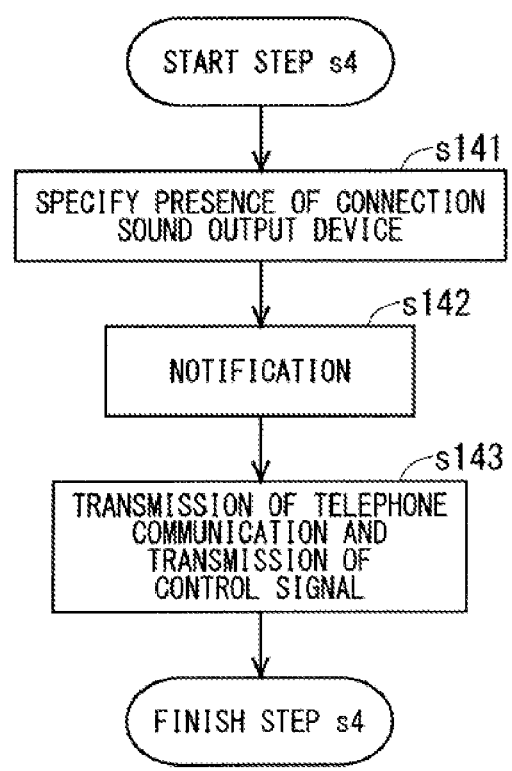

F I G. 5 3
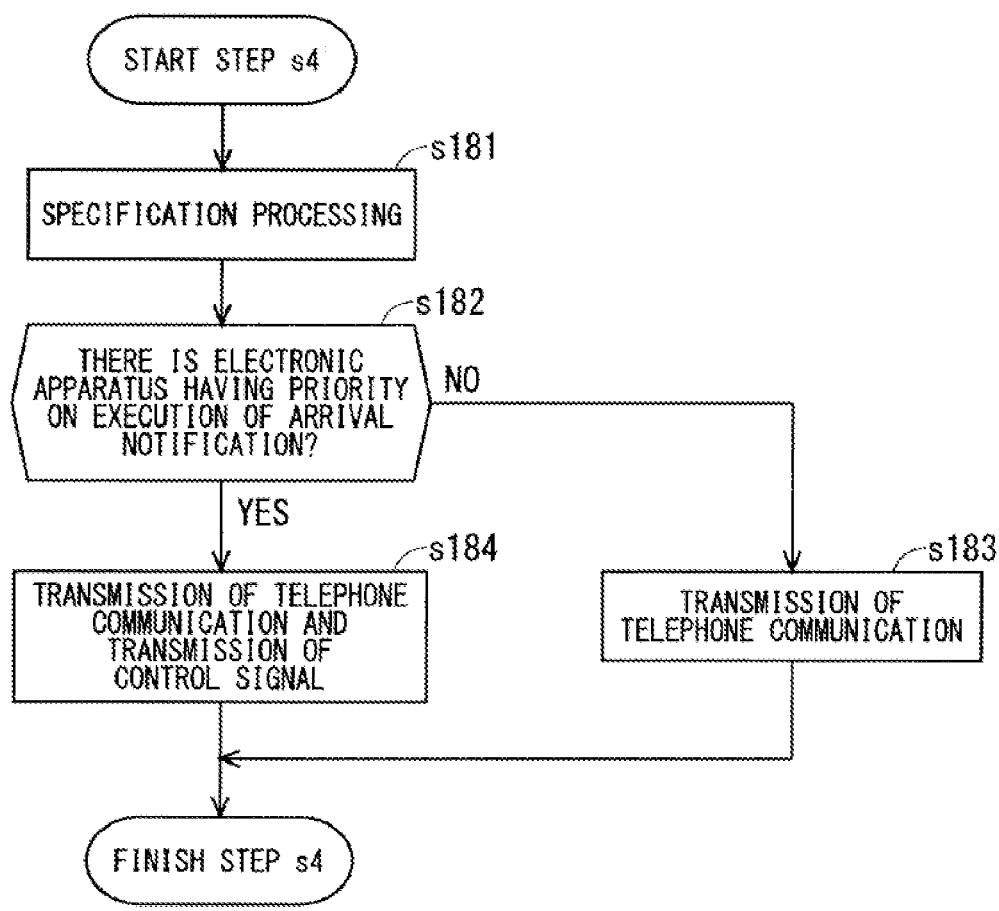

ELECTRONIC APPARATUS FOR COMMUNICATING WITH TARGET APPARATUS BASED ON INFORMATION ACQUIRED FROM THE TARGET APPARATUS

CROSS-REFERENCE TO RELATED APPLICATIONS

The present application is a continuation of PCT Application No. PCT/JP2019/005385 filed on Feb. 14, 2019, which claims the benefit of Japanese Application No. 2018-062309, filed on Mar. 28, 2018, each of which is incorporated herein by reference in its entirety. PCT Application No. PCT/JP2019/005385 is entitled "ELECTRONIC DEVICE AND PROCESSING SYSTEM", and Japanese Application No. 2018-062309 is entitled "ELECTRONIC APPARATUS AND PROCESSING SYSTEM". This application is also related to PCT Application No. PCT/JP2019/005475 filed on Feb. 15, 2019, which is incorporated herein by reference in its entirety.

FIELD

The present disclosure relates to electronic apparatuses.

BACKGROUND

Various techniques relating to electronic apparatuses are proposed.

SUMMARY

An electronic apparatus and a processing system are disclosed. In one embodiment, an electronic apparatus comprises a communication unit and a controller. The communication unit acquires first information regarding another side device. The controller performs first processing based on first information in response to a transmission instruction from a user regarding a first telephone communication with the another side device.

In one embodiment, the electronic apparatus functions as the another side device with which the electronic apparatus described above can communicate.

In one embodiment, a processing system comprises the electronic apparatus described above and the another side device with which the electronic apparatus can communicate.

BRIEF DESCRIPTION OF THE DRAWINGS

FIG. 1 illustrates a diagram showing one example of a processing system.

FIG. 9 illustrates a flow chart showing one example of an operation of the electronic apparatus.

FIG. 18 illustrates a drawing showing one example of a display of the electronic apparatus.

FIG. 20 illustrates a drawing showing one example of schedule information.

FIG. 30 illustrates a flow chart showing one example of an operation of the electronic apparatus.

FIG. 36 illustrates a drawing showing one example of a display of the electronic apparatus.

FIG. 37 illustrates a drawing showing one example of a display of the electronic apparatus.

FIG. 41 illustrates a flow chart showing one example of the operation of the electronic apparatus.

FIG. 44 illustrates a flow chart showing one example of an operation of the electronic apparatus.

FIG. 53 illustrates a flow chart showing one example of an operation of the electronic apparatus.

DETAILED DESCRIPTION

Figure 2:
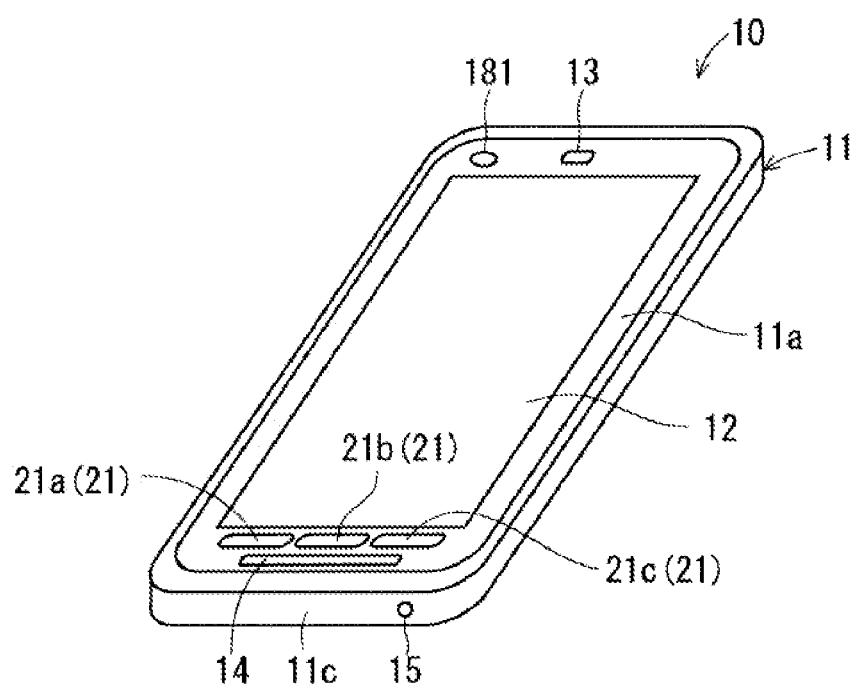
FIG. 2 illustrates a perspective view showing one example of an external appearance of an electronic apparatus.

<Outline of One Example of Processing System>

FIG. 1 is a diagram illustrating one example of a configuration of a processing system 1. As illustrated in FIG. 1, the processing system 1 comprises a plurality of electronic apparatuses 10 and a server device 50 connected to a network 2. The plurality of electronic apparatuses 10 and the server device 50 can communicate with each other via the network 2.

The network 2 comprises at least one of a wireless network and a wired network. In the present example, the network 2 comprises a network of a mobile phone system including a base station, a wireless local area network (LAN), and Internet, for example.

Each electronic apparatus 10 can transmit information relating to the electronic apparatus 10 itself to the server device 50. The information relating to the electronic apparatus 10 is referred to as "apparatus information" hereinafter. When an operation of the electronic apparatus 10 is described, a "subject device" indicates the electronic apparatus 10 itself, and a "subject device user" indicates a user of the electronic apparatus 10. When an operation of the electronic apparatus 10 is described, the electronic apparatus 10 which is the other side device with which the electronic apparatus 10 communicates is referred to as the "other side apparatus 10" in some cases. The user of the other side apparatus 10 is referred to as "the other side user" in some cases.

The plurality of electronic apparatuses 10 connected to the network 2 include a mobile phone such as a smartphone, a tablet terminal, a personal computer, and a wearable apparatus, for example. The wearable apparatus included in the plurality of electronic apparatuses 10 may be an apparatus wearable on the wrist, such as a wristband apparatus and a wristwatch apparatus, an apparatus wearable on the head, such as a headband apparatus and an eyeglasses apparatus, and an apparatus wearable on the body, such as a clothing apparatus. A wristwatch type wearable apparatus is referred to as a smartwatch in some cases.

The server device 50 is a type of computer device. The server device 50 can store apparatus information transmitted from each electronic apparatus 10. In accordance with a request from an electronic apparatus 10, the server device 50 can transmit apparatus information of the other electronic apparatus 10 to the electronic apparatus 10. The electronic apparatus 10 can receive the apparatus information of the other electronic apparatus 10 from the server device 50 to perform a process based on the received apparatus information.

Details of the processing system 1 are described hereinafter. Mainly described hereinafter as an example is the processing system 1 in a case where the electronic apparatus 10 is a mobile phone.

<One Example of Configuration of Electronic Apparatus>
<One Example of External Appearance of Electronic Apparatus>

Figure 3:
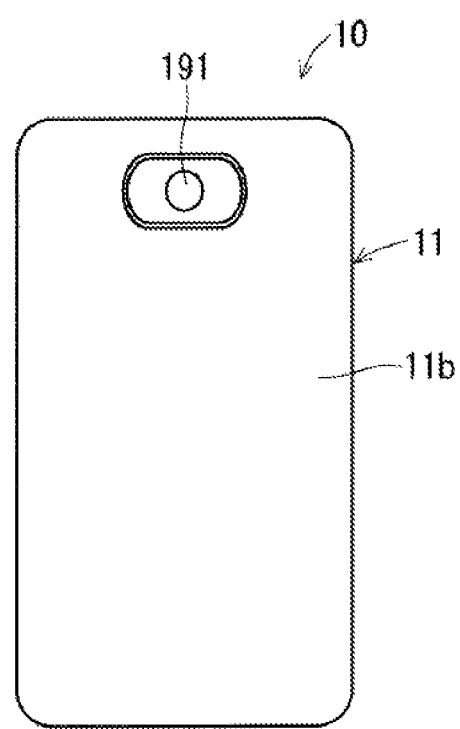
FIG. 3 illustrates a rear view showing one example of the external appearance of the electronic apparatus.

FIGS. 2 and 3 are a perspective view and a rear view showing one example of an external appearance of the electronic apparatus 10 which is a mobile phone, respectively. As illustrated in FIGS. 2 and 3, the electronic apparatus 10 comprises an apparatus case 11 having a plate shape substantially rectangular in a plan view. The apparatus case 11 constitutes an exterior of the electronic apparatus 10.

A display surface 12, in which various types of information such as characters, symbols, and graphics are displayed, is located in a front surface 11a of the apparatus case 11. A touch panel 130, which will be described below, is located in a back surface side of the display surface 12. Accordingly, a user can input various types of information to the electronic apparatus 10 by operating the display surface 12 in a front surface of the electronic apparatus 10 with his/her finger, for example. The user can also input the various types of information to the electronic apparatus 10 by operating the display surface 12 with a pen for the touch panel such as a stylus pen, for example, instead of an operator such as his/her finger.

A receiver hole 13 is located in an upper end of the front surface 11a of the apparatus case 11. A speaker hole 14 is located in a lower end of the front surface 11a. A microphone hole 15 is located in a side surface 11c in a lower side of the apparatus case 11.

A lens 181 included in a first camera 180, which will be described below, can be visually recognized from the upper end of the front surface 11a of the apparatus case 11. As illustrated in FIG. 3, a lens 191 included in a second camera 190, which will be described below, can be visually recognized from an upper end of a back surface 11b of the apparatus case 11.

The electronic apparatus 10 comprises an operation button group 210 including a plurality of operation buttons 21 (refer to FIG. 4 described below). Each of the plurality of operation buttons 21 is a hardware button. Specifically, each of the plurality of the operation buttons 21 is a press button. At least one operation button 21 included in the operation button group 210 may also be a software button displayed in the display surface 12.

The operation button group 210 includes operation buttons 21a, 21b, and 21c located in the lower end of the front surface 11a of the apparatus case 11. The operation button group 210 may include a power button and a volume button.

The operation button 21a is a back button, for example. The back button is an operation button for switching the display in the display surface 12 to the immediately preceding display. The user operates the operation button 21a to switch the display in the display surface 12 to the immediately preceding display. The operation button 21b is a home button, for example. The home button is an operation button for displaying the home screen in the display surface 12. The user operates the operation button 21b to display the home screen in the display surface 12. The operation button 21c is a history button, for example. The history button is an operation button to display a history of an application executed by the electronic apparatus 10 in the display surface 12. When the user operates the operation button 21c, the history of the application executed by the electronic apparatus 10 is displayed in the display surface 12.

<One Example of Electrical Configuration of Electronic Apparatus>

Figure 4:
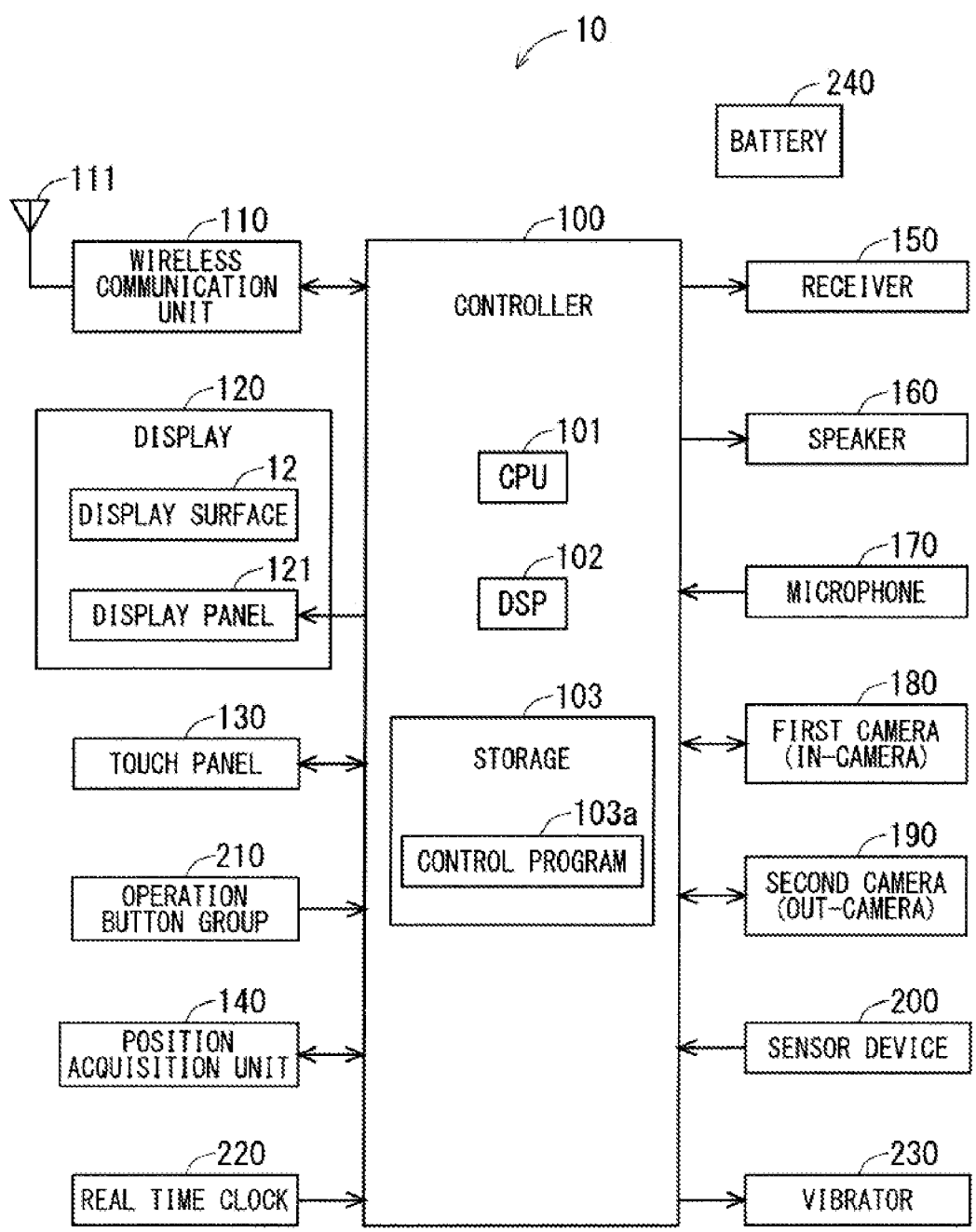
FIG. 4 illustrates a block diagram showing one example of a configuration of the electronic apparatus.

FIG. 4 is a block diagram illustrating one example of an electrical configuration of the electronic apparatus 10 illustrated in FIGS. 2 and 3. As illustrated in FIG. 4, the electronic apparatus 10 comprises a controller 100, a wireless communication unit 110, a display 120, the touch panel 130, the operation button group 210, a position acquisition unit 140, and a real time clock 220, for example. The electronic apparatus 10 further includes a receiver 150, a speaker 160, a microphone 170, the first camera 180, the second camera 190, a sensor device 200, a vibrator 230, and a battery 240. The apparatus case 11 houses these components included in the electronic apparatus 10.

The controller 100 controls the other components of an electronic apparatus 10 to be able to collectively manage the operation of the electronic apparatus 10. The controller 100 is also considered as a control device or a control circuit. The controller 100 comprises at least one processor for providing control and processing capability to execute various functions as described in detail below.

In accordance with various embodiments, the at least one processor may be implemented as a single integrated circuit (IC) or as multiple communicatively coupled IC's and/or discrete circuits. The at least one processor can be executed in accordance with various known techniques.

In one embodiment, the processor comprises one or more circuits or units configurable to perform one or more data computing procedures or processes by executing instructions stored in an associated memory, for example. In the other embodiment, the processor may be firmware configurable to perform one or more data computing procedures or processes (a discrete logic component, for example).

In accordance with various embodiments, the processor may include one or more processors, controllers, microprocessors, microcontrollers, application specific integrated circuits (ASICs), digital signal processors, programmable logic devices, field programmable gate arrays, or any combination of these devices or structures, or other known devices and structures, to perform the functions described herein.

In the present example, the controller 100 comprises a central processing unit (CPU) 101, a digital signal processor (DSP) 102, and a storage 103. The storage 103 includes a non-transitory recording medium readable by the CPU 101 and the DSP 102 such as a read only memory (ROM) and a random access memory (RAM). The ROM of the storage 103 is, for example, a flash ROM (flash memory) that is a non-volatile memory. The storage 103 stores a plurality of control programs 103a etc. to control the electronic apparatus 10. The CPU 101 and the DSP 102 execute the various control programs 103a in the storage 103 to achieve various functions of the controller 100.

The plurality of control programs 103a in the storage 103 include various applications (that is to say, application programs). The storage 103 stores, for example, a call application (in other words, telephone application), a browser, a schedule management application, a camera application, a still image display application, a video reproduction application, a music reproduction application, and a message communication application, for example.

The call application is an application for the electronic apparatus 10 to perform a telephone communication using the wireless communication unit 110, the receiver 150, and the microphone 170, for example. The call application is considered as an application for the user to make a voice call, using the electronic apparatus 10, with a user of the other electronic apparatus 10. The telephone communication includes a conventional type communication form using a telephone circuit and a communication form using Internet which is referred to as an internet protocol (IP) telephone communication. The call application for performing the conventional type communication using the telephone circuit is referred to as "the conventional type call application" in some cases. The call application for performing the IP telephone communication is referred to as "the IP telephone application" in some cases.

The storage 103 may store a plural types of call application. The plural types of call application in the storage 103 may include at least one type of conventional type call application or at least one type of IP telephone application.

The browser is an application for the electronic apparatus 10 to display a website. The schedule management application is an application for registering schedule information in the electronic apparatus 10. The camera application is an application for the electronic apparatus 10 to take an image of an object using the first camera 180 and the second cameral 190. The still image display application is an application for the electronic apparatus 10 to display a still image in the storage 103. The video reproduction application is an application for the electronic apparatus 10 to reproduce and display a video in the storage 103. The music reproduction application is an application for the electronic apparatus 10 to reproduce and output a music in the storage 103.

The message communication application is an application for the electronic apparatus 10 to perform a message communication using the wireless communication unit 110, for example. The message communication includes a communication form in which a message transmitted from a transmitting side is temporarily stored in a server device and a receiving side retrieves the message from the server device. This communication form is referred to as "the e-mail communication" in some cases. The message communication also includes a communication form in which the receiving side can immediately receive the message transmitted from the transmitting side without retrieving the message from the server device. This communication form is referred to as "the instant message communication" in some cases. The message communication application for achieving the e-mail communication is referred to as "the e-mail application" in some cases. The message communication application for achieving the instant message communication is referred to as "the IM application" in some cases. The IM application is referred to as "the instant messenger" in some cases.

The storage 103 may store a plural types of message communication application. The plural types of message communication application in the storage 103 may include at least one type of e-mail application or at least one type of IM application.

The storage 103 may store at least one application in the storage 103 in advance. The electronic apparatus 10 may download the at least one application in the storage 103 from the other device and store it in the storage 103. The application is simply referred to as "app" in some cases hereinafter.

The configuration of the controller 100 is not limited to the example described above. For example, the controller 100 may comprise a plurality of CPUs 101. It is also applicable that the controller 100 does not comprise the DSP 102 or comprises a plurality of DSPs 102. All or some of the functions of the controller 100 may be achieved by a hardware circuit that needs no software to achieve the functions above. The storage 103 may comprise a non-transitory computer readable recording medium other than the ROM and the RAM. The storage 103 may comprise, for example, a compact hard disk drive and a solid state drive (SSD).

The wireless communication unit 110 comprises an antenna 111. The wireless communication unit 110 can perform a wireless communication in several types of communication systems, for example, using the antenna 111. The controller 100 controls the wireless communication of the wireless communication unit 110. The wireless communication unit 110 is also referred to as the wireless communication circuit. The wireless communication unit 110 can perform a wireless communication with a base station of a mobile phone system included in the network 2. The wireless communication unit 110 can communicate with a mobile phone different from the electronic apparatus 10 or a web server, for example, via the base station.

The wireless communication unit 110 can perform a wireless communication using a wireless LAN such as WiFi included in the network 2. The wireless communication unit 110 can perform a near field wireless communication with the other device directly without the network 2. For example, the wireless communication unit 110 can perform the wireless communication in conformity to Bluetooth (registered trademark). The wireless communication unit 110 may perform the wireless communication in conformity to at least one of ZigBee (registered trademark) and near field communication (NFC).

The wireless communication unit 110 can perform various types of processing such as amplification processing on a signal received by the antenna 111 and then outputs a resultant signal to the controller 100. The controller 100 can perform the various types of processing on the received signal which has been input, to acquire information contained in the received signal. The controller 100 outputs a transmission signal containing the information to the wireless communication unit 110. The wireless communication unit 110 can perform the various types of processing such as amplification processing on the transmission signal being has been input, and then wirelessly transmits a resultant signal from the antenna 111. As described hereinafter, the controller 100 makes the wireless communication unit 110 transmit apparatus information of the electronic apparatus 10 to the server device 50.

The display 120 comprises the display surface 12 located in the front surface of the electronic apparatus 10 and a display panel 121. The display 120 can display various types of information in the display surface 12. The display panel 121 is a liquid crystal display panel or an organic EL panel, for example. The display panel 121 can display various types of information such as characters, symbols, and graphics under control of the controller 100. The display panel 121 faces the display surface 12 in the apparatus case 11. The information displayed on the display panel 121 is displayed in the display surface 12. The display 120 is considered as a notification unit displaying the information, thereby transmitting a notification to the user.

The touch panel 130 can detect an operation performed on the display surface 12 with the operator such as the finger. The touch panel 130 is, for example, a projected capacitive touch panel. The touch panel 130 is located on a reverse side of the display surface 12, for example. When the user performs the operation on the display surface 12 with the operator such as his/her finger, the touch panel 130 can input, to the controller 100, an electrical signal corresponding to the operation. The controller 100 can specify contents of the operation performed on the display surface 12 based on the electrical signal (output signal) from the touch panel 130. The controller 100 can perform the processing corresponding to the specified operation contents.

When the user operates each operation button 21 of the operation button group 210, the operation button 21 can output to the controller 100 an operation signal indicating that the operation button 21 has been operated. The controller 100 can accordingly determine whether or not each operation button 21 has been operated for each operation button 21. The controller 100 to which the operation signal is input controls the other component, thereby causing the electronic apparatus 10 to execute the function allocated to the operated operation button 21.

The position acquisition unit 140 can acquire position information indicating a position of the electronic apparatus 10. The position acquisition unit 140 can receive a satellite signal transmitted from a positioning satellite, and acquire position information of the electronic apparatus 10 based on the received satellite signal. The position information acquired by the position acquisition unit 140 includes a latitude and a longitude indicating a position of the electronic apparatus 10, for example. The position acquisition unit 140 is considered as a position acquisition circuit.

The position acquisition unit 140 is a GPS (global positioning system) receiver, for example, and can receive a wireless signal from the positioning satellite of a GPS. The position acquisition unit 140 calculates a current position of the electronic apparatus 10 with a latitude and a longitude, for example, based on the received wireless signal, and outputs the position information including the calculated latitude and longitude to the controller 100. The position information of the electronic apparatus 10 is also considered as position information of the user holding the electronic apparatus 10.

The position acquisition unit 140 may acquire the position information of the electronic apparatus 10 based on the signal transmitted by the positioning satellite of global navigation satellite system (GNSS) other than GPS. For example, the position acquisition unit 140 may acquire the position information of the electronic apparatus 10 based on a signal transmitted from a positioning satellite of global navigation satellite system (GLONASS), Indian regional navigational satellite system (IRNSS), COMPASS, Galileo, or quasi-zenith satellites system (QZSS).

It is also applicable that the electronic apparatus 10 does not comprise the position acquisition unit 140. In this case, the electronic apparatus 10 may have a wireless or wired connection with the position acquisition unit 140 separated from the electronic apparatus 10.

The microphone 170 can convert a sound being input from the outside of the electronic apparatus 10 into an electrical sound signal and then output the electrical sound signal to the controller 100. The sound from the outside of the electronic apparatus 10 is taken inside the electronic apparatus 10 through the microphone hole 15 and input to the microphone 170.

The speaker 160 is, for example, a dynamic speaker. The speaker 160 can convert an electrical sound signal from the controller 100 into a sound and then output the sound. The sound being output from the speaker 160 is output outside through the speaker hole 14. The user can hear the sound being output from the speaker hole 14 in a place apart from the electronic apparatus 10. The speaker 160 is considered as a notification unit outputting the sound, thereby transmitting a notification to the user.

The receiver 150 can output a received sound. The receiver 150 is, for example, a dynamic speaker. The receiver 150 can convert an electrical sound signal from the controller 100 into a sound and then output the sound. The sound being output from the receiver 150 is output outside through the receiver hole 13. A volume of the sound being output through the receiver hole 13 is set to be smaller than a volume of the sound being output through the speaker hole 14. The user brings the receiver hole 13 close to his/her ear, thereby being able to hear the sound being output through the receiver hole 13. The receiver 150 is considered as a notification unit outputting the sound, thereby transmitting a notification to the user. A vibration element such as a piezoelectric vibration element for causing a portion of the front surface of the apparatus case 11 to vibrate may be provided instead of the receiver 150. In this case, the sound is transferred to the user in a form of the vibration of the portion of the front surface.

The first camera 180 comprises the lens 181, an image sensor, and so on. The second camera 190 comprises the lens 191, an image sensor, and so on. Each of the first camera 180 and the second camera 190 can take an image of an object under control of the controller 100, generate a still image or a video of the object, and then output the still image or the video to the controller 100.

The lens 181 of the first camera 180 can be visually recognized from the front surface 11a of the apparatus case 11. Accordingly, the first camera 180 can take an image of an object located on a side of the front surface (a side of the display surface 12) of the electronic apparatus 10. The first camera 180 is referred to as an in-camera. In the meanwhile, the lens 191 of the second camera 190 can be visually recognized from the back surface 11b of the apparatus case 11. Accordingly, the second camera 190 can take an image of an object located on a back surface side of the electronic apparatus 10. The second camera 190 is referred to as an out-camera.

The sensor device 200 comprises at least one sensor. In the present example, the sensor device 200 comprises an accelerometer, an atmospheric pressure sensor, a geomagnetic sensor, and a gyro sensor, for example. The accelerometer is a triaxial accelerometer which can detect an acceleration of the electronic apparatus 10, for example. The accelerometer can detect an acceleration in an x axis direction, a y axis direction, and a z axis direction set in the electronic apparatus 10. The x axis direction, the y axis direction, and the z axis direction are set to a longitudinal direction, a short-side direction, and a thickness direction of the electronic apparatus 10, respectively, for example. The atmospheric pressure sensor can detect an atmospheric pressure around the electronic apparatus 10. The geomagnetic sensor is a triaxial geomagnetic sensor which can detect a magnetic field (also referred to as a magnetizing field) around the electronic apparatus 10, for example. The geomagnetic sensor can detect the magnetic field in the x axis direction, the y axis direction, and the z axis direction set in the electronic apparatus 10. The gyro sensor is a triaxial gyro sensor which can detect an angular velocity of the electronic apparatus 10, for example. The gyro sensor can detect an angular velocity around the x axis direction, the y axis direction, and the z axis direction set in the electronic apparatus 10.

The sensor device 200 needs not comprise at least one of the accelerometer, the atmospheric pressure sensor, the geomagnetic sensor, and the gyro sensor. In this case, the electronic apparatus 10 may have a wireless or wired connection with the at least one of the sensors separated from the electronic apparatus 10. The sensor device 200 may comprise a sensor other than the accelerometer, the atmospheric pressure sensor, the geomagnetic sensor, and the gyro sensor. For example, the sensor device 200 may comprise at least one of a proximity sensor, an illuminance sensor, and a temperature sensor. The electronic apparatus 10 may have a wireless or wired connection with a sensor other than the accelerometer, the atmospheric pressure sensor, the geomagnetic sensor, and the gyro sensor separated from the electronic apparatus 10.

The real time clock 220 measures a current time and transmits a notification thereof to the controller 100. The vibrator 230 can vibrate the electronic apparatus 10. Specifically, the vibrator 230 can vibrate the apparatus case 11 under control the controller 100. The vibrator 230 vibrates the apparatus case 11, thereby being able to transmit a notification to the user holding the electronic apparatus 10. The vibrator 230 comprises an eccentric motor, for example. The vibrator 230 is considered as a notification unit vibrating the apparatus case 11, thereby transmitting a notification to the user.

The battery 240 is, for example, a rechargeable battery. The battery 240 can supply the power source to various components such as the controller 100 and the wireless communication unit 110 included in the electronic apparatus 10.

<Configuration Example of Server Device>

Figure 5:
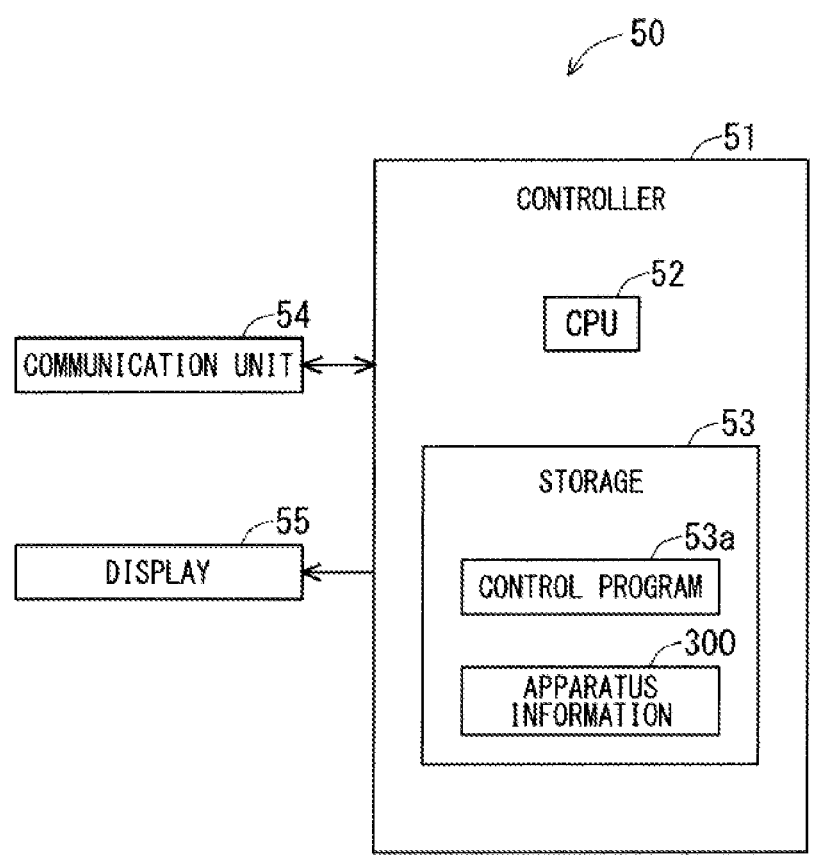
FIG. 5 illustrates a block diagram showing one example of a configuration of a server device.

FIG. 5 is a drawing illustrating one example of a configuration of the server device 50. As illustrated in FIG. 5, the server device 50 comprises a controller 51, a communication unit 54 connected to the network 2, and a display 55, for example.

The display 55 is a liquid crystal display panel or an organic EL panel, for example. The display 55 can display various types of information such as characters, symbols, and graphics under control of the controller 51.

The controller 51 controls the other components of the server device 50, thereby being able to collectively manage the operation of the server device 50. The controller 51 is also considered as a control device or a control circuit. The controller 51 comprises at least one processor for providing control and processing capability to execute various functions as described in more detail below. The above description of the processor included in the controller 100 of the electronic apparatus 10 also falls under the processor included in the controller 51.

In the present example, the controller 51 comprises a CPU 52 and a storage 53. The storage 53 comprises a non-transitory recording medium readable by the CPU 52 such as a ROM and a RAM. The ROM of the storage 53 is, for example, a flash ROM that is a non-volatile memory. The storage 53 stores a plurality of control programs 53a to control the server device 50. The storage 53 stores apparatus information 300 transmitted from the electronic apparatus 10. In the storage 103, the apparatus information 300 is managed for each electronic apparatus 10. The CPU 52 executes the various control programs 53a in the storage 53 to achieve various functions of the controller 51.

The communication unit 54 has a wired or wireless connection with the network 2. The communication unit 54 can communicate with a device such as the electronic apparatus 10 connected to the network 2 via the network 2. The communication unit 54 can input the information received from the network 2 to the controller 51. The communication unit 54 can output the information received from the controller 51 to the network 2.

A configuration of the server device 50 is not limited to the example in FIG. 5. For example, the controller 51 may comprise a plurality of CPUs 52. The controller 51 may comprise at least one DSP. All or some of the functions of the controller 51 may be achieved by a hardware circuit that needs no software to achieve the functions above. The storage 53 may include a non-transitory computer readable recording medium other than the ROM and the RAM. The storage 53 may comprise, for example, a compact hard disk drive and an SSD. The storage 53 may store at least one control program 53a in the storage 53 in advance. The server device 50 may download the at least one control program 53a in the storage 53 from the other device and store it in the storage 53.

The server device 50 may comprise a configuration other than the controller 51, the communication unit 54, and the display 55. The server device 50 may comprise an input device, such as a touch panel, for example, for the user to input the information to the server device 50.

<Example of Display of Electronic Apparatus>

Figure 6:
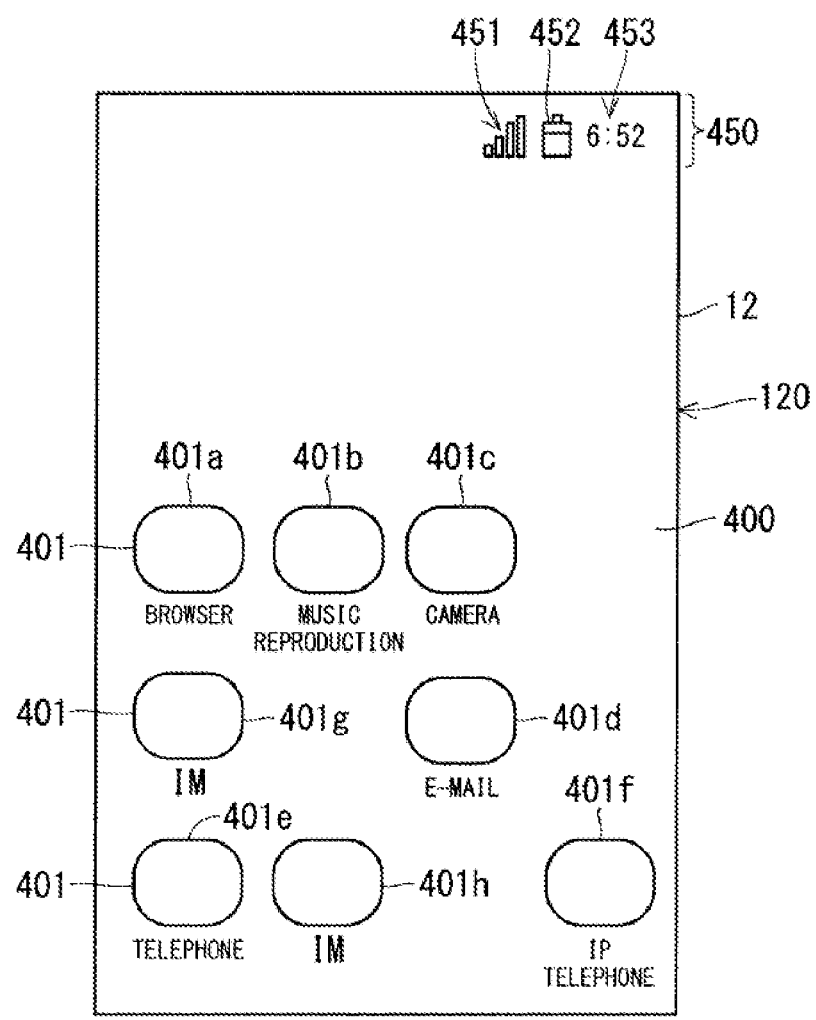
FIG. 6 illustrates a drawing showing one example of a display of the electronic apparatus.

FIG. 6 is a drawing illustrating one example of the display of the electronic apparatus 10. FIG. 6 schematically illustrates one example of a home screen 400. As illustrated in FIG. 6, the home screen 400 displayed in the display surface 12 shows icons 401, corresponding to the applications in the storage 103, for instructing the electronic apparatus 10 to execute the corresponding applications.

In the example in FIG. 6, the home screen 400 includes an icon 401a corresponding to the browser, an icon 401b corresponding to the music reproduction application, an icon 401c corresponding to the camera application, and an icon 401d corresponding to the e-mail application. The home screen 400 includes an icon 401e corresponding to the conventional type call application and an icon 401f corresponding to the IP telephone application. The home screen 400 includes two icons 401g and 401h corresponding to two types of IM application provided by different companies, respectively, for example.

The user can select any of the icons 401 by performing a predetermined operation (e.g., a tap operation) on the icon 401 included in the home screen 400. The controller 100 reads, from the storage 103, an application corresponding to the selected icon 401 and executes the application. That is to say, when the touch panel 130 detects the predetermined operation performed on the icon 401, the controller 100 reads, from the storage 103, the application corresponding to the icon 401 and executes the application. The user can thus select the icon 401 by operating the icon 401 and make the electronic apparatus 10 execute the application corresponding to the selected icon 401. For example, when the user performs a tap operation on the icon 401d corresponding to the e-mail application, the e-mail application is executed in the electronic apparatus 10. When the user performs a tap operation on the icon 401e corresponding to the conventional type call application, the conventional type call application is executed in the electronic apparatus 10.

Not only the home screen 400 but also each screen displayed in the display surface 12 includes a notification region 450 for transmitting a notification of a state of the electronic apparatus 10. The notification region 450 is also referred to as a status bar. As illustrated in FIG. 6, the notification region 450 includes an icon 451 indicating a communication state of the wireless communication unit 110, an icon 452 indicating a remaining battery level of the battery 240, and an icon 453 indicating a current time acquired in the real time clock 220.

When a specific event occurs in the electronic apparatus 10, information regarding the event which has occurred is indicated in the notification region 450. The information includes, for example, an icon for transmitting a notification of a receipt of a new message and an icon for transmitting a notification of an absence incoming call.

The illustration of the notification region 450 is omitted hereinafter in describing the example of the display of the electronic apparatus 10 when there is no particular relation with the notification region 450.

<Operation Example of Electronic Apparatus>
<One Example of Notification of Arrival in Electronic Apparatus>

When a transmission of a telephone communication performed by the other side apparatus 10 arrives, the electronic apparatus 10 transmits a notification of arrival (incoming call) of the telephone communication to the subject device user. When the electronic apparatus 10 receives a message transmitted with a message communication from the other side apparatus 10 (in other words, when the message arrives), the electronic apparatus 10 transmits a notification of arrival of the message communication to the subject device user. The notification of arrival of the telephone communication is referred to as "the telephone arrival (incoming call) notification" and the notification of arrival of the message communication is referred to as "the message arrival notification" in some cases hereinafter. The arrival of the telephone communication is referred to as "the telephone arrival (incoming call)" in some cases.

The electronic apparatus 10 can transmit the telephone arrival notification and the message arrival notification using the display 120, the speaker 160, and the vibrator 230, for example. For example, the controller 100 makes the display 120 display a screen of the arrival notification for transmitting the notification of the telephone arrival while the telephone communication arrives (referred to as "during the telephone arrival" in some cases hereinafter), thus the electronic apparatus 10 can transmit the telephone arrival notification to the subject device user. This telephone arrival notification is referred to as "the telephone arrival notification by display" in some cases. The screen of the arrival notification is also considered as the information of the arrival notification to transmit the notification of the telephone arrival. The controller 100 makes the speaker 160 output an arrival sound of the telephone communication during the telephone arrival, thus the electronic apparatus 10 can transmit the telephone arrival notification to the subject device user. This telephone arrival notification is referred to as "the telephone arrival notification by sound" in some cases. The controller 100 makes the vibrator 230 vibrate the apparatus case 11 during the telephone arrival, thus the electronic apparatus 10 can transmit the telephone arrival notification to the subject device user. This telephone arrival notification is referred to as "the telephone arrival notification by vibration" in some cases.

In the similar manner, the controller 100 makes the display 120 display the information for notification of a receipt of a message in the notification region 450 upon receipt of the message in the electronic apparatus 10, thus the electronic apparatus 10 can transmit the message arrival notification to the subject device user. This message arrival notification is referred to as "the message arrival notification by display" in some cases. The controller 100 makes the speaker 160 output the arrival sound of the message communication upon receipt of the message in the electronic apparatus 10, thus the electronic apparatus 10 can transmit the message arrival notification to the subject device user. This message arrival notification is referred to as "the message arrival notification by sound" in some cases. The controller 100 makes the vibrator 230 vibrate the apparatus case 11 upon receipt of the message in the electronic apparatus 10, thus the electronic apparatus 10 can perform the message arrival notification to the subject device user. This message arrival notification is referred to as "the message arrival notification by vibration" in some cases.

The user operates the display surface 12, for example, thereby being able to make a setting regarding the arrival notification on the electronic apparatus 10. For example, the user can make a setting regarding the telephone arrival notification whether or not to execute the telephone arrival notification by sound and whether or not to execute the telephone arrival notification by vibration on the electronic apparatus 10. For example, the user can make a setting regarding the message arrival notification whether or not to execute the message arrival notification by sound and whether or not to execute the message arrival notification by vibration on the electronic apparatus 10. The electronic apparatus 10 basically performs the arrival notification in accordance with the setting regarding the arrival notification in the subject device. However, the other electronic apparatus 10 controls the arrival notification of the electronic apparatus 10 as described hereinafter.

<Transmission of Apparatus Information>

In the present example, the controller 100 of the electronic apparatus 10 can generate apparatus information of the subject device, and makes the wireless communication unit 110 transmit the generated apparatus information to the server device 50. The apparatus information may include setting information indicating a setting regarding the electronic apparatus 10. The apparatus information may include registration information registered for the electronic apparatus 10. The apparatus information may include apparatus state information indicating a state of the electronic apparatus 10. Specific examples of the apparatus information are described in detail hereinafter.

In the electronic apparatus 10, the controller 100 makes the wireless communication unit 110 transmit latest apparatus information to the server device 50 at regular intervals, for example. The controller 100 may make the wireless communication unit 110 transmit the apparatus information to the server device 50 every time a change occurs in information included in the apparatus information. The controller 100 may make the wireless communication unit 110 transmit the latest apparatus information to the server device 50 every time a transmission of the apparatus information is requested by the server device 50. The electronic apparatus 10 transmits the apparatus information of the subject device together with identification information of the subject device. A phone number allocated to the electronic apparatus 10, for example, may be adopted as the identification information.

In the server device 50, when the communication unit 54 acquires the apparatus information and the identification information of the electronic apparatus 10, the controller 51 stores the acquired apparatus information and identification information in association with each other in the storage 53. At this time, when the storage 53 stores earlier apparatus information corresponding to the received identification information, the controller 51 stores the received apparatus information in place of the earlier apparatus information in the storage 53. Accordingly, the latest apparatus information for each electronic apparatus 10 is stored in the storage 53.

<Operation Example of Electronic Apparatus after Activating Call Application>

In the present example, the electronic apparatus 10 can perform processing based on the apparatus information of the other side apparatus 10 in response to a transmission instruction from the subject device user regarding the telephone communication with the other side apparatus 10 after activating the call application. The user can use such an electronic apparatus 10, thus the convenience of the electronic apparatus 10 is increased.

Figure 7:
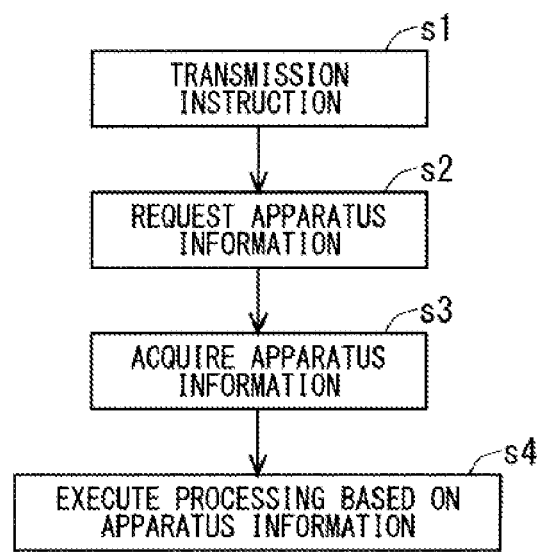
FIG. 7 illustrates a flow chart showing one example of an operation of the electronic apparatus.

FIG. 7 is a flow chart illustrating one example of the operation of the electronic apparatus 10 after activating the call application. When the touch panel 130 detects the tap operation on the icon 401e or the icon 401f described above, the controller 100 of the electronic apparatus 10 retrieves the call application corresponding to the icon 401 on which the tap operation has been performed from the storage 103 and executes it. The call application is thereby activated.

After activating the call application, in Step s1, when the controller 100 specifies that the transmission instruction from the subject device user regarding the telephone communication with the other side apparatus 10 is input to the subject device based on the output signal from the touch panel 130, the controller 100 executes Step s2.

The simple term of "the transmission instruction" means the transmission instruction regarding the telephone communication hereinafter. The other side apparatus 10 in a case where the transmission instruction regarding the telephone communication with the other side apparatus 10 is input to the electronic apparatus 10 is referred to as "the target other side apparatus 10" in some cases. The user of the target other side apparatus 10 is referred to as "the target other side user" in some cases. The electronic apparatus 10 to which the transmission instruction is input is referred to as "the transmission instruction receiving apparatus 10" or "the instruction receiving apparatus 10" in some cases.

Figure 8:
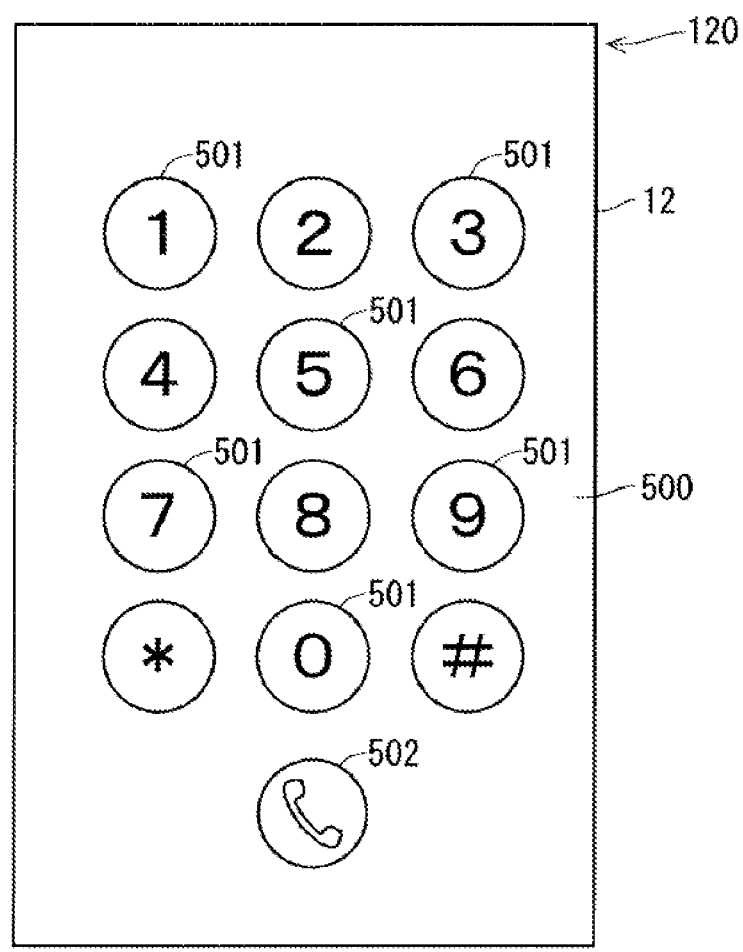
FIG. 8 illustrates a drawing showing one example of a display of the electronic apparatus.

FIG. 8 is a drawing illustrating one example of the display during the execution of the call application. FIG. 8 illustrates one example of the display during the execution of the conventional type call application. FIG. 8 illustrates one example of an input screen 500 for inputting a phone number allocated to the other side apparatus 10 in the telephone communication. The input screen 500 is referred to as a dial pad or a key pad in some cases.

As illustrated in FIG. 8, the input screen 500 includes twelve input buttons 501 for inputting a symbol such as a number. A symbol is allocated to each input button 501. When a tap operation, for example, is performed on the input button 501, the symbol allocated to the input button 501 on which the tap operation has been performed is input to the electronic apparatus 10. The user operates the plurality of input buttons 501, thereby being able to input a phone number of the other side apparatus 10 to the electronic apparatus 10.

The input screen 500 includes a transmission instruction button 502 for inputting the transmission instruction to the electronic apparatus 10. When a tap operation, for example, is performed on the transmission instruction button 502, the transmission instruction is input to the electronic apparatus

10. The user operates the transmission instruction button 502 after inputting the phone number of the other side apparatus 10 to the electronic apparatus 10, thereby being able to input the transmission instruction of the telephone communication with the other side apparatus 10 to the electronic apparatus 10.

The method of inputting the transmission instruction to the electronic apparatus 10 performed by the user is not limited to the examples described above. The user can input the transmission instruction to the electronic apparatus 10 using a telephone directory in the storage 103, for example. In this case, the user performs a predetermined operation on the display surface 12 to make the electronic apparatus 10 display the phone number of the other side apparatus 10, which is included in the telephone directory in the storage 103, in the display surface 12, for example. Then, the user performs a tap operation, for example, on the phone number of the other side apparatus 10 displayed in the display surface 12, thereby being able to input the transmission instruction of the telephone communication with the other side apparatus 10 to the electronic apparatus 10. The user may input the transmission instruction to the electronic apparatus 10 using an arrival history or a transmission history displayed in the display surface 12. The user may input the transmission instruction to the electronic apparatus 10 by inputting a predetermined sound to the microphone 170.

In the example described above, the phone number is used as the identification information of the other side apparatus 10 used in the case where the electronic apparatus 10 performs the telephone communication with the other side apparatus 10, however, identification information other than the phone number is used in the IP telephone application in some cases.

In Step s2, the controller 100 generates a first request signal for requesting the apparatus information of the target other side apparatus 10 from the server device 50. The first request signal includes the identification information of the target other side apparatus 10. The controller 100 makes the wireless communication unit 110 transmit the first request signal to the server device 50.

In the server device 50 receiving the first request signal, the controller 51 retrieves the apparatus information corresponding to the identification information included in the first request signal from the storage 53. Then, the server device 50 transmits the retrieved apparatus information to the transmission instruction receiving apparatus 10. Accordingly, the transmission instruction receiving apparatus 10 can acquire the apparatus information of the target other side apparatus 10.

After Step s2, in Step s3, when the wireless communication unit 110 acquires the apparatus information of the target other side apparatus 10 from the server device 50, the controller 100 executes processing based on the acquired apparatus information in Step s4.

In the present example, the controller 100 of the instruction receiving apparatus 10 does not unconditionally perform the transmission of the telephone communication in response to the transmission instruction, but performs processing corresponding to the target other side apparatus 10. In Step s4, the processing executed by the instruction receiving apparatus 10 is determined based on the apparatus information of the target other side apparatus 10, and the determined processing is executed.

The controller 100 may register the acquired apparatus information in the telephone directory in the storage 103. In this case, the controller 100 may register the apparatus information of the other side apparatus 10 in the telephone directory in association with the phone number of the other side apparatus 10. Accordingly, when the electronic apparatus 10 displays the telephone directory, the user can recognize the apparatus information.

In the example described above, the electronic apparatus 10 transmits the first request signal to the server device 50 based on the transmission instruction as a trigger, however, the electronic apparatus 10 may transmit the first request signal to the server device 50 based on the other condition as a trigger. For example, the electronic apparatus 10 may transmit the first request signal to the server device 50 at regular intervals. In this case, as illustrated in FIG. 9, Steps s2 and s3 are unnecessary, and executed in Step s4 is processing based on the apparatus information which has been acquired by the electronic apparatus 10 most recently.

The electronic apparatus 10 may acquire the apparatus information from the other side apparatus 10 relating to the transmission instruction without the server device 50. In this case, for example, in Step s2, the controller 100 makes the wireless communication unit 110 transmit, to the target other side apparatus 10, a second request signal for requesting the apparatus information from the target other side apparatus 10. In the electronic apparatus 10, when the wireless communication unit 110 receives the second request signal, the controller 100 makes the wireless communication unit 110 transmit the apparatus information of the subject device to the other side apparatus 10. In Step s3, when the wireless communication unit 110 acquires the apparatus information of the target other side apparatus 10, the controller 100 executes processing based on the acquired apparatus information in Step s4.

The electronic apparatus 10 may transmit the second request signal to the other side apparatus 10 based on a condition different from the transmission instruction as a trigger. For example, the electronic apparatus 10 may transmit the second request signal to the other side apparatus 10 at regular intervals. In this case, as illustrated in FIG. 9 described above, Steps s2 and s3 are unnecessary, and executed in Step s4 is processing based on the apparatus information which has been acquired by the electronic apparatus 10 most recently.

It is also applicable that the electronic apparatus 10 does not transmit the apparatus information in accordance with the request of the other electronic apparatus 10, but transmits the apparatus information to the other electronic apparatus 10 by itself. For example, the electronic apparatus 10 may transmit the apparatus information of the subject device to the other electronic apparatus 10 at regular intervals. In this case, as illustrated in FIG. 9, Steps s2 and s3 are unnecessary, and in Step s4, the electronic apparatus 10 performs processing based on the apparatus information which has been acquired from the other side apparatus 10 most recently.

When the electronic apparatus 10 acquires the apparatus information from the server device 50 or the other electronic apparatus 10, a wireless communication system having a large communication speed and small latency such as a wireless communication system conformable to a fifth generation mobile communication system (5G) may also be used. For example, in Steps s2 and s3 described above, the wireless communication system conformable to 5G may also be used.

Various specific examples of Step s4 are described hereinafter.

First Example

Figure 10:
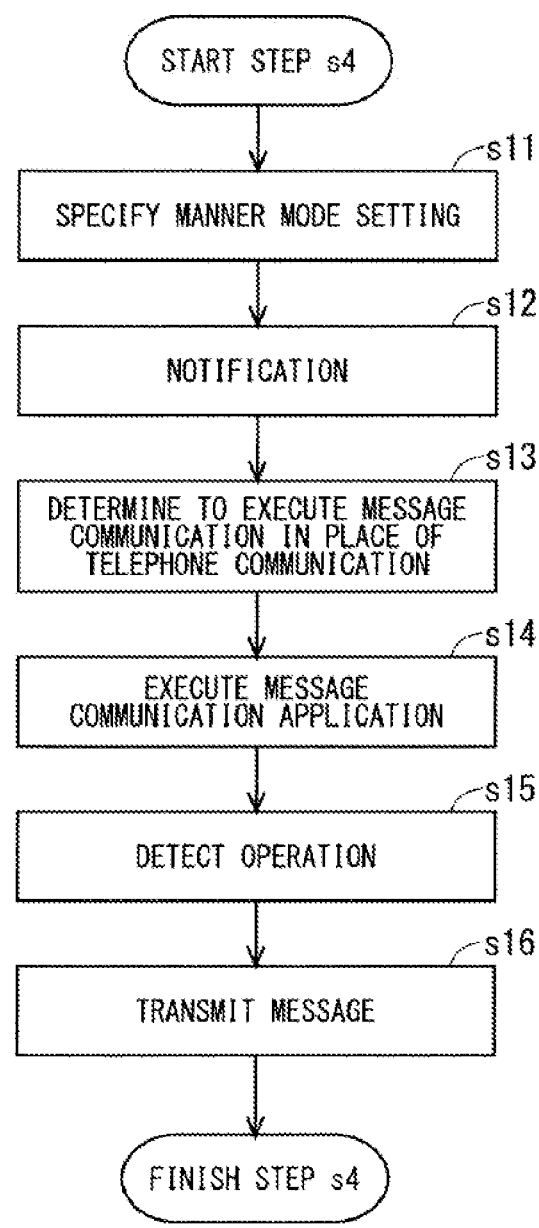
FIG. 10 illustrates a flow chart showing one example of an operation of the electronic apparatus.

FIG. 10 is a flow chart illustrating Step s4 according to the present example. FIG. 10 illustrates Step s4 in a case where the apparatus information includes manner mode setting information indicating that the target other side apparatus 10 is set to a manner mode. The manner mode setting information is a type of setting information of the electronic apparatus 10.

The manner mode is a mode in which an arrival sound of the telephone communication and message communication is not output from the electronic apparatus 10. That is to say, the manner mode is a mode in which the telephone arrival notification by sound and the message arrival notification by sound are not executed. The manner mode is referred to as a silent mode in some cases. The user performs a predetermined operation on the display surface 12, for example, thereby being able to set the electronic apparatus 10 to the manner mode. When the electronic apparatus 10 is set to the manner mode, the telephone arrival notification by vibration and the message arrival notification by vibration may be or may not be executed.

As illustrated in FIG. 10, in Step s11, the controller 100 of the instruction receiving apparatus 10 specifies that the target other side apparatus 10 is set to the manner mode based on the manner mode setting information included in the apparatus information of the target other side apparatus 10.

Figure 11:
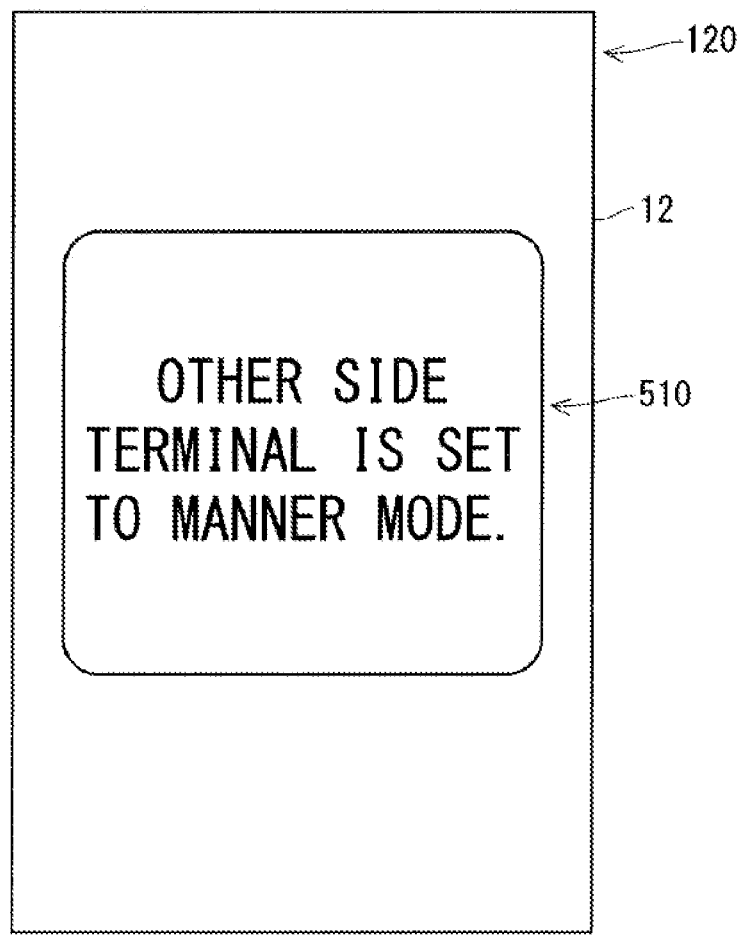
FIG. 11 illustrates a drawing showing one example of a display of the electronic apparatus.

Next, in Step s12, the controller 100 makes a notification unit included in the subject device notify that the target other side apparatus 10 is set to the manner mode. The display 120, for example, can be used as the notification unit. In Step s12, the controller 100 makes the display 120 display notification information 510 of notifying that the target other side apparatus 10 is set to the manner mode. FIG. 11 is a drawing showing a display example of the notification information 510.

After the controller 100 makes the display 120 display the notification information 510 for a predetermined period of time, in Step s13, the controller 100 determines to execute the message communication instead of the telephone communication corresponding to the transmission instruction in Step s1. Then, in Step s14, the controller 100 executes the message communication application in the storage 103. At this time, the controller 100 may execute the e-mail application or the IM application.

Next, in Step s15, the touch panel 130 detects a transmission destination selection operation of selecting a transmission destination of the massage, an input operation of the message, and a transmission instruction operation of the message (in other words, a sending instruction operation of the message) performed on the display surface 12. The user of the instruction receiving apparatus 10 selects the target other side apparatus 10 as a transmission destination of the message. After Step s15, the controller 100 transmits the message to the selected other side apparatus 10, that is to say, the target other side apparatus 10 in Step s16.

In the target other side apparatus 10 which has received the message from the transmission instruction receiving apparatus 10, the message communication application is activated, and the controller 100 makes the display 120 display the received message. Accordingly, the target other side user can confirm the message from the instruction receiving apparatus 10.

When the controller 100 executes the message communication application in Step s14, the controller 100 may automatically set the transmission destination of the message to the target other side apparatus 10. Accordingly, in Step s15, the user needs not perform the transmission destination selection operation on the display surface 12.

A unit other than the display 120 may be adopted as the notification unit notifying that the target other side apparatus 10 is set to the manner mode to the subject device user in Step s12. For example, the receiver 150, the speaker 160, or the vibrator 230 may be adopted as the notification unit. In this case, the receiver 150 or the speaker 160 outputs a sound which means that the target other side apparatus 10 is set to the manner mode. The vibrator 230 vibrates the apparatus case 11 in a specific vibration pattern, thereby notifying that the target other side apparatus 10 is set to the manner mode to the subject device user. The plurality of notification units may notify that the target other side apparatus 10 is set to the manner mode to the subject device user. For example, the display 120, the speaker 160, and the vibrator 230 may notify that the target other side apparatus 10 is set to the manner mode to the subject device user.

In an example hereinafter, the display 120 is described as the notification unit used in Step s4, however, as described above, at least one of the display 120, the receiver 150, the speaker 160, and the vibrator 230 may be used as the notification unit without a specific description.

It is not necessary to execute Step s12. That is to say, the notification unit needs not notify that the target other side apparatus 10 is set to the manner mode to the subject device user.

As described above, in the present example, the electronic apparatus 10 which has received the transmission instruction on the telephone communication with the other side apparatus 10 determines to execute the message communication instead of executing the telephone communication when the electronic apparatus 10 specifies that the other side apparatus 10 is set to the manner mode based on the apparatus information of the other side apparatus 10. There is a possibility that the user of the target other side apparatus 10, which is set to the manner mode, does not recognize the arrival of the telephone communication of the instruction receiving apparatus 10. As a result, there is a possibility that the user of the instruction receiving apparatus 10 cannot transfer the information to the user of the target other side apparatus 10. As the present example, when the target other side apparatus 10 is set to the manner mode, the instruction receiving apparatus 10 determines to perform the message communication in place of the telephone communication, thus the user of the target other side apparatus 10 can confirm the message from the instruction receiving apparatus 10. Increased accordingly is a possibility that the user of the instruction receiving apparatus 10 can transfer the information to the user of the target other side apparatus 10. As a result, the convenience of the electronic apparatus 10 is increased.

The notification unit such as the display 120 notifies that the target other side apparatus 10 is set to the manner mode to the subject device user, thus the convenience of the electronic apparatus 10 is increased.

Figure 12:
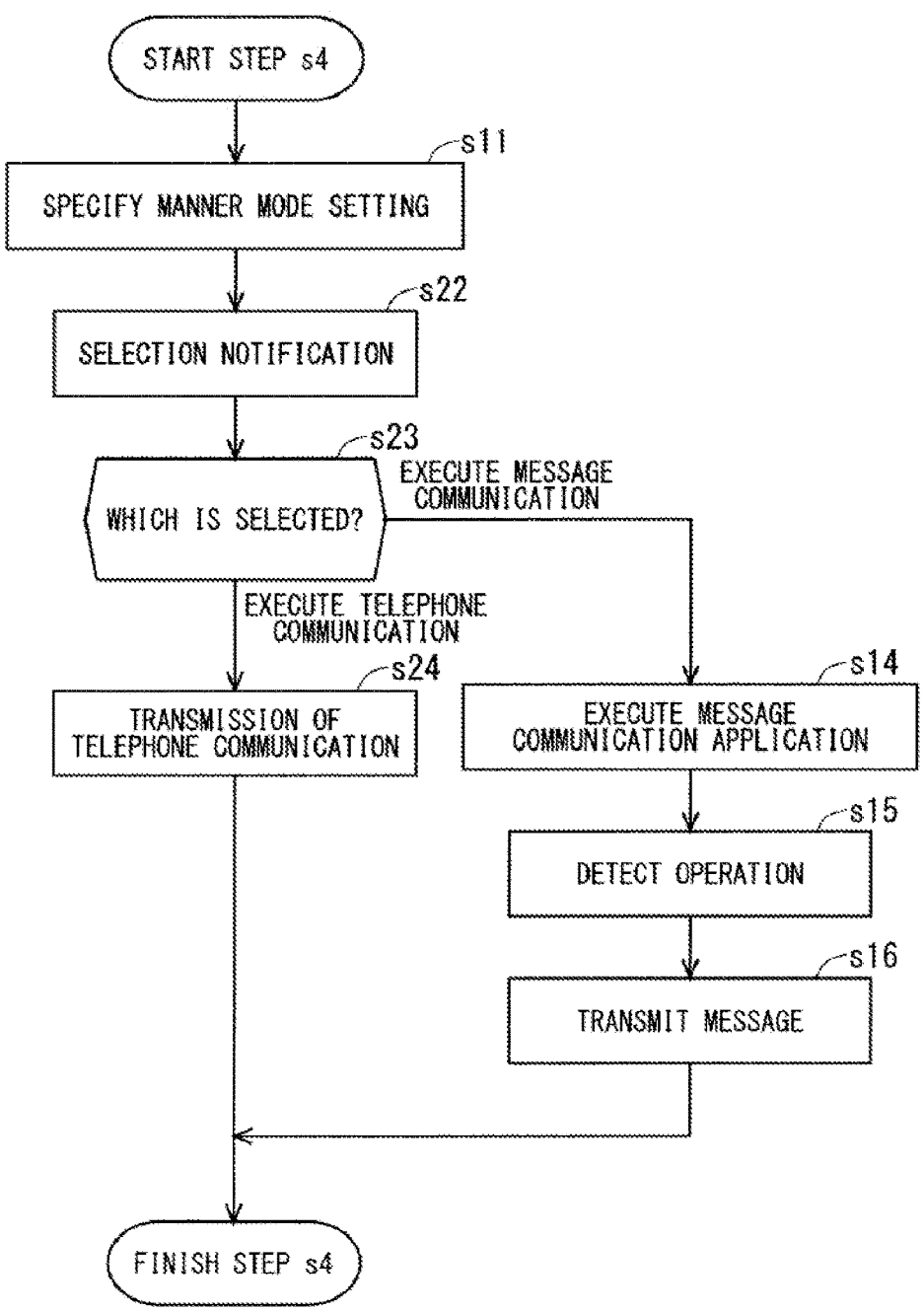
FIG. 12 illustrates a flow chart showing one example of an operation of the electronic apparatus.

FIG. 12 is a flow chart illustrating the other example of Step s4 in a case where the apparatus information includes the manner mode setting information. As illustrated in FIG. 12, when Step s11 described above is executed, in Step s22, the controller 100 makes the notification unit notify that the subject device user selects one of the execution of the telephone communication and the execution of the message communication. In Step s22, the controller 100 makes the display 120 display a selection screen 550 for the subject device user to select one of the execution of the telephone communication and the execution of the message communication, for example.

Figure 13:
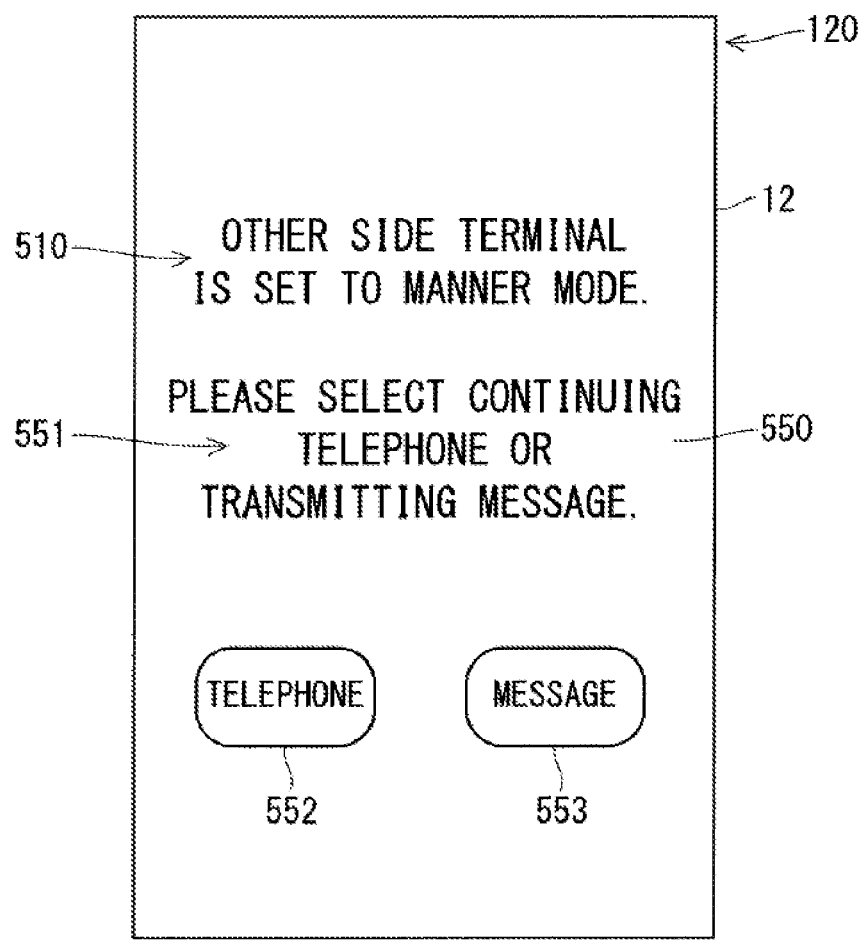
FIG. 13 illustrates a drawing showing one example of a display of the electronic apparatus.

FIG. 13 is a drawing illustrating one example of the selection screen 550. As illustrated in FIG. 13, the selection screen 550 includes, for example, the notification information 510 described above, instruction information 550, and selection buttons 552 and 553. The instruction information 551 is information of instructing to select one of the execution of the telephone communication and the execution of the message communication. The selection button 552 is a button operated by the user when the user selects the execution of the telephone communication. The selection button 553 is a button operated by the user when the user selects the execution of the message communication. The user performs a tap operation, for example, on the selection button 552, thereby being able to transmit the notification of selecting the execution of the telephone communication to the electronic apparatus 10. The user performs a tap operation, for example, on the selection button 553, thereby being able to transmit the notification of selecting the execution of the message communication to the electronic apparatus 10. The notification information 510 needs not be displayed on the selection screen 500.

After the selection screen 550 is displayed in Step s22, the controller 100 determines whether the subject device user selects the execution of the telephone communication or the execution of the message communication based on the detection result in the touch panel 130 in Step s23. The controller 100 determines that the subject device user selects the execution of the telephone communication when the touch panel 130 detects the operation performed on the selection button 552. In the meanwhile, the controller 100 determines that the subject device user selects the execution of the message communication when the touch panel 130 detects the operation performed on the selection button 553.

When it is determined that the execution of the telephone communication is selected in Step s23, the instruction receiving apparatus 10 performs the transmission of the telephone communication to the target other side apparatus 10 in Step s24. When the target other side apparatus 10 makes a response to the transmission of the telephone communication from the instruction receiving apparatus 10, the telephone communication is performed between the instruction receiving apparatus 10 and the target other side apparatus 10. In the instruction receiving apparatus 10, during the telephone communication, the sound being input to the microphone 170 is transmitted from the wireless communication unit 110 to the target other side apparatus 10. In the target other side apparatus 10, during the telephone communication, the sound received by the wireless communication unit 110 is output from the receiver 150 or the speaker 160. In the target other side apparatus 10, during the telephone communication, the sound being input to the microphone 170 is transmitted from the wireless communication unit 110 to the instruction receiving apparatus 10. In the instruction receiving apparatus 10, during the telephone communication, the sound received by the wireless communication unit 110 is output from the receiver 150 or the speaker 160.

In the meanwhile, when it is determined that the execution of the message communication is selected in Step s23, the instruction receiving apparatus 10 executes Steps s14 to s16 described above and transmits the message.

When the receiver 150, the speaker 160, or the vibrator 230 transmits the notification of selecting one of the execution of the telephone communication and the execution of the message communication to the subject device user in Step s22, the subject device user performs a predetermined operation on the display surface 12, thereby selecting one of the execution of the telephone communication and the execution of the message communication. Alternatively, the subject device user may input a predetermined sound to the microphone 170, thereby selecting one of the execution of the telephone communication and the execution of the message communication.

In this manner, in the example in FIG. 12, when the other side apparatus 10 in the telephone communication is set to the manner mode, the user of the electronic apparatus 10 can select whether the electronic apparatus 10 performs the telephone communication or the message communication after inputting the transmission instruction to the electronic apparatus 10. Thus, the convenience of the electronic apparatus 10 is increased.

Second Example

Figure 14:
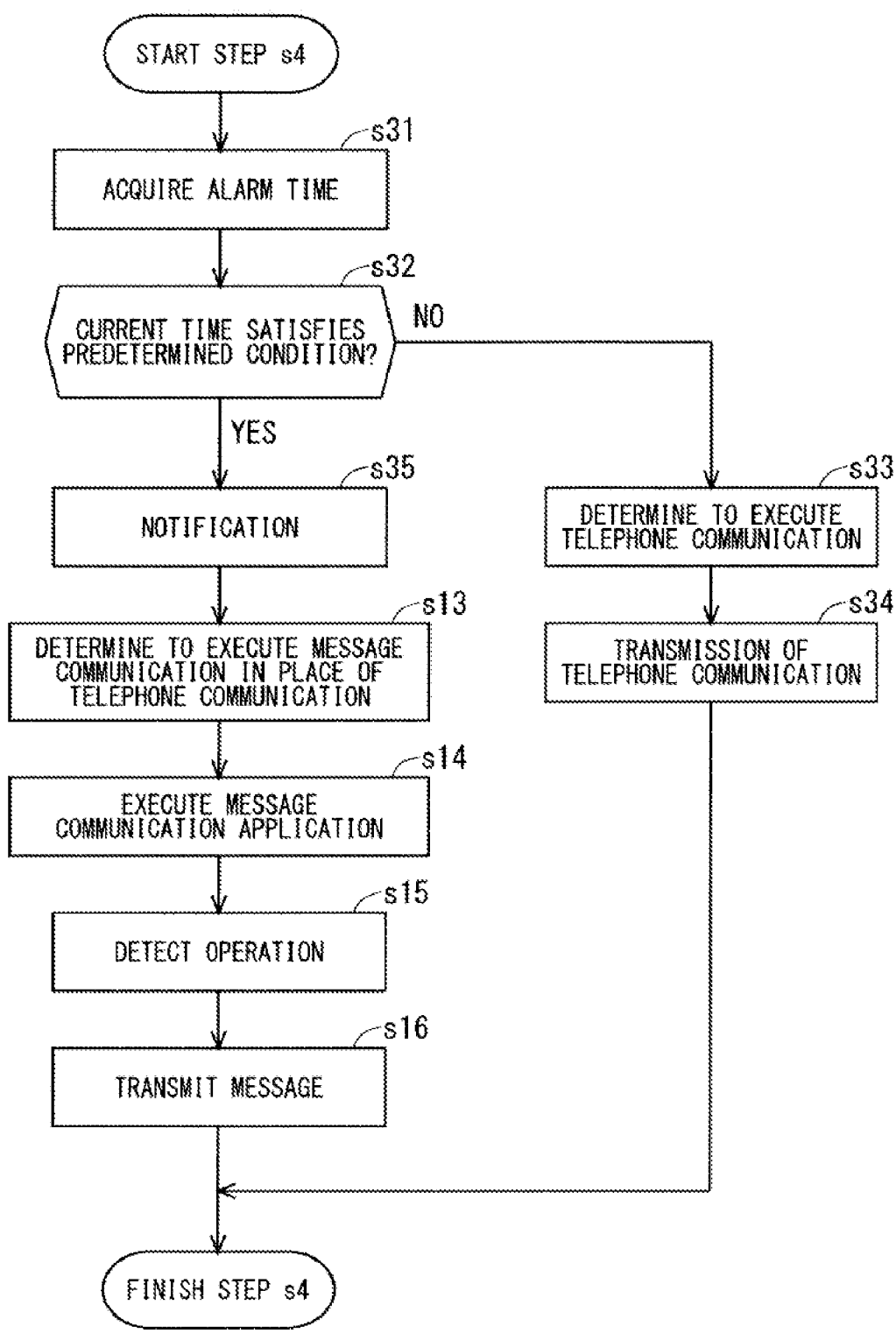
FIG. 14 illustrates a flow chart showing one example of an operation of the electronic apparatus.

FIG. 14 is a flow chart illustrating Step s4 according to the present example. FIG. 14 illustrates Step s4 in a case where the apparatus information includes an alarm time set in the target other side apparatus 10. The user performs a predetermined operation on the display surface 12, for example, thereby being able to set the alarm time in the electronic apparatus 10. In the electronic apparatus 10 in which the alarm time is set, the controller 100 outputs a sound from the speaker 160 to transmit a notification to the user when a current time coincides with the alarm time. The alarm time is a type of setting information of the electronic apparatus 10.

As illustrated in FIG. 14, in Step s31, when the controller 100 acquires the alarm time set in the target other side apparatus 10 from the apparatus information of the target other side apparatus 10, the controller 100 executes Step s32. In Step s32, the controller 100 determines whether or not the current time satisfies a predetermined condition based on the acquired alarm time. Specifically, the controller 100 determines whether or not the current time is included in a time period from a time, which is earlier by a predetermined time than the acquired alarm time, to the alarm time. Several hours, for example, are set as the predetermined time. For example, when the alarm time is seven in the morning and the predetermined time is two hours, the controller 100 determines whether or not the current time is included in the time period from five in the morning to seven in the morning.

If the determination is NO in Step s32, the controller 100 determines to execute the telephone communication in Step s33. Then, in Step s34, the instruction receiving apparatus 10 performs the transmission of the telephone communication to the target other side apparatus 10.

In the meanwhile, if the determination is YES in Step s32, Step s35 is executed. In Step s35, the controller 100 makes the notification unit execute a notification based on the acquired alarm time. In Step s35, the controller 100 makes the display 120 display other side information 560 regarding the target other side user or the target other side apparatus 10 based on the alarm time, for example.

Figure 15:
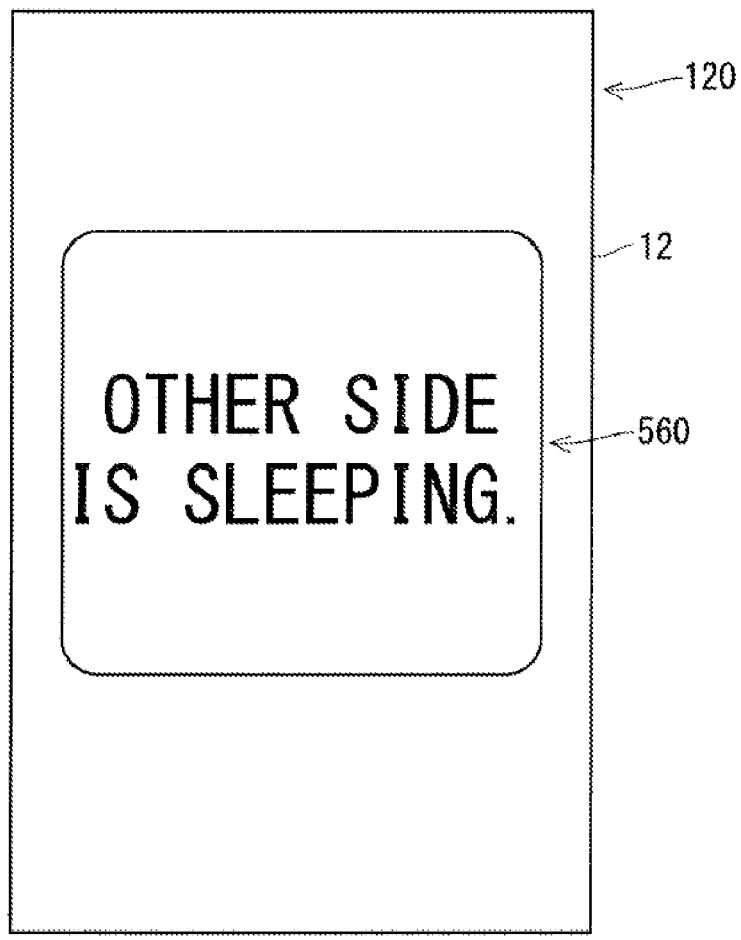
FIG. 15 illustrates a drawing showing one example of a display of the electronic apparatus.
Figure 16:
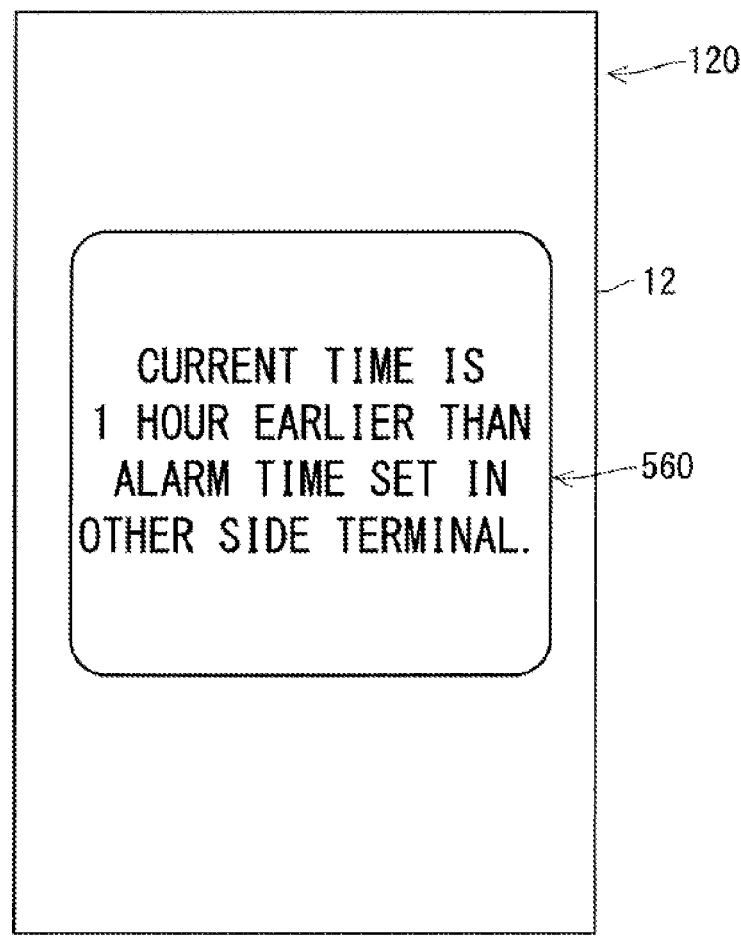
FIG. 16 illustrates a drawing showing one example of a display of the electronic apparatus.

FIGS. 15 and 16 are drawings each illustrating a display example of the other side information 560. The other side information 560 illustrated in FIG. 15 is information regarding the target other side user. The other side information 560 illustrated in FIG. 16 is information regarding the target other side apparatus 10. In the example in FIG. 15, the controller 100 determines that the target other side user is sleeping, for example, by reason that the current time is earlier than the alarm time. Then, the controller 100 makes the display 120 display the information indicating that the target other side user is sleeping as the other side information 560. In the example in FIG. 16, the controller 100 makes the display 120 display information indicating a relationship between the acquired alarm time, that is to say, the alarm time set in the target other side apparatus 10 and the current time as the other side information 560.

When the controller 100 makes the display 120 display the other side information 560 for a certain period of time in Step s35, Steps s13 to s16 described above are executed, and the message is transmitted from the instruction receiving apparatus 10. It is not necessary to execute Step s35.

In this manner, in the present example, the controller 100 determines to execute the message communication in place of executing the telephone communication when the controller 100 specifies that the current time is included in the time period from the time, which is earlier by the predetermined time than the alarm time set in the target other side apparatus 10, to the alarm time based on the apparatus information of the target other side apparatus 10. Accordingly, it is possible to reduce a possibility that the target other side apparatus 10 performs the arrival notification of the telephone communication on the target other side user in the time period to the alarm time. When the alarm time is a time at which the target other side user is scheduled to wake up, for example, it is possible to reduce a possibility that the target other side user who is sleeping receives the arrival notification of the telephone communication from the target other side apparatus 10. As a result, it is possible to reduce a possibility that the target other side user who is sleeping is awakened by the arrival notification of the telephone communication from the target other side apparatus 10. The instruction receiving apparatus 10 determines to execute the message communication when the current time is included in the time period to the alarm time, thus the user of the instruction receiving apparatus 10 can transmit the information to the user of the target other side apparatus 10. Thus, the convenience of the electronic apparatus 10 is increased.

The notification unit of the instruction receiving apparatus 10 transmits the notification based on the alarm time, thus the convenience of the electronic apparatus 10 is increased.

Figure 17:
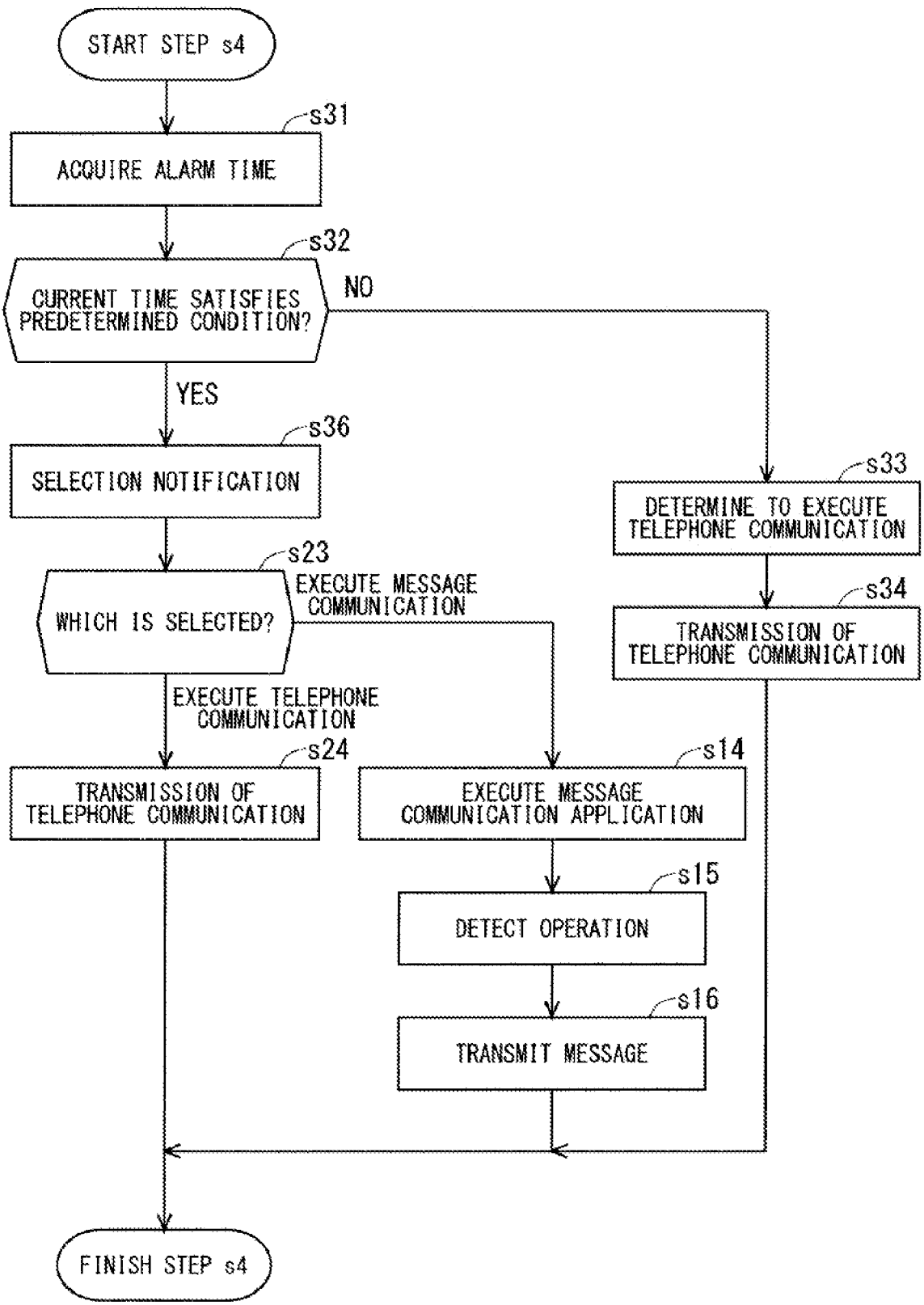
FIG. 17 illustrates a flow chart showing one example of an operation of the electronic apparatus.

FIG. 17 is a flow chart illustrating the other example of Step s4 in a case where the apparatus information includes the alarm time. As illustrated in FIG. 17, the instruction receiving apparatus 10 executes Steps s31 and s32 described above. If the determination is No in Step s32, the instruction receiving apparatus 10 executes Steps s33 and s34 described above. In the meanwhile, if the determination is YES in Step s32, the controller 100 executes Step s36.

In Step s36, the controller 100 makes the notification unit notify that the subject device user selects one of the execution of the telephone communication and the execution of the message communication. In Step s36, the controller 100 makes the display 120 display a selection screen 570 for the subject device user to select one of the execution of the telephone communication and the execution of the message communication, for example.

FIG. 18 is a drawing illustrating one example of the selection screen 570. As illustrated in FIG. 18, the selection screen 570 includes, for example, the other side information 560 described above, instruction information 551, and selection buttons 552 and 553. The notification information 560 needs not be displayed on the selection screen 570.

After the selection screen 570 is displayed in Step s36, Step s23 described above is executed, and it is determined whether the subject device user selects the execution of the telephone communication or the execution of the message communication. When it is determined that the execution of the telephone communication is selected in Step s23, Step s24 described above is executed, and the transmission of the telephone communication is performed. In the meanwhile, when it is determined that the execution of the message communication is selected in Step s23, the instruction receiving apparatus 10 executes Steps s14 to s16 described above and transmits the message.

In this manner, in the example in FIG. 17, when the current time is included in the time period to the alarm time set in the other side apparatus 10, the user of the electronic apparatus 10 can select whether the electronic apparatus 10 performs the telephone communication or the message communication after inputting the transmission instruction to the electronic apparatus 10. Thus, the convenience of the electronic apparatus 10 is increased.

In the examples in FIG. 14 and FIG. 17, in Step s16, the controller 100 may make the wireless communication unit 110 transmit a control signal to instruct the target other side apparatus 10 not to execute the message arrival notification by sound together with the message. In the target other side apparatus 10 which has received the message and the control signal, the controller 100 controls the target other side apparatus 10 so that the target other side apparatus 10 does not execute the message arrival notification by sound regardless of whether the other side apparatus 10 is set to or set not to execute the message arrival notification by sound.

In the examples in FIG. 14 and FIG. 17, in Step s16, the controller 100 may make the wireless communication unit 110 transmit a control signal to instruct the target other side apparatus 10 not to execute any of the message arrival notification by sound and the message arrival notification by vibration together with the message. In the target other side apparatus 10 which has received the message and the control signal, the controller 100 controls the target other side apparatus 10 so that the target other side apparatus 10 does not execute any of the message arrival notification by sound and the message arrival notification by vibration regardless of contents of the setting regarding the arrival notification.

When Step s16 is executed in each example subsequently described, the controller 100 may make the wireless communication unit 110 transmit a control signal to instruct the target other side apparatus 10 not to execute the message arrival notification by sound together with the message in Step s16 unless otherwise noted. The controller 100 may make the wireless communication unit 110 transmit a control signal to instruct the target other side apparatus 10 not to execute any of the message arrival notification by sound and the message arrival notification by vibration together with the message in Step s16.

In this manner, when the current time is included in the time period to the alarm time, the controller 100 controls the target other side apparatus 10 so that the target other side apparatus 10 does not execute the message arrival notification by sound, thus it is possible to reduce a possibility that the target other side user is notified of the message arrival sound from the target other side apparatus 10 in the time period to the alarm time. When the alarm time is a time at which the target other side user is scheduled to wake up, for example, it is possible to reduce a possibility that the target other side user who is sleeping gets bothered by the message arrival sound. Thus, the convenience of the electronic apparatus 10 is further increased. When the current time is included in the time period to the alarm time, the controller 100 controls the target other side apparatus 10 so that the target other side apparatus 10 does not also execute the message arrival notification by vibration, thus it is possible to reduce a possibility that the target other side user is notified of the message arrival sound and vibration from the target other side apparatus 10 in the time period to the alarm time. Thus, the convenience of the electronic apparatus 10 is further increased.

Third Example

Figure 19:
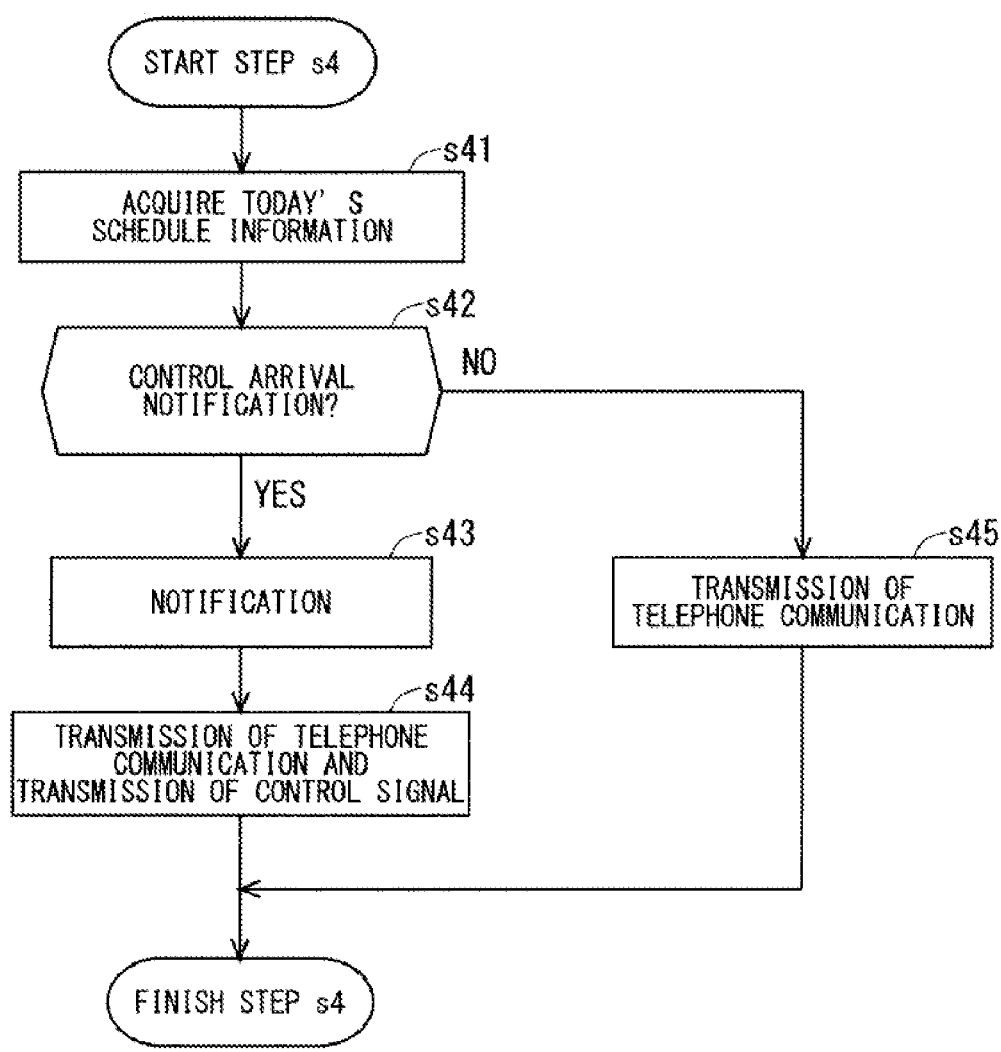
FIG. 19 illustrates a flow chart showing one example of an operation of the electronic apparatus.

FIG. 19 is a flow chart illustrating Step s4 according to the present example. FIG. 19 illustrates Step s4 in a case where the apparatus information includes schedule information registered in the target other side apparatus 10. The schedule information is a type of registration information of the electronic apparatus 10.

When the electronic apparatus 10 executes the schedule management application, the user operates the display surface 12, for example, thereby being able to register the schedule information in the electronic apparatus 10.

FIG. 20 is a drawing illustrating one example of schedule information 600 at a certain date. As illustrated in FIG. 20, the schedule information 600 includes a date 601 and plan information 602 indicating each plan at the date 601. There is the plan information 602 for each plan. The plan information 602 includes a period 603, a text 604, and a detailed content 605 for a plan thereof. In the example in FIG. 20, the schedule information 600 includes four pieces of plan information 602a to 602d indicating four plans of the user, respectively. The schedule information 600 is not limited to the example in FIG. 20.

As illustrated in FIG. 19, in Step s41, the controller 100 acquires today's schedule information 600 from the apparatus information of the target other side apparatus 10. Next, in Step s42, the controller 100 determines whether or not the telephone arrival notification in the target other side apparatus 10 is controlled based on the acquired today's schedule information 600.

In Step s42, when the controller 100 determines to control the telephone arrival notification in the target other side apparatus 10, the controller 100 makes the notification unit to transmit the notification of a current plan of the target other side user based on the acquired schedule information 600 in Step s43. In Step s43, the controller 100 makes the display 120 display notification information 580 of transmitting the notification of the current plan of the target other side user, for example. A display example of the notification information 580 is described hereinafter.

When the controller 100 makes the display 120 display the notification information 580 for a certain period of time, the controller 100 generates the control signal for performing control of the telephone arrival notification in the target other side apparatus 10 in Step s44. Then, the instruction receiving apparatus 10 performs the transmission of the telephone communication and transmits the generated control signal to the target other side apparatus 10.

In the target other side apparatus 10 at which the telephone communication has arrived from the instruction receiving apparatus 10, the controller 100 performs the telephone arrival notification corresponding to the control signal received from the instruction receiving apparatus 10 regardless of contents of the setting regarding the telephone arrival notification in the target other side apparatus 10.

In the meanwhile, when it is determined that the telephone arrival notification in the target other side apparatus 10 is not controlled in Step s42, the instruction receiving apparatus 10 performs the transmission of the telephone communication to the target other side apparatus 10 in Step s45. At this time, the control signal transmitted in Step s44 is not transmitted to the target other side apparatus 10. The target other side apparatus 10 at which the transmission in Step s45 has arrived performs the telephone arrival notification in accordance with the setting regarding the telephone arrival notification in the target other side apparatus 10. It is not necessary to execute Step s43.

In Step s42, for example, the controller 100 determines whether or not the target other side apparatus 10 may currently execute the telephone arrival notification by sound based on the current time and the schedule information 600. The controller 100 acquires the plan information 602 which includes the period 603 including the current time from the today's schedule information 600. That is to say, the controller 100 acquires the plan information 602 indicating a current plan of the target other side user from the schedule information 600. Then, the controller 100 determines whether or not the target other side apparatus 10 may currently execute the telephone arrival notification by sound based on the acquired plan information 602. When the controller 100 determines that the target other side apparatus 10 may currently execute the telephone arrival notification by sound, the controller 100 determines not to control the telephone arrival notification in the target other side apparatus 10. In the meanwhile, when the controller 100 determines that the target other side apparatus 10 may not preferably execute the telephone arrival notification by sound currently, the controller 100 determines to control the telephone arrival notification in the target other side apparatus 10.

Considered, for example, is a case where the today's schedule information 600 is the schedule information 600 illustrated in FIG. 20. When the current time is half past nine in the morning, for example, in Step s42, the controller 100 acquires the plan information 602a from the schedule information 600. Then, the controller 100 determines that the target other side user currently conducts a meeting from the text 604 and the detailed content 605 included in the plan information 602a. When the controller 100 determines that the target other side user currently conducts a meeting, the controller 100 determines that the target other side apparatus 10 may not preferably execute the telephone arrival notification by sound currently. Then, the controller 100 determines to control the telephone arrival notification in the target other side apparatus 10.

When the current time is four in the afternoon, for example, in Step s42, the controller 100 acquires the plan information 602c from the schedule information 600. Then, the controller 100 determines that the target other side user is currently in negotiation from the text 604 and the detailed content 605 included in the plan information 602c. When the controller 100 determines that the target other side user is currently in negotiation, the controller 100 determines that the target other side apparatus 10 may not preferably execute the telephone arrival notification by sound currently. Then, the controller 100 determines to control the telephone arrival notification in the target other side apparatus 10.

In the meanwhile, when the current time is eight in the evening, for example, in Step s42, the controller 100 acquires the plan information 602d from the schedule information 600. Then, the controller 100 determines that the target other side user is currently present at a farewell party from the text 604 and the detailed content 605 included in the plan information 602d. When the controller 100 determines that the target other side user is currently present at a farewell party, the controller 100 determines that the target other side apparatus 10 may currently execute the telephone arrival notification by sound. Then, the controller 100 determines not to control the telephone arrival notification in the target other side apparatus 10.

In Step s42, when the controller 100 determines to control the telephone arrival notification in the target other side apparatus 10, the controller 100 executes Step s43. Then, in Step s44, the controller 100 generates the control signal of instructing not to execute the telephone arrival notification by sound, for example. In Step s44, the instruction receiving apparatus 10 performs the transmission of the telephone communication and transmits the generated control signal to the target other side apparatus 10.

In the target other side apparatus 10 at which the telephone communication has arrived from the instruction receiving apparatus 10, the controller 100 controls the target other side apparatus 10 so that the target other side apparatus 10 does not execute the telephone arrival notification by sound in accordance with the control signal received by the target other side apparatus 10 regardless of whether the target other side apparatus 10 is set to or set not to execute the telephone arrival notification by sound.

Figure 21:
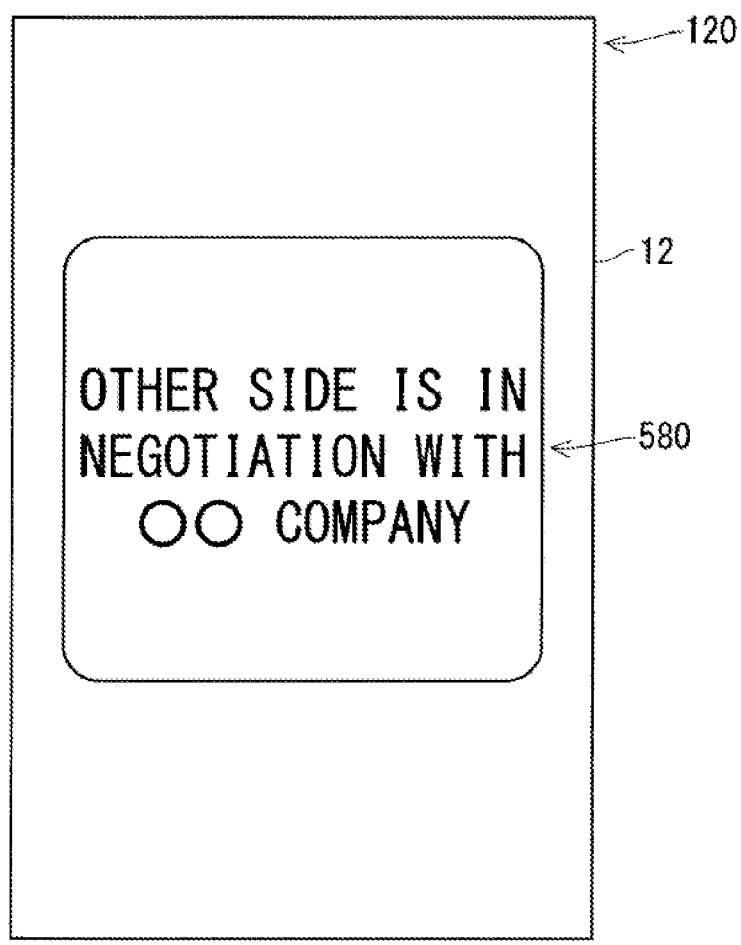
FIG. 21 illustrates a drawing showing one example of a display of the electronic apparatus.

In Step s43, the controller 100 makes the display 120 display the notification information 580 based on the plan information 602 acquired from the schedule information 600 in Step s42, that is to say, the plan information 602 indicating the current plan of the target other side user, for example. FIG. 21 is a drawing showing a display example of the notification information 580. Displayed in the example in FIG. 21 is the notification information 580 transmitting the notification of the current plan of the target other side user based on the plan information 602c illustrated in FIG. 20.

When the target other side apparatus 10 may not preferably execute the telephone arrival notification by sound, the target other side apparatus 10 may not also preferably execute the telephone arrival notification by vibration in some cases. In Step s44, the instruction receiving apparatus 10 may transmit, to the target other side apparatus 10, the control signal of instructing not to execute any of the telephone arrival notification by sound and the telephone arrival notification by vibration. In this case, the target other side apparatus 10 does not perform any of the telephone arrival notification by sound and the telephone arrival notification by vibration during the telephone arrival regardless of contents of the setting regarding the telephone arrival notification.

When the controller 100 cannot acquire the plan information 602 including the period 603 including the current time from the schedule information 600, in other words, when the controller 100 cannot acquire the plan information 602 indicating the current plan of the target other side user, the controller 100 may determine to control the telephone arrival notification in the target other side apparatus 10 or may determine not to control the telephone arrival notification in the target other side apparatus 10.

In this manner, the controller 100 controls the telephone arrival notification in the target other side apparatus 10 based on the schedule information registered in the target other side apparatus 10, thus the target other side apparatus 10 can perform the telephone arrival notification corresponding to a state of the target other side user. Thus, the convenience of the electronic apparatus 10 is increased.

The notification unit of the instruction receiving apparatus 10 transmits the notification of the current plan of the target other side user, thus the convenience of the electronic apparatus 10 is increased.

The user may set, in the electronic apparatus 10, a disclosure range of the schedule information disclosed to the other electronic apparatus 10. Then, the instruction receiving apparatus 10 may make the notification unit transmit the notification of the current plan of the target other side user in accordance with the disclosure range set in the target other side apparatus 10.

For example, when a disclosure level indicating the disclosure range is "0", only the text 604 in the schedule information 600 can be disclosed. When the disclosure level is "1", the text 604 and detailed content 605 in the schedule information 600 can be disclosed. The user operates the display surface 12, for example, thereby being able to set the disclosure level in the electronic apparatus 10. Then, the electronic apparatus 10 transmits the apparatus information including a value of the disclosure level, which has been set, to the server device 50 or the other side apparatus 10. The value of the disclosure level is a type of setting information of the electronic apparatus 10.

Figure 22:
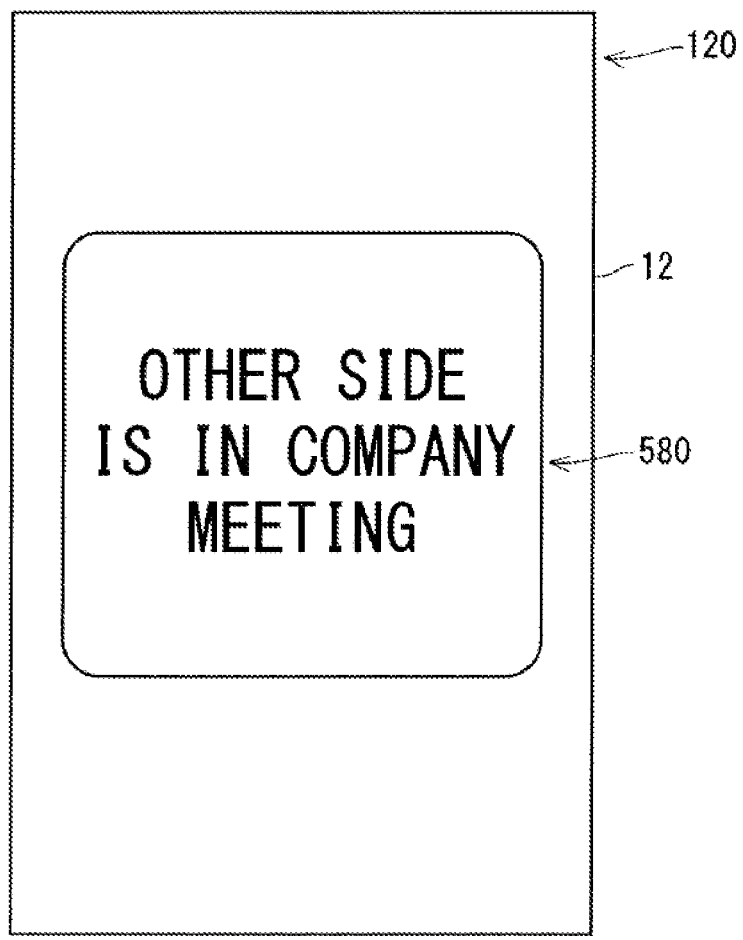
FIG. 22 illustrates a drawing showing one example of a display of the electronic apparatus.

In Step s41, the controller 100 of the instruction receiving apparatus 10 acquires the today's schedule information 600 and the value of the disclosure level from the apparatus information of the target other side apparatus 10. Then, if the determination is YES in Step s42, the controller 100 makes the notification unit transmit the notification of the current plan of the target other side user in accordance with the acquired value of the disclosure level in Step s43. That is to say, the controller 100 makes the notification unit transmit the notification of the current plan of the target other side user in accordance with the disclosure range of the schedule information 600 specified from the apparatus information of the target other side apparatus 10. For example, when the value of the disclosure level is "1", the controller 100 makes the notification unit transmit the notification of the current plan of the target other side user based on the text 604 and the detailed content 605 included in the plan information 602 indicating the current plan. Considered, for example, is a case of making the notification unit transmit the notification of the current plan of the target other side user based on the plan information 602c illustrated in FIG. 20 described above. When the value of the disclosure level is "1", as illustrated in FIG. 21 described above, displayed is the notification information 580 based on the text 604 and the detailed content 605 included in the plan information 602c. In the meanwhile, when the value of the disclosure level is "0", the controller 100 makes the notification unit transmit the notification of the current plan of the target other side user based on only the text 604 in the plan information 602 indicating the current plan. Considered, for example, is a case of making the notification unit transmit the notification of the current plan of the target other side user based on the plan information 602a illustrated in FIG. 20 described above. When the value of the disclosure level is "0", as illustrated in FIG. 22, displayed is the notification information 580 based on the text 604 included in the plan information 602a.

In this manner, the notification unit of the instruction receiving apparatus 10 transmits, to the subject device user, the notification of the current plan of the target other side user in accordance with the disclosure range of the schedule information, thus it is possible to reduce a possibility that information, a disclosure of which is not desired, in the schedule information is disclosed by the instruction receiving apparatus 10. Thus, the convenience of the electronic apparatus 10 is increased.

The disclosure range of the information such as the schedule information acquired from the target other side apparatus 10 may be set in the instruction receiving apparatus 10. For example, after the instruction receiving apparatus 10 acquires the schedule information from the target other side apparatus 10, the instruction receiving apparatus 10 may make the display 120 display the notification information 580 in accordance with the preset disclosure range based on the acquired schedule information. The instruction receiving apparatus 10 may acquire, from the target other side apparatus 10, the schedule information limited by the target other side apparatus 10 itself in accordance with the disclosure range.

Figure 23:
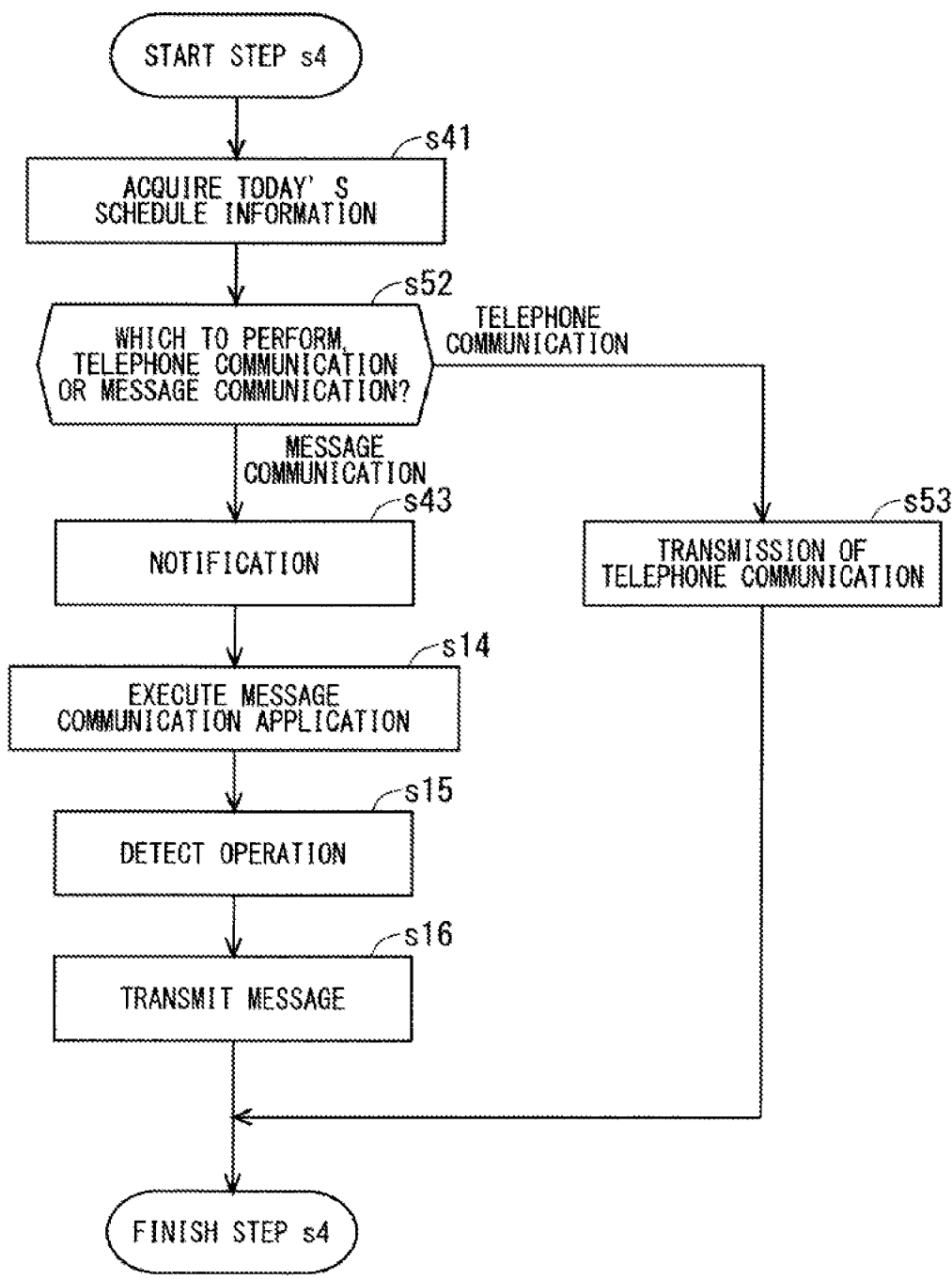
FIG. 23 illustrates a flow chart showing one example of an operation of the electronic apparatus.

FIG. 23 is a flow chart illustrating the other example of Step s4 in a case where the apparatus information includes schedule information registered in the target other side apparatus 10. As illustrated in FIG. 23, when Step s41 described above is executed, the controller 100 determines which to perform, the telephone communication or the message communication, based on the acquired schedule information 600.

In Step s52, the controller 100 determines whether or not the execution of the telephone communication is appropriate based on the schedule information 600 and the current time. The controller 100 acquires the plan information 602 which includes the period 603 including the current time from the today's schedule information 600. That is to say, the controller 100 acquires the plan information 602 indicating a current plan from the schedule information 600. Then, the controller 100 determines whether or not the execution of the telephone communication is appropriate based on the acquired plan information 602 and the current time. The controller 100 determines to execute the telephone communication when the execution of the telephone communication is appropriate. In the meanwhile, the controller 100 determines to execute the message communication when the execution of the telephone communication is not appropriate.

Considered, for example, is a case where the today's schedule information 600 is the schedule information 600 illustrated in FIG. 20. When the current time is half past ten in the morning, for example, in Step s52, the controller 100 acquires the plan information 602a from the schedule information 600. Then, the controller 100 determines that the target other side user currently conducts a meeting from the text 604 and the detailed content 605 included in the plan information 602a. When the controller 100 determines that the target other side user currently conducts a meeting, the controller 100 determines that the execution of the telephone communication is not appropriate. Then, the controller 100 determines to execute the message communication.

In the meanwhile, when the current time is half past eight in the evening, for example, in Step s42, the controller 100 acquires the plan information 602d from the schedule information 600. Then, the controller 100 determines that the target other side user is currently present at a farewell party from the text 604 and the detailed content 605 included in the plan information 602d. When the controller 100 determines that the target other side user is currently at the farewell party, the controller 100 determines that the execution of the telephone communication is appropriate. Then, the controller 100 determines to execute the telephone communication.

When the execution of the telephone communication is determined in Step s52, the instruction receiving apparatus 10 performs the transmission of the telephone communication to the target other side apparatus 10 in Step s53. In the meanwhile, when the execution of the message communication is determined in Step s52, Step s43 described above is executed and the notification of the current plan of target other side user is transmitted from the notification unit. Subsequently, Steps s14 to s16 described above are executed, and the message is transmitted to the target other side apparatus 10.

In this manner, in the example in FIG. 23, the controller 100 determines which to perform, the telephone communication or the message communication, based on the schedule information 600 registered in the target other side apparatus 10, thus the instruction receiving apparatus 10 can perform the communication corresponding to a state of the target other side user. Thus, the convenience of the electronic apparatus 10 is increased.

Figure 24:
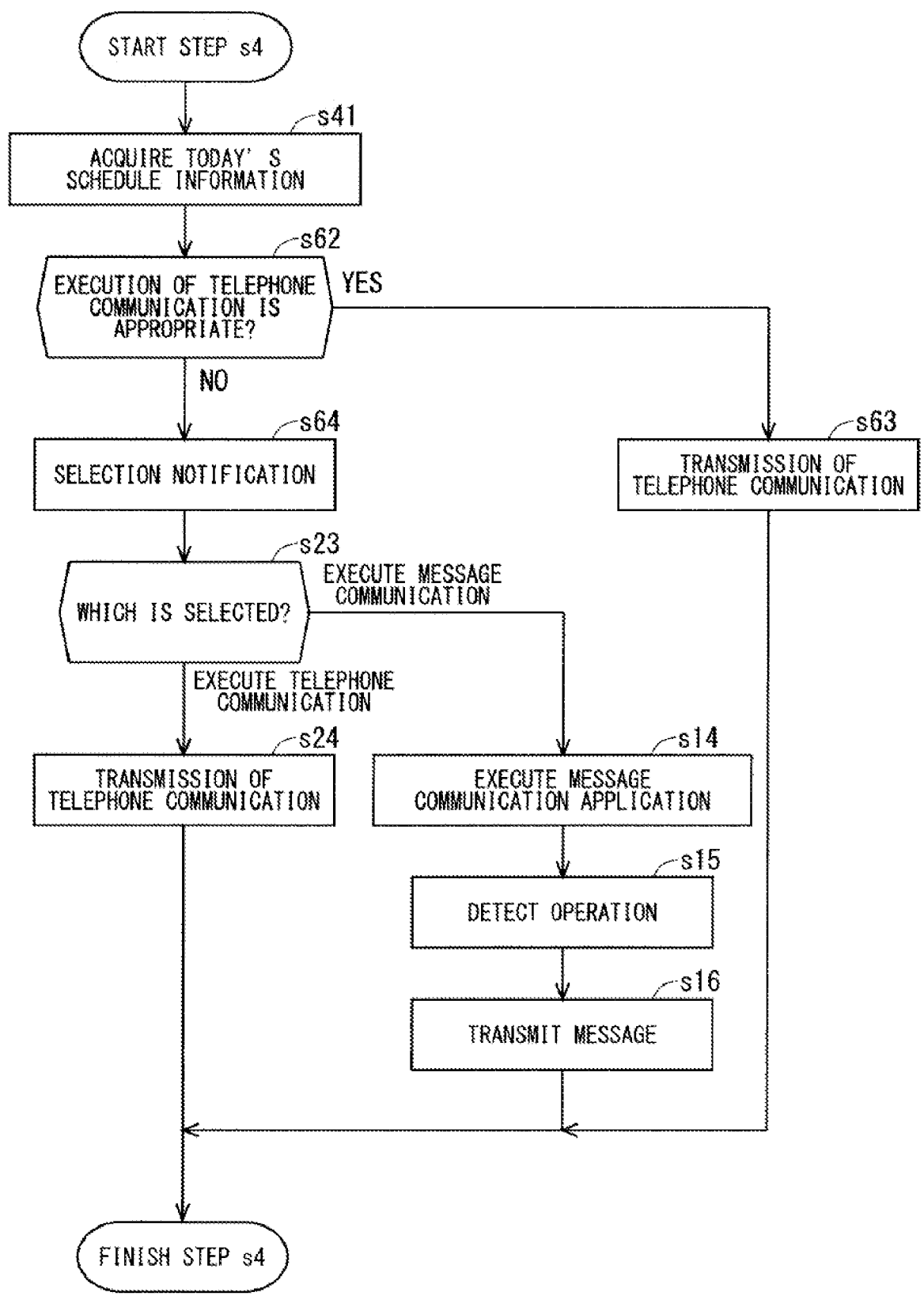
FIG. 24 illustrates a flow chart showing one example of an operation of the electronic apparatus.

FIG. 24 is a flow chart illustrating the other example of Step s4 in a case where the apparatus information includes schedule information registered in the target other side apparatus 10. As illustrated in FIG. 24, after Step s41 described above is executed, in Step s62, the controller 100 determines whether or not the execution of the telephone communication is appropriate based on the acquired schedule information and the current time in the manner similar to Step s52 described above.

If the determination is YES in Step s62, the instruction receiving apparatus 10 performs the transmission of the telephone communication to the target other side apparatus 10 in Step s63. In the meanwhile, if the determination is NO in Step s62, the controller 100 executes Step s64.

In Step s64, the controller 100 makes the notification unit notify that the subject device user selects one of the execution of the telephone communication and the execution of the message communication. In Step s64, the controller 100 makes the display 120 display a selection screen 590 for the subject device user to select one of the execution of the telephone communication and the execution of the message communication, for example.

Figure 25:
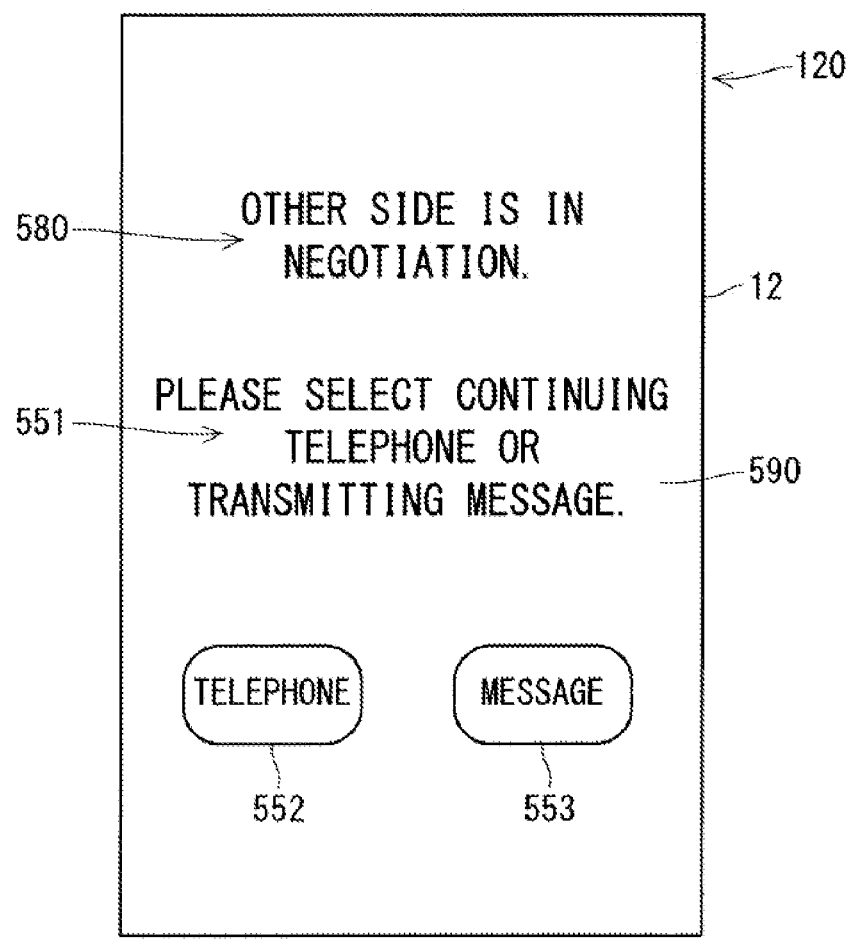
FIG. 25 illustrates a drawing showing one example of a display of the electronic apparatus.

FIG. 25 is a drawing illustrating one example of the selection screen 590. As illustrated in FIG. 25, the selection screen 590 includes, for example, the notification information 580 described above, instruction information 551, and selection buttons 552 and 553. The notification information 580 needs not be displayed on the selection screen 590.

When the controller 100 can acquire the value of the disclosure level from the apparatus information of the target other side apparatus 10, the controller 100 may indicate the notification information 580 indicating the current plan of the target other side user in the selection screen 590 in accordance with the disclosure range of the schedule information 600. When the value of the disclosure level is "0" and the plan information 602 indicating the current plan is the plan information 602c illustrated in FIG. 20, the notification information 580 illustrated in FIG. 25 is shown in the selection screen 590, for example.

After the selection screen 590 is displayed in Step s64, Step s23 described above is executed. When it is determined that the execution of the telephone communication is selected in Step s23, Step s24 described above is executed, and the transmission of the telephone communication is performed. In the meanwhile, when it is determined that the execution of the message communication is selected in Step s23, the instruction receiving apparatus 10 executes Steps s14 to s16 described above and transmits the message.

In this manner, in the example in FIG. 24, when the instruction receiving apparatus 10 determines that the execution of the telephone communication is not appropriate based on the schedule information, the user of the instruction receiving apparatus 10 can select whether the instruction receiving apparatus 10 performs the telephone communication or the message communication. Thus, the convenience of the electronic apparatus 10 is increased.

Fourth Example

Figure 26:
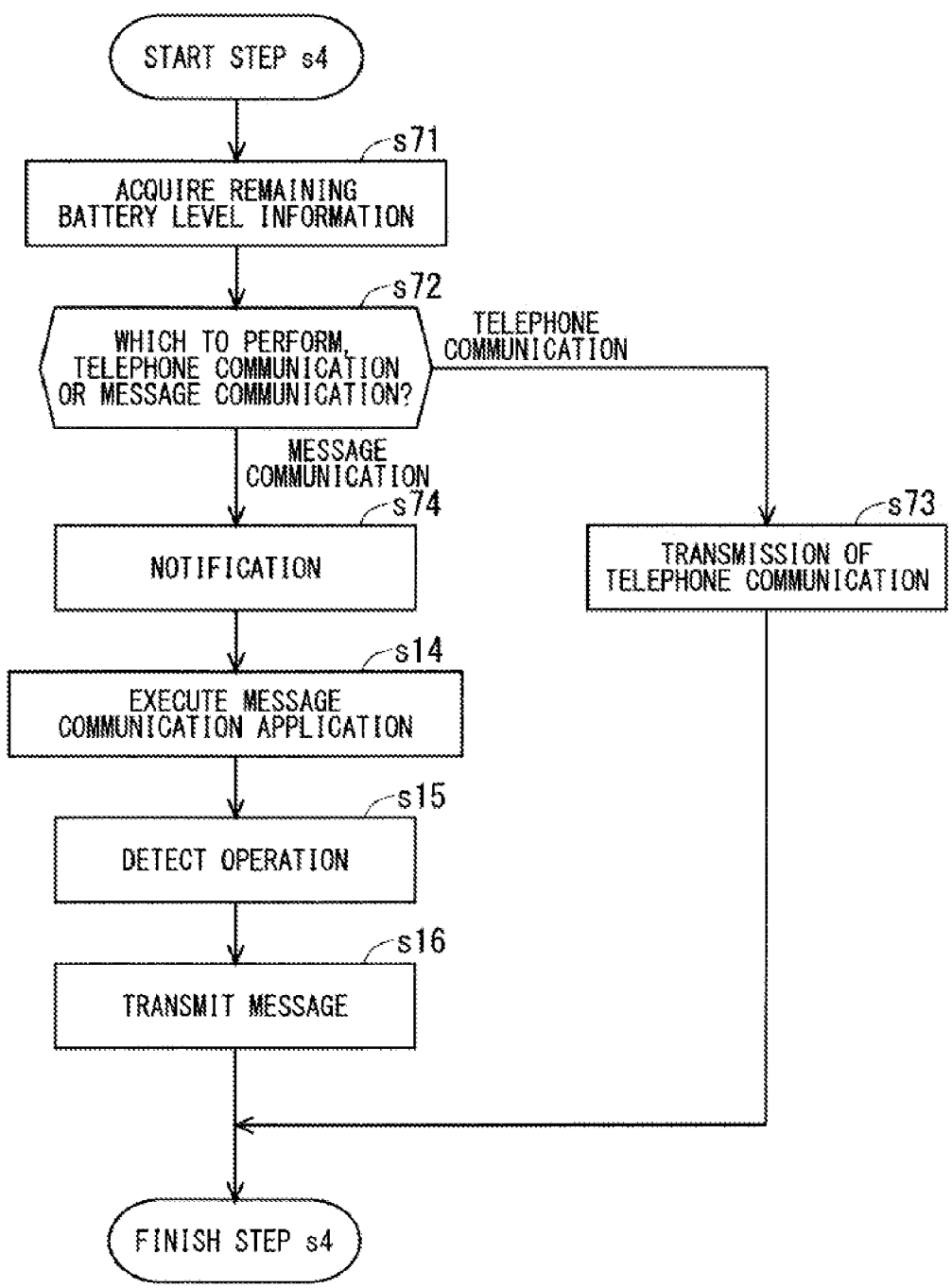
FIG. 26 illustrates a flow chart showing one example of an operation of the electronic apparatus.

FIG. 26 is a flow chart illustrating Step s4 according to the present example. FIG. 26 illustrates Step s4 in a case where the apparatus information includes remaining battery level information indicating a remaining battery level of the battery 240 in the target other side apparatus 10. The remaining battery level information is a type of apparatus state information of the electronic apparatus 10. As illustrated in FIG. 26, in Step s71, when the controller 100 acquires the remaining battery level information from the apparatus information of the target other side apparatus 10, the controller 100 executes Step s72.

In Step s72, the controller 100 determines which to perform, the telephone communication or the message communication, based on the acquired remaining battery level information. The controller 100 determines to execute the message communication when the remaining battery level indicated by the remaining battery level information is equal to or smaller than a threshold value. In the meanwhile, the controller 100 determines to execute the telephone communication when the remaining battery level indicated by the remaining battery level information is larger than the threshold value. The controller 100 may determine to execute the message communication when the remaining battery level is smaller than the threshold value, and execute the telephone communication when the remaining battery level is equal to or larger than the threshold value. The remaining battery level information may include a mark indicating a degree of the remaining battery level of the battery 240 of the target other side apparatus 10. This mark may be made up of at least one of a character, number, and symbol, for example. For example, in a case where the target other side apparatus 10 transmits the remaining battery level information to the instruction receiving apparatus 10, when the target other side apparatus 10 determines that the remaining battery level of the subject device is larger than a threshold value, the target other side apparatus 10 transmits the remaining battery level information including a mark indicating that "the remaining level is high" to the instruction receiving apparatus 10. In the case where the target other side apparatus 10 transmits the remaining battery level information to the instruction receiving apparatus 10, when the target other side apparatus 10 determines that the remaining battery level of the subject device is smaller than the threshold value, the target other side apparatus 10 transmits the remaining battery level information including a mark indicating that "the remaining level is low" to the instruction receiving apparatus 10. When the controller 100 acquires the remaining battery level information including the mark indicating that "the remaining level is low" from the target other side apparatus 10, the controller 100 may determine to execute the message communication. When the controller 100 acquires the remaining battery level information including the mark indicating that "the remaining level is high" from the target other side apparatus 10, the controller 100 may determine to execute the telephone communication.

When the execution of the telephone communication is determined in Step s72, the instruction receiving apparatus 10 performs the transmission of the telephone communication to the target other side apparatus 10 in Step s73. In the meanwhile, when the execution of the message communication is determined in Step s72, Step s74 is executed.

Figure 27:
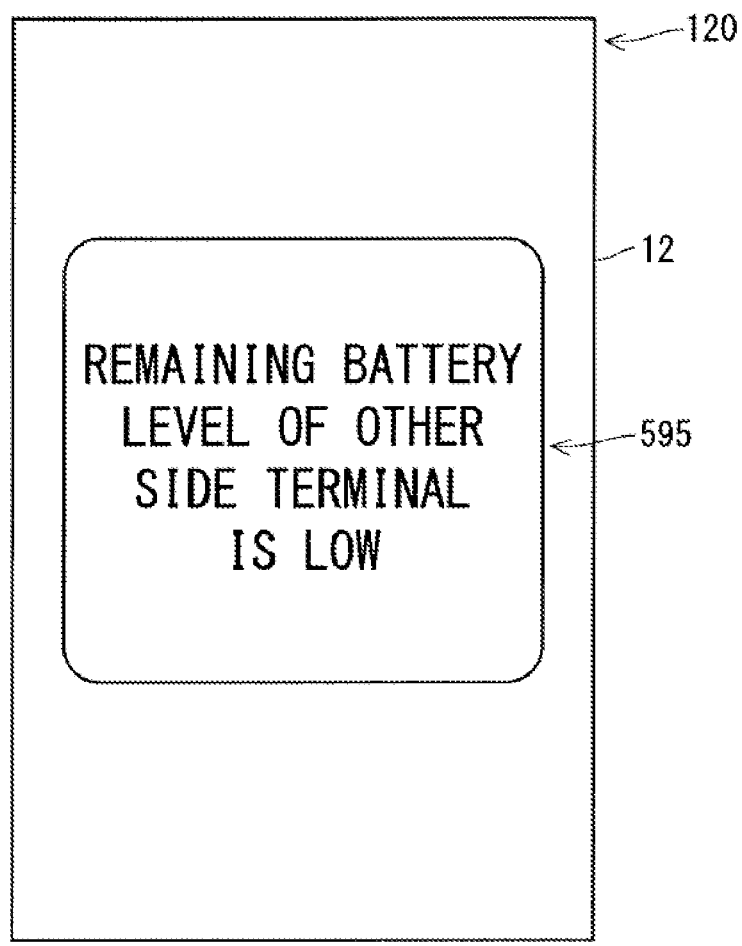
FIG. 27 illustrates a drawing showing one example of a display of the electronic apparatus.

In Step s74, the controller 100 makes the notification unit notify that the remaining battery level is low. In Step s74, the controller 100 makes the display 120 display notification information 595 of notifying that the remaining battery level is low, for example. FIG. 27 is a drawing showing a display example of the notification information 595.

When the notification information 595 is displayed in the display 120 for a certain period of time, Steps s14 to s16 are executed and the message is transmitted from the instruction receiving apparatus 10. It is not necessary to execute Step s74.

In this manner, in the present example, the controller 100 determines which to perform, the telephone communication or the message communication, based on the remaining battery level information of the target other side apparatus 10. Accordingly, the instruction receiving apparatus 10 can perform the communication in accordance with the remaining battery level of the target other side apparatus 10. As a result, the instruction receiving apparatus 10 can perform the message communication with the target other side apparatus 10 when the remaining battery level of the target other side apparatus 10 is low. In the case where the remaining battery level of the target other side apparatus 10 is low, if the instruction receiving apparatus 10 starts the telephone communication with the target other side apparatus 10, there is a possibility that the telephone communication is disconnected, and the user of the instruction receiving apparatus 10 cannot appropriately transfer the information to the target other side user. In the case where the remaining battery level of the target other side apparatus 10 is low, the instruction receiving apparatus 10 performs the message communication, thus it is possible to increase a possibility that the user of the instruction receiving apparatus 10 can appropriately transfer the information to the target other side user using the instruction receiving apparatus 10. Thus, the convenience of the electronic apparatus 10 is increased.

Figure 28:
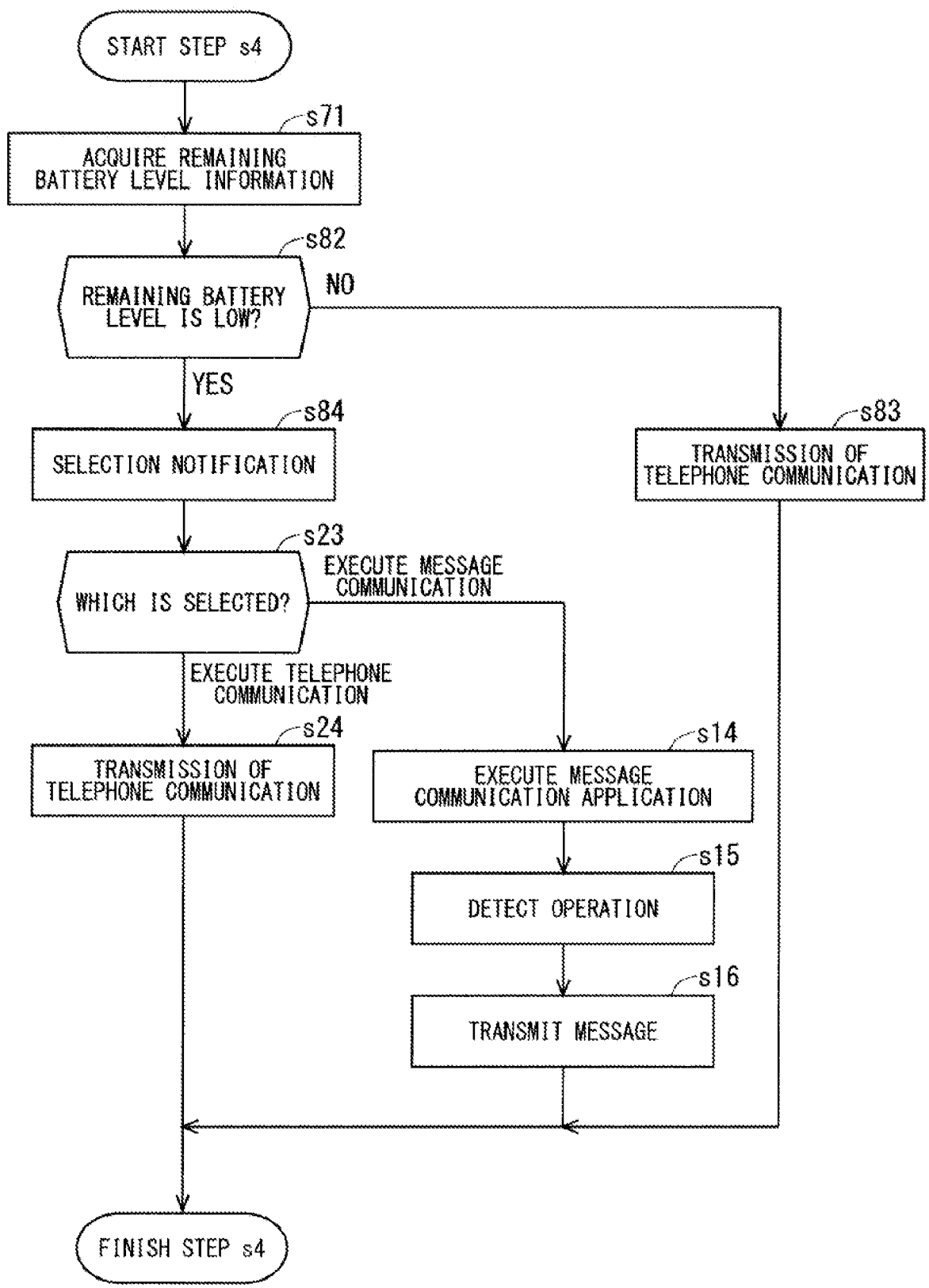
FIG. 28 illustrates a flow chart showing one example of an operation of the electronic apparatus.
Figure 29:
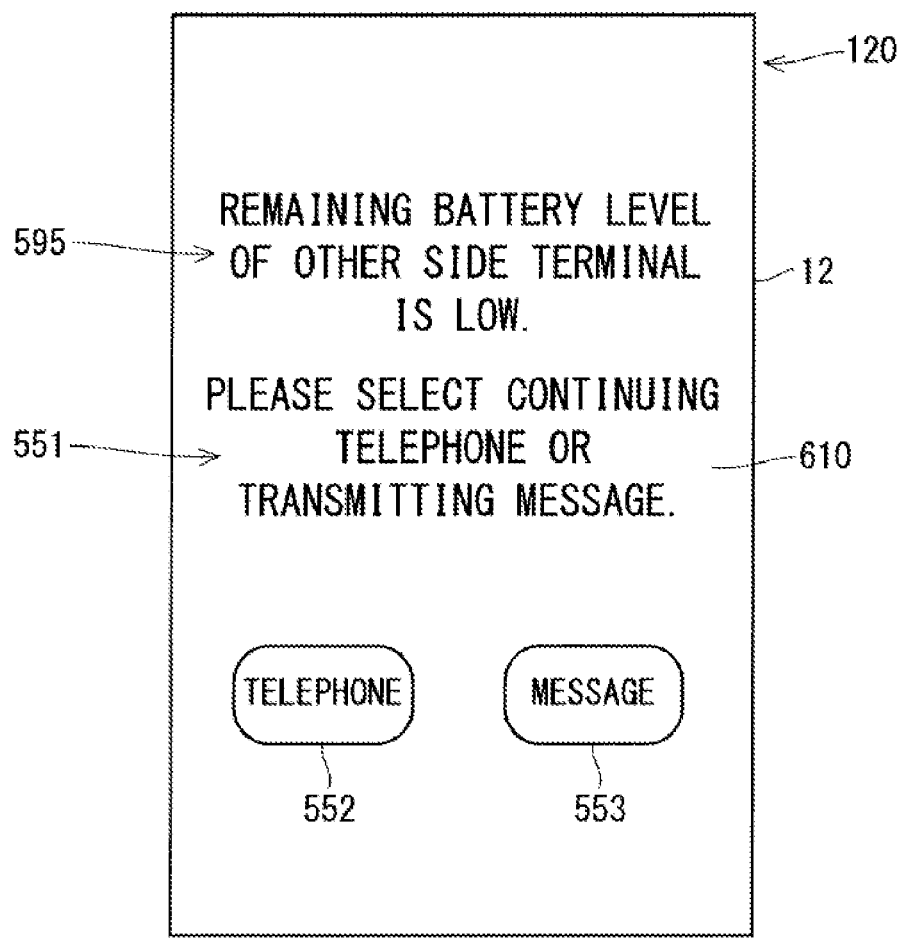
FIG. 29 illustrates a drawing showing one example of a display of the electronic apparatus.

FIG. 28 is a flow chart illustrating the other example of Step s4 in a case where the apparatus information includes the remaining battery level information of the target other side apparatus 10. As illustrated in FIG. 29, when Step s71 described above is executed, the controller 100 determines whether or not the remaining battery level of the target other side apparatus 10 is low based on the acquired the remaining battery level information in Step s82. When the remaining battery level indicated by the remaining battery level information is equal to or smaller than the threshold value, the controller 100 determines that the remaining battery level is low. In the meanwhile, when the remaining battery level indicated by the remaining battery level information is larger than the threshold value, the controller 100 determines that the remaining battery level is not low. The controller 100 may determine that the remaining battery level is low when the remaining battery level is smaller than the threshold value and determine that the remaining battery level is not low when the remaining battery level is equal to or larger than the threshold value.

If the determination is NO in Step s82, the instruction receiving apparatus 10 performs the transmission of the telephone communication to the target other side apparatus 10 in Step s83. In the meanwhile, if the determination is YES in Step s82, Step s84 is executed.

In Step s84, the controller 100 makes the notification unit notify that the subject device user selects one of the execution of the telephone communication and the execution of the message communication. In Step s84, the controller 100 makes the display 120 display a selection screen 610 for the subject device user to select one of the execution of the telephone communication and the execution of the message communication, for example.

FIG. 29 is a drawing illustrating one example of the selection screen 610. As illustrated in FIG. 29, the selection screen 610 includes, for example, the notification information 595 described above, instruction information 551, and selection buttons 552 and 553. The notification information 595 needs not be displayed on the selection screen 610.

After the selection screen 610 is displayed in Step s84, Step s23 described above is executed. When it is determined that the execution of the telephone communication is selected in Step s23, Step s24 described above is executed, and the transmission of the telephone communication is performed. In the meanwhile, when it is determined that the execution of the message communication is selected in Step s23, the instruction receiving apparatus 10 executes Steps s14 to s16 described above and transmits the message.

In this manner, in the example in FIG. 28, when the instruction receiving apparatus 10 determines that the remaining battery level of the target other side apparatus 10 is low based on the apparatus information of the target other side apparatus 10, the user of the instruction receiving apparatus 10 can select whether the instruction receiving apparatus 10 performs the telephone communication or the message communication. Thus, the convenience of the electronic apparatus 10 is increased.

FIG. 30 is a flow chart illustrating the other example of Step s4 in a case where the apparatus information includes the remaining battery level information of the target other side apparatus 10. In the example illustrated in FIG. 30, the electronic apparatus 10 can use a plural types of wireless communication system for the telephone communication. For example, the electronic apparatus 10 can use a wireless communication system conformable to voice over long term evolution (VoLTE), a wireless communication system conformable to a third generation mobile communication system (3G), and a wireless communication system conformable to a second generation mobile communication system (2G) for the telephone communication. The wireless communication system conformable to VoLTE is referred to as "VoLTE system", the wireless communication system conformable to 3G is referred to as "3G system", and the wireless communication system conformable to 2G is referred to as "2G system" in some cases hereinafter.

The present example is based on an assumption that there is a high possibility that a power consumption in a case where the electronic apparatus 10 performs the telephone communication using VoLTE system is larger than a power consumption in a case where the electronic apparatus 10 performs the telephone communication using 3G system. There is a high possibility that a power consumption in a case where the electronic apparatus 10 performs the telephone communication using 3G system is larger than a power consumption in a case where the electronic apparatus 10 performs the telephone communication using 2G system.

As illustrated in FIG. 30, in Step s91, the controller 100 acquires the remaining battery level information from the apparatus information of the target other side apparatus 10. Then, in Step s92, the controller 100 determines a wireless communication system used in the telephone communication corresponding to the transmission instruction in Step s1, selecting from VoLTE system, 3G system, and 2G system, based on the acquired remaining battery level information.

In Step s92, the controller 100 determines whether the remaining battery level of the target other side apparatus 10 is low, middle, or sufficient based on the remaining battery level information, for example. When the remaining battery level indicated by the remaining battery level information is smaller than a first threshold value, the controller 100 determines that the remaining battery level of the target other side apparatus 10 is low. When the remaining battery level indicated by the remaining battery level information is equal to or larger than the first threshold value and equal to or smaller than a second threshold value (>first threshold value), the controller 100 determines that the remaining battery level of the target other side apparatus 10 is middle. When the remaining battery level indicated by the remaining battery level information is larger than the second threshold value, the controller 100 determines that the remaining battery level of the target other side apparatus 10 is sufficient.

In Step s92, when the controller 100 determines that the remaining battery level is low, the controller 100 adopts 2G system as the wireless communication system to be used. When the controller 100 determines that the remaining battery level is middle, the controller 100 adopts 3G system as the wireless communication system to be used. When the controller 100 determines that the remaining battery level is sufficient, the controller 100 adopts VoLTE system as the wireless communication system to be used.

When the wireless communication system to be used is determined in Step s92, the instruction receiving apparatus 10 transmits, in Step s93, the telephone communication to the target other side apparatus 10 using the determined wireless communication system to be used.

The wireless communication system to be used may be determined from two types of wireless communication system in Step s92. In this case, for example, the controller 100 determines whether or not the remaining battery level is low in the manner similar to Step s82 described above. When the controller 100 determines that the remaining battery level is low, the controller 100 determines 3G system, for example, as the wireless communication system to be used. In the meanwhile, when the controller 100 determines that the remaining battery level is not low, the controller 100 determines VoLTE system, for example, as the wireless communication system to be used.

In this manner, in the example in FIG. 30, the controller 100 determines the wireless communication system used in the telephone communication based on the remaining battery level information of the target other side apparatus 10. Accordingly, the instruction receiving apparatus 10 can perform the telephone communication with the target other side apparatus 10 using the wireless communication system corresponding to the remaining battery level of the target other side apparatus 10. Accordingly, a possibility of disconnection of the telephone communication between the instruction receiving apparatus 10 and the target other side apparatus 10 can be reduced. Thus, the convenience of the electronic apparatus 10 is increased.

Fifth Example

Figure 31:
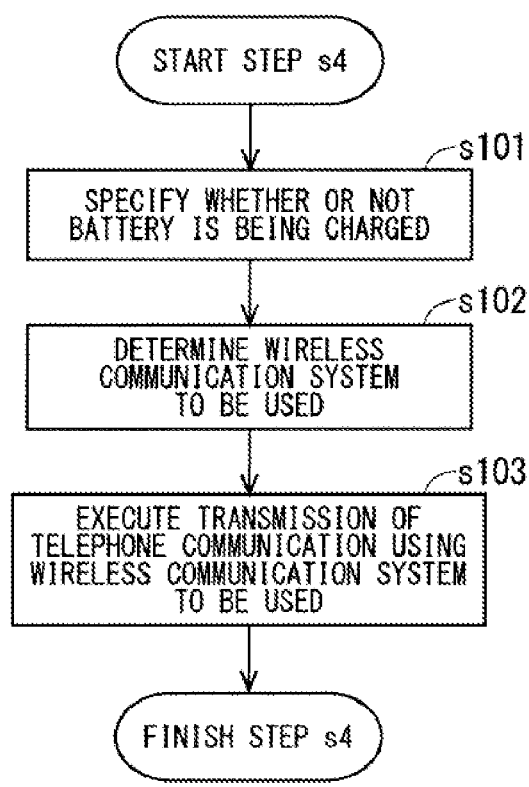
FIG. 31 illustrates a flow chart showing one example of an operation of the electronic apparatus.

FIG. 31 is a flow chart illustrating Step s4 according to the present example. FIG. 31 illustrates Step s4 in a case where the apparatus information includes battery charge information indicating whether or not the battery 240 of the target other side apparatus 10 is being charged. The battery charge information is a type of apparatus state information of the electronic apparatus 10. In the example illustrated in FIG. 31, the electronic apparatus 10 can use a plural types of wireless communication system for the telephone communication in the manner similar to the example illustrated in FIG. 30 described above. For example, the electronic apparatus 10 can use VoLTE system, 3G system, and 2G system for the telephone communication.

As illustrated in FIG. 31, in Step s101, the controller 100 acquires the battery charge information from the apparatus information of the target other side apparatus 10. Then, the controller 100 specifies whether or not the battery 240 of the target other side apparatus 10 is being charged based on the acquired battery charge information.

Next, in Step s102, the controller 100 determines the wireless communication system used in the telephone communication corresponding to the transmission instruction in Step s1, selecting from VoLTE system and 3G system, for example, based on the specification result in Step s102. When the controller 100 specifies that the target other side apparatus 10 is being charged (in other words, when the battery charge information indicates that the target other side apparatus 10 is being charged), the controller 100 determines 3G system as the wireless communication system to be used. In the meanwhile, when the controller 100 specifies that the target other side apparatus 10 is not being charged (in other words, when the battery charge information indicates that the target other side apparatus 10 is not being charged), the controller 100 determines VoLTE system as the wireless communication system to be used.

When the wireless communication system to be used is determined in Step s102, the instruction receiving apparatus 10 transmits, in Step s103, the telephone communication to the target other side apparatus 10 using the determined wireless communication system to be used.

In Step s102, the controller 100 may determine the wireless communication system to be used from VoLTE system and 2G system. In this case, when the controller 100 specifies that the target other side apparatus 10 is being charged, the controller 100 determines 2G system as the wireless communication system to be used. In the meanwhile, when the controller 100 specifies that the target other side apparatus 10 is not being charged, the controller 100 determines VoLTE system as the wireless communication system to be used. The controller 100 may determine the wireless communication system to be used from 3G system and 2G system. In this case, when the controller 100 specifies that the target other side apparatus 10 is being charged, the controller 100 determines 2G system as the wireless communication system to be used. In the meanwhile, when the controller 100 specifies that the target other side apparatus 10 is not being charged, the controller 100 determines 3G system as the wireless communication system to be used.

In this manner, in the present example, the controller 100 determines the wireless communication system used in the telephone communication based on the specification result whether or not the target other side apparatus 10 is being charged. Accordingly, a possibility of disconnection of the telephone communication between the instruction receiving apparatus 10 and the target other side apparatus 10 can be reduced. When the target other side apparatus 10 is being charged, there is a high possibility that the remaining battery level of the target other side apparatus 10 is low. Then, in a case where the target other side apparatus 10 is disposed on a charging stand and being charged, for example, when the telephone communication has arrived at the target other side apparatus 10 from the instruction receiving apparatus 10, and subsequently the telephone communication with the instruction receiving apparatus 10 is started, there is a possibility that the target other side apparatus 10 is held by a hand of the target other side user and is not charged. As a result, the target other side apparatus 10 may perform the telephone communication in a state of low remaining battery level in some cases. In such as case, if the instruction receiving apparatus 10 performs the telephone communication with the target other side apparatus 10 using the wireless communication system having a high possibility of large power consumption, the telephone communication may be disconnected. In the present example, as described above, the instruction receiving apparatus 10 performs the telephone communication with the target other side apparatus 10 using the wireless communication system having a high possibility of low power consumption when the target other side apparatus 10 is being charged, thus a possibility of disconnection of the telephone communication between the instruction receiving apparatus 10 and the target other side apparatus 10 can be reduced. Thus, the convenience of the electronic apparatus 10 is increased.

Sixth Example

Figure 32:
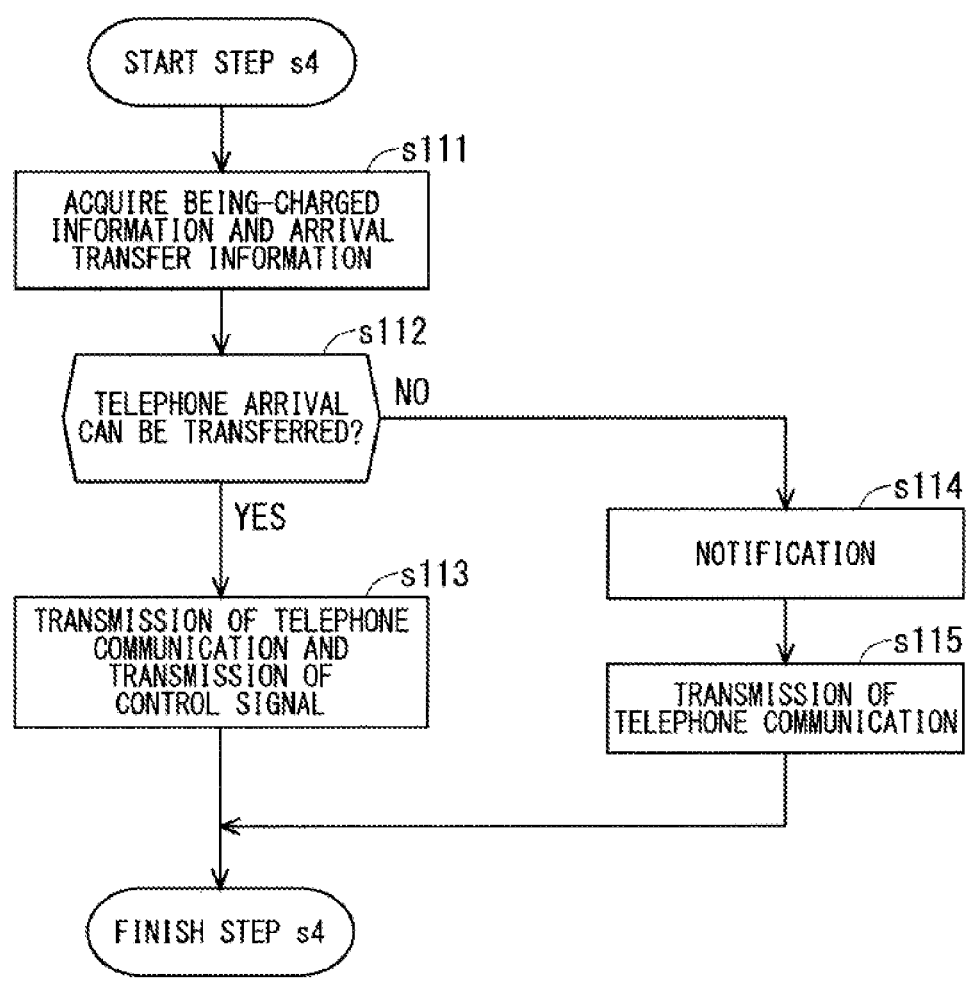
FIG. 32 illustrates a flow chart showing one example of an operation of the electronic apparatus.

FIG. 32 is a flow chart illustrating Step s4 according to the present example. FIG. 32 illustrates Step s4 in a case where the apparatus information includes the battery charge information indicating that the electronic apparatus 10 is being charged (referred to as "being-charged information" hereinafter) and arrival transfer information in the battery charge information described above. The arrival transfer information is information indicating whether or not the electronic apparatus 10 can transfer the telephone arrival in the subject device to the other electronic apparatus 10. Each of the being-charged information and the arrival transfer information is a type of apparatus state information of the electronic apparatus 10.

Figure 33:
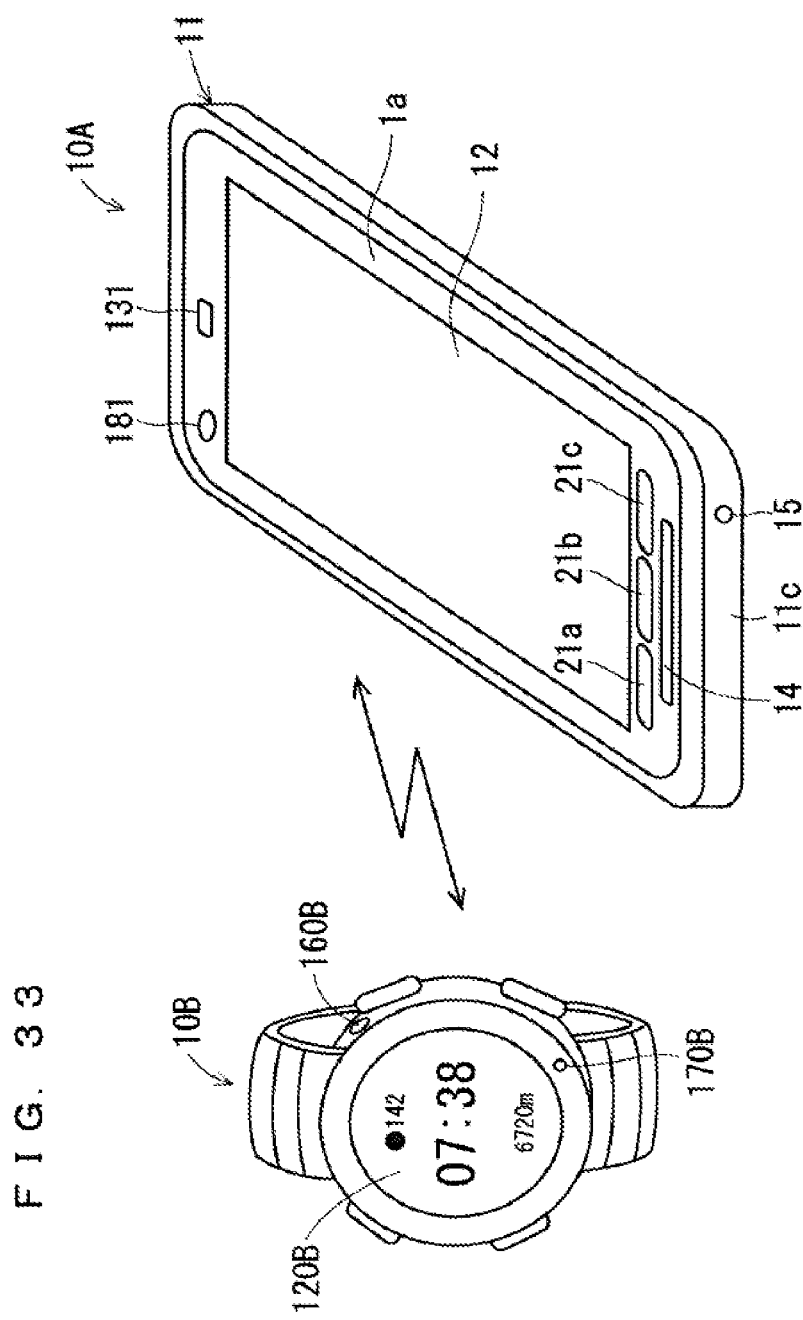
FIG. 33 illustrates a drawing showing one example of two electronic apparatuses connected to each other.

For example, as illustrated in FIG. 33, considered is a case where an electronic apparatus 10A can communicate with an electronic apparatus 10B using a near field wireless communication system such as Bluetooth. The electronic apparatus 10A is a mobile phone, and is the same as the electronic apparatus 10 illustrated in FIGS. 2 to 4 described above. The electronic apparatus 10B is a smartwatch, differing from the electronic apparatus 10 illustrated in FIGS. 2 to 4. The electronic apparatus 10B includes a display 120B, a speaker 160B, and a microphone 170B. The electronic apparatus 10B also has a function of communicating with the network 2. The electronic apparatus 10B also has a function of detecting an operation performed on the display 120B (specifically, a display surface of the display 120B). A user is common in the electronic apparatuses 10A and 10B.

The electronic apparatus 10A can transfer the telephone arrival in the subject device to the electronic apparatus 10B using the near field wireless communication system. The user operates the display surface 12 of the electronic apparatus 10A, for example, thereby being able to set whether or not the electronic apparatus 10A can transfer the telephone arrival to the electronic apparatus 10B. This setting is referred to as "the arrival transfer setting" in some cases hereinafter. When the electronic apparatus 10A can communicate with the electronic apparatus 10B, the electronic apparatus 10A transmits the apparatus information, which includes the arrival transfer information indicating that the telephone communication can be transferred, to the server device 50 or the other electronic apparatus 10. In the meanwhile, when the electronic apparatus 10A cannot communicate with the electronic apparatus 10B, the electronic apparatus 10A transmits the apparatus information, which includes the arrival transfer information indicating that the telephone arrival cannot be transferred, to the server device 50 or the other electronic apparatus 10.

When the telephone arrival is transferred to the electronic apparatus 10B, the electronic apparatus 10B displays an arrival notification screen of transmitting a notification of arrival on the display 120B, and outputs an arrival sound from the speaker 160B. When the user performs a predetermined operation on the display 120B of the electronic apparatus 10B, the electronic apparatus 10B starts the telephone communication in response to the telephone arrival. When the electronic apparatus 10B cannot communicate with the network 2, the electronic apparatus 10B may communicate with the other side apparatus 10 via the electronic apparatus 10A.

In the present example, the operation of the instruction receiving apparatus 10 is described based on an example of a case where the target other side apparatus 10 is the electronic apparatus 10A illustrated in FIG. 32.

As illustrated in FIG. 32, in Step s111, when the controller 100 acquires the being-charged information and the arrival transfer information from the apparatus information of the target other side apparatus 10A, the controller 100 executes Step s112. In Step s112, the controller 100 determines whether or not the arrival transfer information indicates that the target other side apparatus 10A can transfer the telephone arrival. If the determination is YES in Step s112, the controller 100 generates a control signal for instructing the target other side apparatus 10A to transfer the telephone arrival in Step s113. Then, the instruction receiving apparatus 10 performs the transmission of the telephone communication to the target other side apparatus 10 and transmits the generated control signal to the target other side apparatus 10.

When the transmission of the telephone communication from the instruction receiving apparatus 10 arrives at the target other side apparatus 10A receiving the control signal from the instruction receiving apparatus 10, the target other side apparatus 10A transfers the arrival to the electronic apparatus 10B regardless of contents of the arrival transfer setting in the subject device. The electronic apparatus 10B displays the arrival notification screen and outputs the arrival sound.

Figure 34:
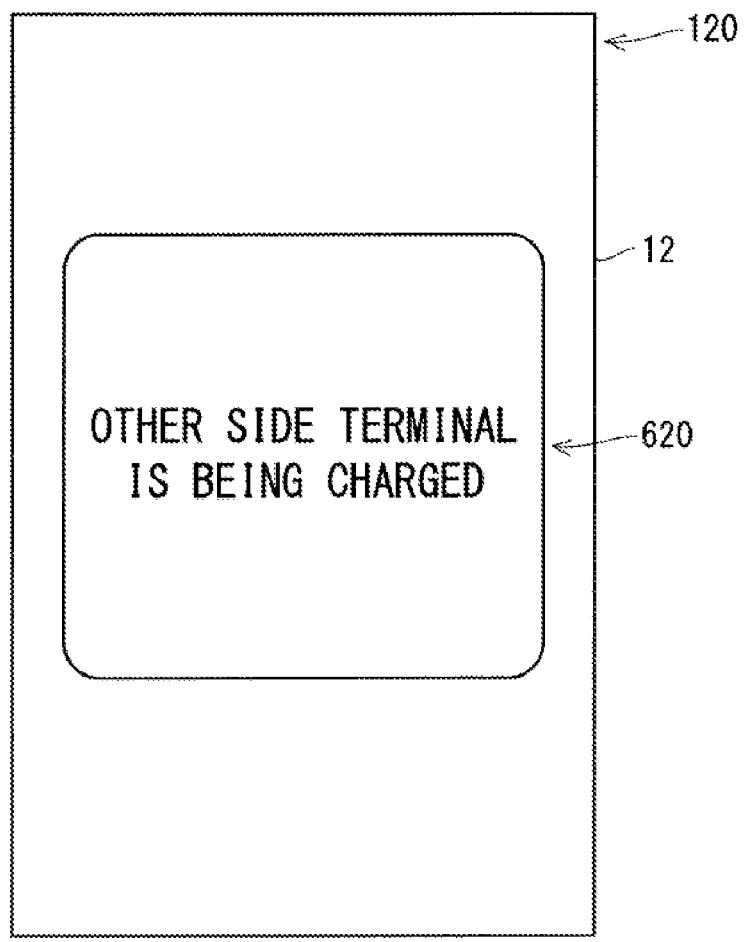
FIG. 34 illustrates a drawing showing one example of a display of the electronic apparatus.

In the meanwhile, if the determination is NO in Step s112, the controller 100 makes the notification unit notify that the target other side apparatus 10A is being charged in Step s114. In Step s114, the controller 100 makes the display 120 display notification information 620 of notifying that the target other side apparatus 10A is being charged, for example. FIG. 34 is a drawing showing a display example of the notification information 620.

When the controller 100 makes the display 120 display the notification information 620 for a certain period of time, in Step s115, the instruction receiving apparatus 10 performs the transmission of the telephone communication to the target other side apparatus 10A. At this time, the control signal transmitted in Step s113 is not transmitted to the target other side apparatus 10A. It is not necessary to execute Step s114.

In this manner, in the present example, when the controller 100 specifies that the target other side apparatus 10 is being charged and the target other side apparatus 10 can transfer the telephone arrival to the other device based on the apparatus information of the target other side apparatus 10, the controller 100 controls the target other side apparatus 10 so that the target other side apparatus 10 transfers the telephone arrival to the other device. As described above, when the transmission of the telephone communication from the instruction receiving apparatus 10 arrives at the target other side apparatus 10 which is being charged, and subsequently the target other side apparatus 10 starts the telephone communication with the instruction receiving apparatus 10, there is a possibility that the target other side apparatus 10 is not charged and as a result, the target other side apparatus 10 performs the telephone communication with a low remaining battery level. Accordingly, the telephone communication between the instruction receiving apparatus 10 and the target other side apparatus 10 may be disconnected. In the present example, when the target other side apparatus 10 is being charged and can transfer the telephone arrival to the other device, the target other side apparatus 10 transfers the telephone arrival to the other device under control of the instruction receiving apparatus 10, thus reduced is a possibility that the telephone communication between the instruction receiving apparatus 10 and the target other side apparatus 10 is disconnected. Thus, the convenience of the electronic apparatus 10 is increased.

In the present example, when the controller 100 specifies that the target other side apparatus 10 cannot perform the transfer based on the apparatus information, the controller 100 makes the notification unit notify that the target other side apparatus 10 is being charged. Accordingly, the user of the instruction receiving apparatus 10 can recognize that the target other side apparatus 10 is being charged. As a result, the user can execute appropriate processing. For example, the user can operate the instruction receiving apparatus 10 to suspend the transmission of the telephone communication, and after a while, make the instruction receiving apparatus 10 execute the telephone communication with the target other side apparatus 10.

Seventh Example

Figure 35:
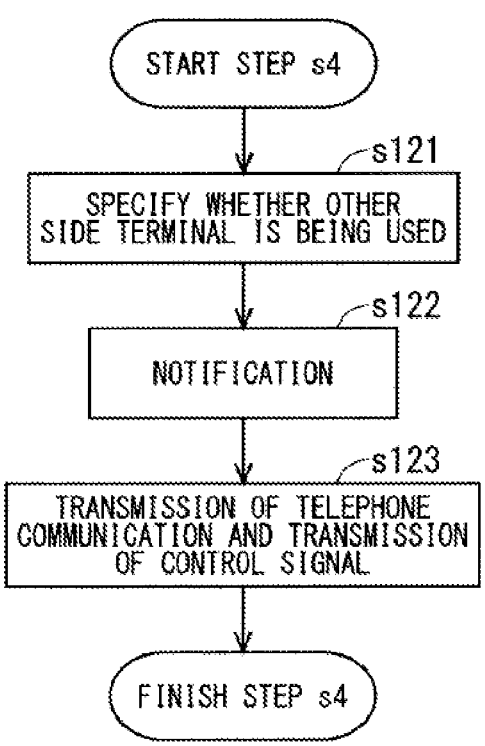
FIG. 35 illustrates a flow chart showing one example of an operation of the electronic apparatus.

FIG. 35 is a flow chart illustrating Step s4 according to the present example. FIG. 35 illustrates Step s4 in a case where the apparatus information includes being-used information indicating that the target other side apparatus 10 is being used. The being-used information is a type of apparatus state information of the electronic apparatus 10.

In the present example, in the electronic apparatus 10, the controller 100 determines whether or not the subject device is being used by the user based on a state of the subject device. When the electronic apparatus 10 determines that the subject device is being used by the user, the electronic apparatus 10 transmits the apparatus information including the being-used information to the server device 50 or the other electronic apparatus 10.

The controller 100 may determine that the subject device is being used when a music is reproduced in a music reproduction application being executed. The controller 100 may determine that the subject device is being used when a video is reproduced in a video reproduction application being executed.

The controller 100 may determine that the subject device is being used when the controller 100 determines that the subject device is being operated by the user. The controller 100 can specify that the subject device is being operated by the user based on a detection result in the touch panel 130. For example, when the touch panel 130 detects an operation on the display surface 12, the controller 100 sets an operation detection flag in the storage 103 to "1". When the touch panel 130 does not detect an operation on the display surface 12 for a certain period of time, the controller 100 sets the operation detection flag to "0". Accordingly, when the user performs the operation on the display surface 12 repeatedly, the operation detection flag is "1" during that period of time. In the meanwhile, when the user does not perform the operation on the display surface 12 for a certain period of time, the operation detection flag is "0". The controller 100 determines that the subject device is being used when the operation detection flag is "1".

Considered is a case where an operation mode of the electronic apparatus 10 includes a first operation mode of displaying a screen to be displayed in a first size and a second operation mode of displaying the same screen in a second size larger than the first size. FIG. 36 is a drawing illustrating a display example in a case where the electronic apparatus 10 displays an image in the first operation mode. FIG. 37 is a drawing illustrating a display example in a case where the electronic apparatus 10 displays an image in the second operation mode. In FIGS. 36 and 37, a screen 630 indicating a video being reproduced is displayed on the display surface 12. When the operation mode is the first operation mode, as illustrated in FIG. 36, the screen 630 is displayed in a small size. In the meanwhile, when the operation mode is the second operation mode, as illustrated in FIG. 37, the screen 630 is displayed in a large size.

In this manner, in a case where the operation mode of the electronic apparatus 10 includes the first and second operation modes, when the electronic apparatus 10 displays the image in the second operation mode, there is a high possibility that the user is currently seeing the display on the display surface 12. The controller 100 may determine that the subject device is being used when the electronic apparatus 10 displays the image in the second operation mode. The second operation mode is referred to as "the full screen mode" in some cases. However, even in the full screen mode, the screen to be displayed is not necessarily displayed in an entire region of the display surface 12 as illustrated in FIG. 37.

As illustrated in FIG. 35, in Step s121, the controller 100 acquires the being-used information from the apparatus information of the target other side apparatus 10. Then, the controller 100 specifies that the target other side apparatus 10 is being used by the used based on the acquired being-used information.

Figure 38:
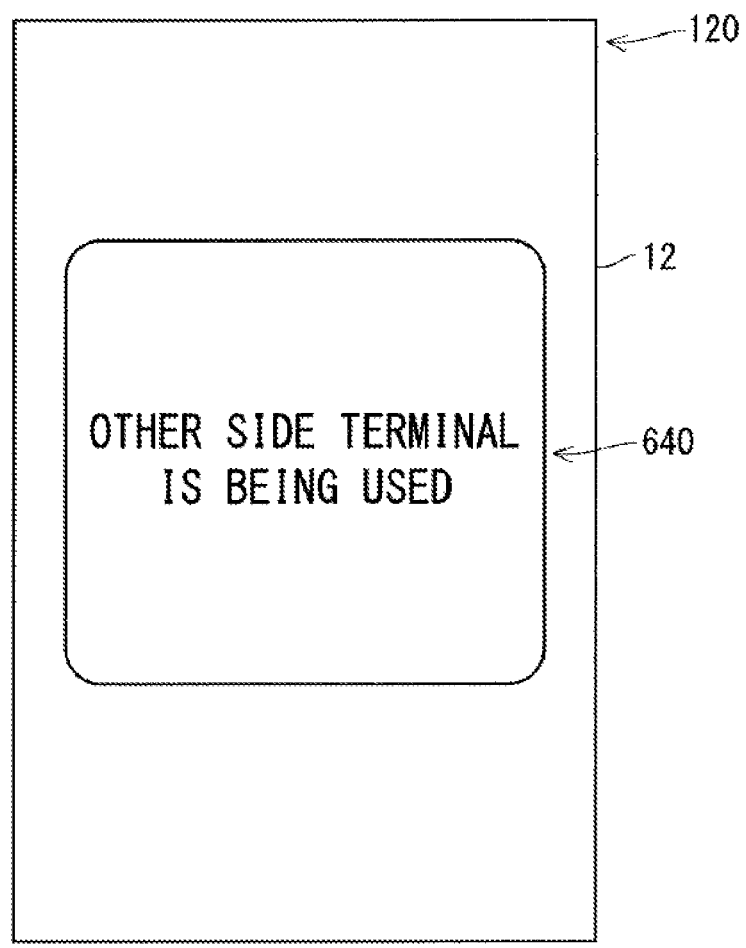
FIG. 38 illustrates a drawing showing one example of a display of the electronic apparatus.

Next, in Step s122, the controller 100 makes the notification unit notify that the target other side apparatus 10 is being used. In Step s122, the controller 100 makes the display 120 display notification information 640 of notifying that the target other side apparatus 10 is being used, for example. FIG. 38 is a drawing showing one example of the notification information 640. It is not necessary to execute Step s122.

The controller 100 makes the display 120 display the notification information 640 for a certain period of time, and subsequently generates the control signal transmitted to the target other side apparatus 10 in Step s123. This control signal is a signal for instructing the target other side apparatus 10 not to execute the telephone arrival notification by sound. Furthermore, this control signal is a signal for instructing to display the arrival notification information 650 of transmitting a notification of arrival while maintaining the display of the display image before the telephone communication arrives. When the controller 100 generates the control signal, the instruction receiving apparatus 10 performs the transmission of the telephone communication to the target other side apparatus 10 and transmits the generated control signal to the target other side apparatus 10.

In the target other side apparatus 10 at which the telephone communication from the instruction receiving apparatus 10 has arrived and which has received the control signal, the controller 100 does not perform the telephone arrival notification by sound during the telephone arrival regardless of contents of the setting regarding the telephone arrival notification in the target other side apparatus 10. Then, the controller 100 makes the display 120 display the arrival notification information 650 while maintaining the display of the display image before the telephone arrival.

Figure 39:
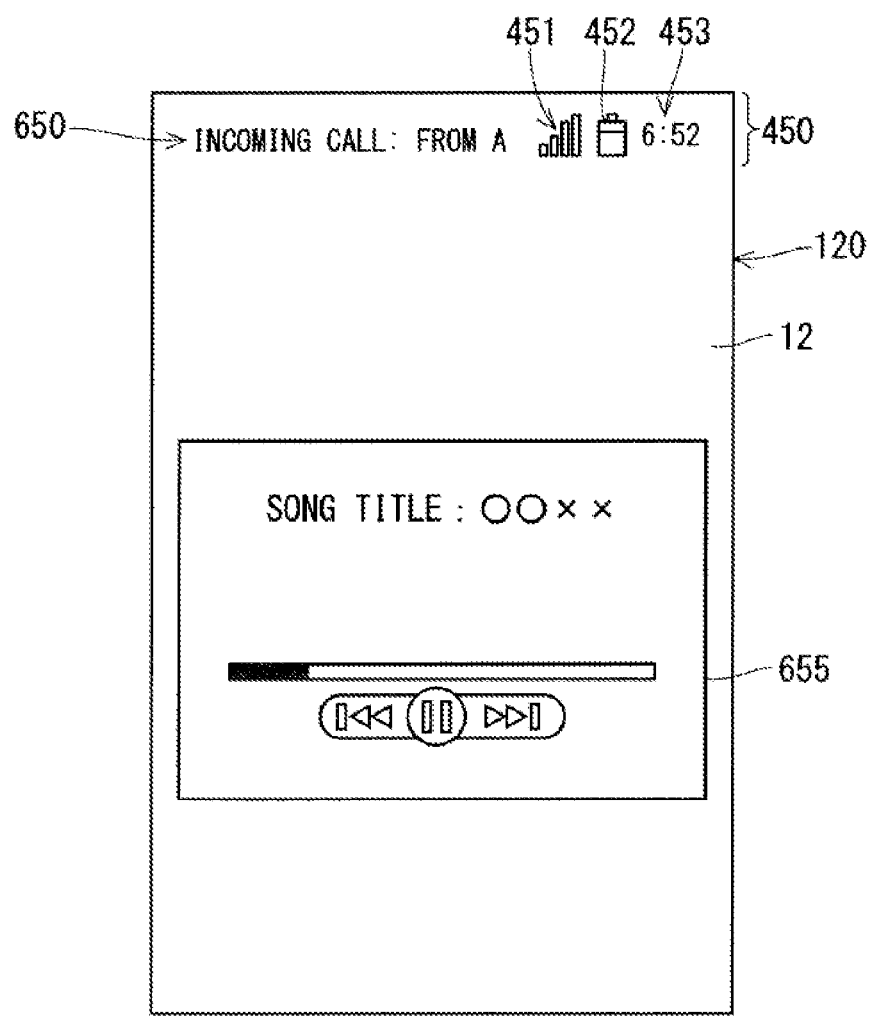
FIG. 39 illustrates a drawing showing one example of a display of the electronic apparatus.

FIG. 39 is a drawing illustrating a display example of the target other side apparatus 10 during the telephone arrival. In the example in FIG. 39, the target other side apparatus 10 determines that the subject device is being used when the target other side apparatus 10 reproduces a music, and transmits the being-used information. The target other side apparatus 10 displays a music reproduction image 655 for controlling the reproduction of the music as the display image immediately before the telephone arrival. The target other side apparatus 10 displays the arrival notification information 650 in the notification region 450, for example, while maintaining the display of the music reproduction screen 655 during the telephone arrival. In the example in FIG. 39, the arrival notification information 650 includes a name of the user of the instruction receiving apparatus 10. When the target other side apparatus 10 outputs the music being reproduced from the speaker 160, for example, immediately before the telephone arrival, the target other side apparatus 10 may maintain the output of the music being reproduced during the telephone arrival. The target other side user performs an operation on the notification region 450, for example, thereby being able to make the target other side apparatus 10 make a response to the arrival of the telephone communication.

The control signal transmitted in Step s123 needs not be the signal for instructing the target other side apparatus 10, during the arrival of the telephone communication, to maintain the display of the display image before the arrival of the telephone communication.

The being-used information may indicate a state of the electronic apparatus 10 being used. For example, the being-used information may indicate that the music is being reproduced. The being-used information may indicate that the video is being reproduced. The being-used information may indicate that the electronic apparatus 10 is operated. The being-used information may indicate that the electronic apparatus 10 displays the image in the second operation mode.

Figure 40:
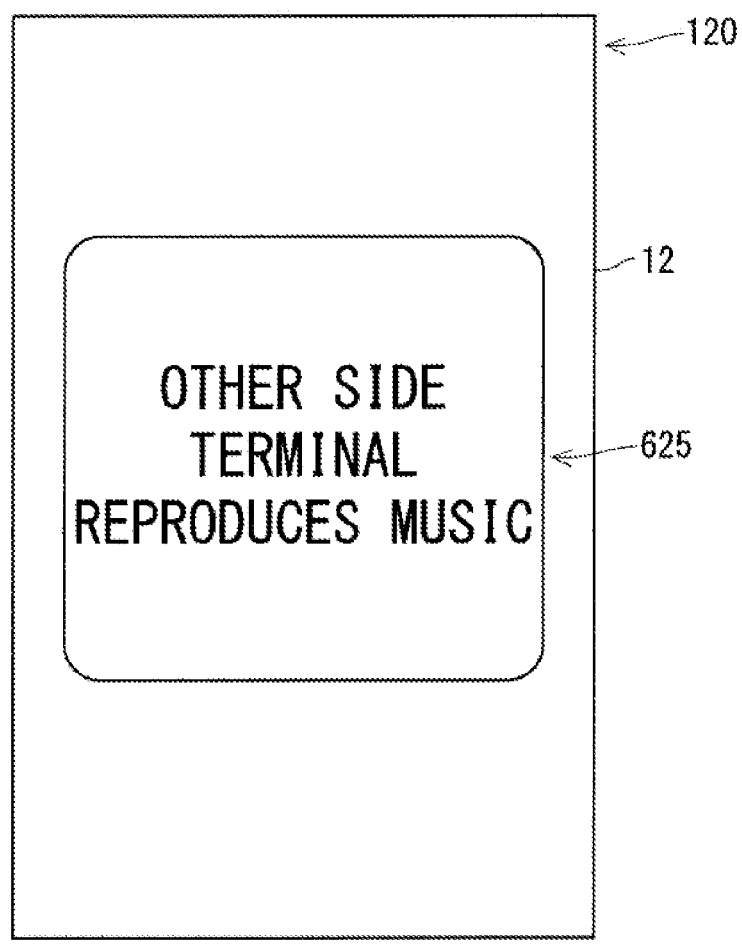
FIG. 40 illustrates a drawing showing one example of a display of the electronic apparatus.

When the being-used information indicates that the music is being reproduced, in Step s121, the controller 100 can specify that the target other side apparatus 10 reproduces the music based on the being-used information. In this case, when the controller 100 specifies that the target other side apparatus 10 reproduces the music, Steps s122 and s123 are considered to be executed. In Step s122, the controller 100 may make the notification unit notify that the target other side apparatus 10 reproduces the music. The controller 100 may make the display 120 display the notification information 625 of notifying that the target other side apparatus 10 reproduces the music. FIG. 40 is a drawing illustrating one example of the notification information 625.

When the being-used information indicates that the video is being reproduced, in Step s121, the controller 100 can specify that the target other side apparatus 10 reproduces the video based on the being-used information. In this case, when the controller 100 specifies that the target other side apparatus 10 reproduces the video, Steps s122 and s123 are considered to be executed. In Step s122, the controller 100 may make the notification unit notify that the target other side apparatus 10 reproduces the video.

When the being-used information indicates that the target other side apparatus 10 is operated, in Step s121, the controller 100 can specify that the target other side apparatus 10 is operated based on the being-used information. In this case, when the controller 100 specifies that the target other side apparatus 10 is operated, Steps s122 and s123 are considered to be executed. In Step s122, the controller 100 may make the notification unit notify that the target other side apparatus 10 is operated.

The apparatus information may include operation information indicating an operation detected by the touch panel 130 and indicating an operation on the display surface 12 in place of the being-used information indicating that the electronic apparatus 10 is operated. In this case, the instruction receiving apparatus 10 may specify that the target other side apparatus 10 is operated based on the operation information included in the apparatus information in Step s121.

When the being-used information indicates that the electronic apparatus 10 displays the image in the second operation mode, in Step s121, the controller 100 can specify that the target other side apparatus 10 displays the image in the second operation mode based on the being-used information. In this case, when the controller 100 specifies that the target other side apparatus 10 displays the image in the second operation mode, Steps s122 and s123 are considered to be executed. In Step s122, the controller 100 may make the notification unit notify that the target other side apparatus 10 displays the image in the second operation mode.

In this manner, in the present example, when the controller 100 of the instruction receiving apparatus 10 specifies that the target other side apparatus 10 is used based on the apparatus information of the target other side apparatus 10, the controller 100 controls the target other side apparatus 10 so that the target other side apparatus 10 displays the arrival notification information without outputting the arrival sound during the telephone arrival. For example, when the instruction receiving apparatus 10 and the target other side apparatus 10 reproduce the video or the music, the controller 100 controls the target other side apparatus 10 so that the target other side apparatus 10 displays the arrival notification information without outputting the arrival sound during the telephone arrival. When the target other side apparatus 10 is operated, the instruction receiving apparatus 10 controls the target other side apparatus 10 so that the target other side apparatus 10 displays the arrival notification information without outputting the arrival sound during the telephone arrival. When the target other side apparatus 10 displays the image in the second operation mode, the instruction receiving apparatus 10 controls the target other side apparatus 10 so that the target other side apparatus 10 displays the arrival notification information without outputting the arrival sound during the telephone arrival. Accordingly, when the target other side user makes the target other side apparatus 10 reproduce the music, for example, thereby using the target other side apparatus 10, the target other side user can recognize the telephone arrival, and moreover, it is possible to reduce a possibility that the target other side user gets bothered by the telephone arrival sound from the target other side apparatus 10. Thus, the convenience of the electronic apparatus 10 is increased.

In such a manner as the present example, when the controller 100 of the instruction receiving apparatus 10 controls the target other side apparatus 10 so that target other side apparatus 10 maintains, during the telephone arrival, the display of the display image before the telephone arrival, the convenience of the electronic apparatus 10 is further increased.

Eighth Example

FIG. 41 is a flow chart illustrating Step s4 according to the present example. In the present example, the operation mode of the electronic apparatus 10 includes the first and second operation modes described above. FIG. 41 illustrates Step s4 in a case where the apparatus information includes display setting information indicating that the target other side apparatus 10 displays the image in the second operation mode. The being-used information indicating that the target other side apparatus 10 displays the image in the second operation mode described above is also considered as the display setting information.

As illustrated in FIG. 41, in Step s121, the controller 100 acquires the display setting information from the apparatus information of the target other side apparatus 10. Then, the controller 100 specifies that the target other side apparatus 10 displays the image in the second operation mode based on the acquired display setting information.

Figure 42:
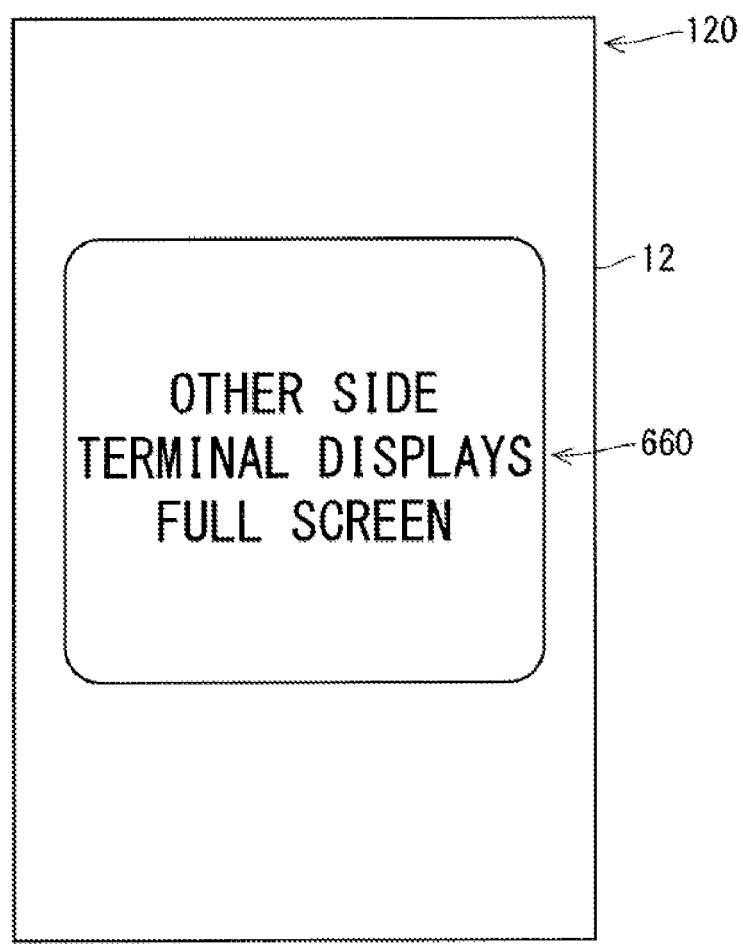
FIG. 42 illustrates a drawing showing one example of a display of the electronic apparatus.

Next, in Step s132, the controller 100 makes the notification unit notify that the target other side apparatus 10 displays the image in the second operation mode. In Step s132, the controller 100 makes the display 120 display notification information 660 of notifying that the target other side apparatus 10 displays the image in the second operation mode, for example. FIG. 42 is a drawing showing one example of the notification information 660. In the seventh example described above, when the being-used information indicates that the target other side apparatus 10 displays the image in the second operation mode, the controller 100 may make the display 120 display the notification information 660 illustrated in FIG. 42 in Step s122. It is not necessary to execute Step s132.

The controller 100 makes the display 120 display the notification information 660 for a certain period of time, and subsequently generates the control signal transmitted to the target other side apparatus 10 in Step s133. This control signal is a signal for instructing, during the telephone arrival, to reduce a display size of the display image before the telephone arrival and display an arrival notification screen 700 of transmitting a notification of the telephone arrival. When the controller 100 generates the control signal, the instruction receiving apparatus 10 performs the transmission of the telephone communication to the target other side apparatus 10 and transmits the generated control signal to the target other side apparatus 10.

In the target other side apparatus 10 at which the telephone communication from the instruction receiving apparatus 10 has arrived and which has received the control signal, the controller 100 reduces the display size of the display image before the telephone arrival and displays the arrival notification screen 700 even though the operation mode of the target other side apparatus 10 is set to the second operation mode.

Figure 43:
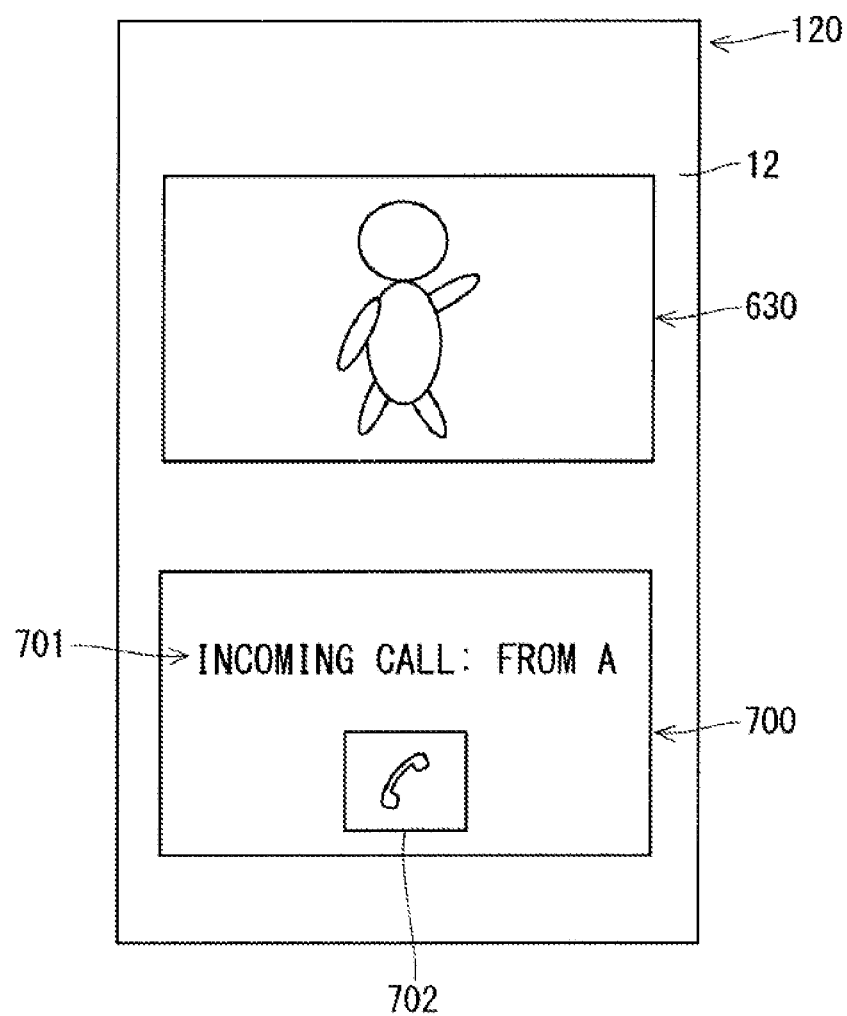
FIG. 43 illustrates a drawing showing one example of a display of the electronic apparatus.

FIG. 43 is a drawing illustrating a display example of the target other side apparatus 10 during the telephone arrival. FIG. 43 illustrates an example of a case where the target other side apparatus 10 displays the screen 630 illustrated in FIG. 37 described above as the display image before the telephone arrival. As illustrated in FIG. 43, during the telephone arrival, the target other side apparatus 10 reduces the display size of the display screen 630 before the telephone arrival, and displays the arrival notification screen 700. In the example in FIG. 43, the target other side apparatus 10 performs a two-screen display, thus one screen is made up of the screen 630 and the other screen is made up of the arrival notification screen 700. The arrival notification screen 700 includes notification information 701 of transmitting a notification of the telephone arrival and a response button 702 for making a response to the telephone arrival. The target other side user performs a tap operation, for example, on the response button 702, thereby being able to make the target other side apparatus 10 make a response to the telephone arrival.

In the example in FIG. 43, during the telephone arrival, the target other side apparatus 10 reduces the size of the screen 630 in displaying the screen 630, thereby reducing the display size of the screen 630, however, the target other side apparatus 10 may capture part of the screen 630 in displaying the screen 630, thereby reducing the display size of the screen 630.

In this manner, in the present example, the controller 100 of the instruction receiving apparatus 10 controls the target other side apparatus 10 so that the target other side apparatus 10 reduces, during the telephone arrival, the size of the display image before the telephone arrival and displays the arrival notification information of transmitting the notification of the telephone arrival. Accordingly, the target other side user can recognize the telephone arrival while seeing the display image before the telephone arrival. Thus, the convenience of the electronic apparatus 10 is increased.

Ninth Example

FIG. 44 is a flow chart illustrating Step s4 according to the present example. FIG. 44 illustrates Step s4 in a case where the apparatus information of the target other side apparatus 10 includes external apparatus connection information. The external apparatus connection information is information indicating that a device which can be controlled by the electronic apparatus 10 and can output a sound has a wired or wireless connection with the electronic apparatus 10. The external apparatus connection information is a type of apparatus state information of the electronic apparatus 10. The device which can output the sound is referred to as "the sound output device" in some cases hereinafter. The external apparatus connection information may include information indicating a type of sound output device.

Various devices are considered as the sound output device. The sound output device may be a speaker, an earpiece, or a headphone. The sound output device may be a stereo unit or a television.

Figure 45:
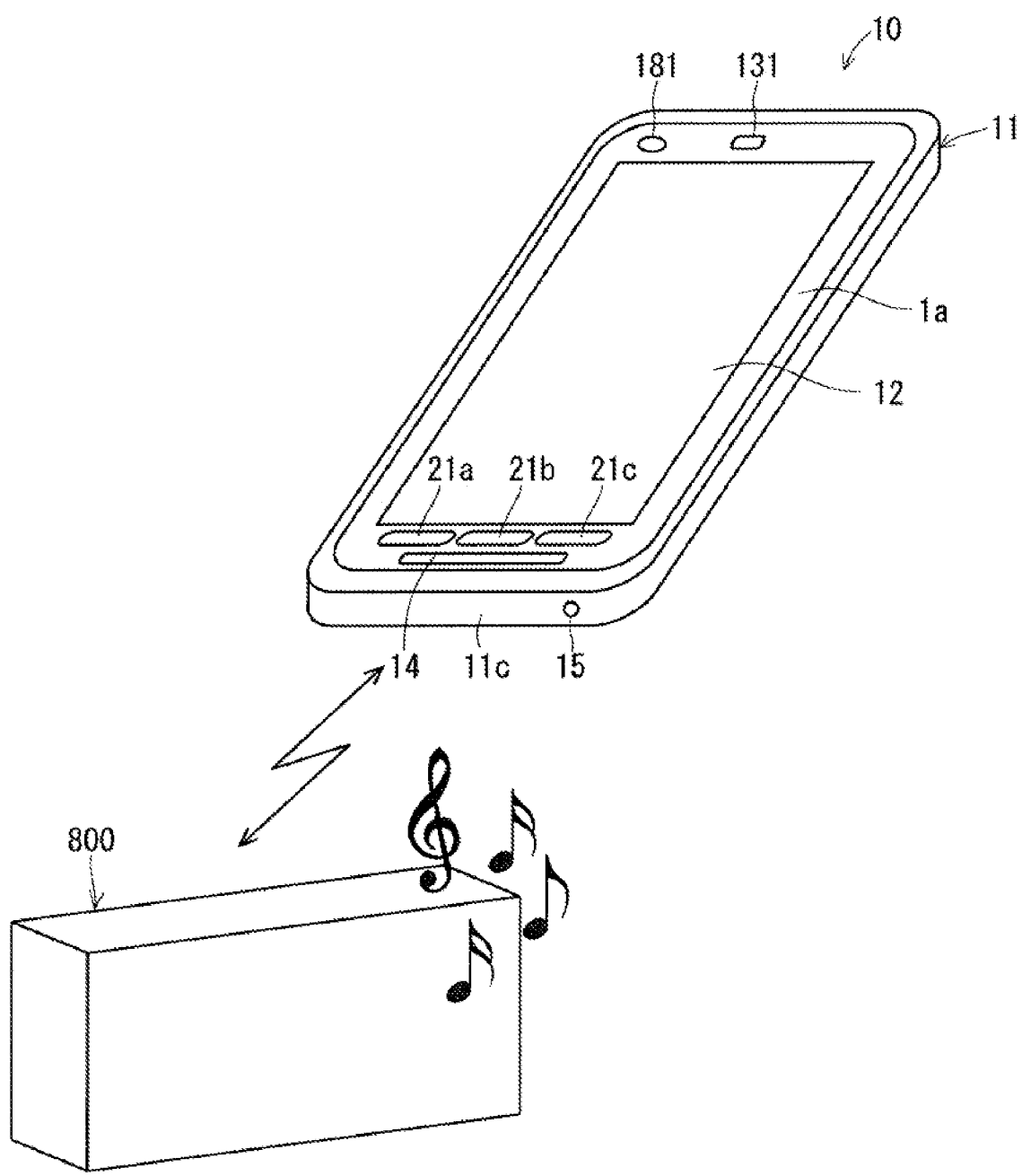
FIG. 45 illustrates a drawing showing one example of the electronic apparatus and a sound output device connected to each other.

FIG. 45 illustrates a drawing showing one example of the electronic apparatus 10 and a sound output device 800 connected to each other. The sound output device 800 illustrated in FIG. 45 is a speaker, for example. In the example in FIG. 45, the electronic apparatus 10 can communicate with the sound output device 800 using a near field wireless communication system such as Bluetooth, for example. The electronic apparatus 10 can control the sound output device 800 to output the sound from the sound output device 800. When the electronic apparatus 10 outputs the sound from the sound output device 800, the electronic apparatus 10 inputs a sound signal to the sound output device 800. The sound output device 800 outputs a sound based on the input sound signal. In the example in FIG. 45, the electronic apparatus 10 and the sound output device 800 have a wireless connection, but may have a wired connection.

The user operates the display surface 12 of the electronic apparatus 10, for example, thereby being able to perform a setting on the electronic apparatus 10 to make the electronic apparatus 10 control the sound output device 800 so that the telephone arrival sound is output from the sound output device 800. This setting is referred to as "the arrival sound external output setting" in some cases hereinafter.

The user operates the display surface 12 of the electronic apparatus 10, for example, thereby being able to perform a setting on the electronic apparatus 10 to make the electronic apparatus 10 control the sound output device 800 so that a sound other than the telephone arrival sound is also output from the sound output device 800.

As illustrated in FIG. 44, in Step s141, the controller 100 acquires the external apparatus connection information from the apparatus information of the target other side apparatus 10. Then, the controller 100 specifies that a device which can be controlled by the target other side apparatus 10 and can output a sound is connected to the target other side apparatus 10 based on the acquired external apparatus connection information. The device which is connected to the target other side apparatus 10 and can be controlled by the target other side apparatus 10 is referred to as "the connection sound output device" in some cases hereinafter. In Step s141, the presence of the connection sound output device is considered to be specified.

Figure 46:
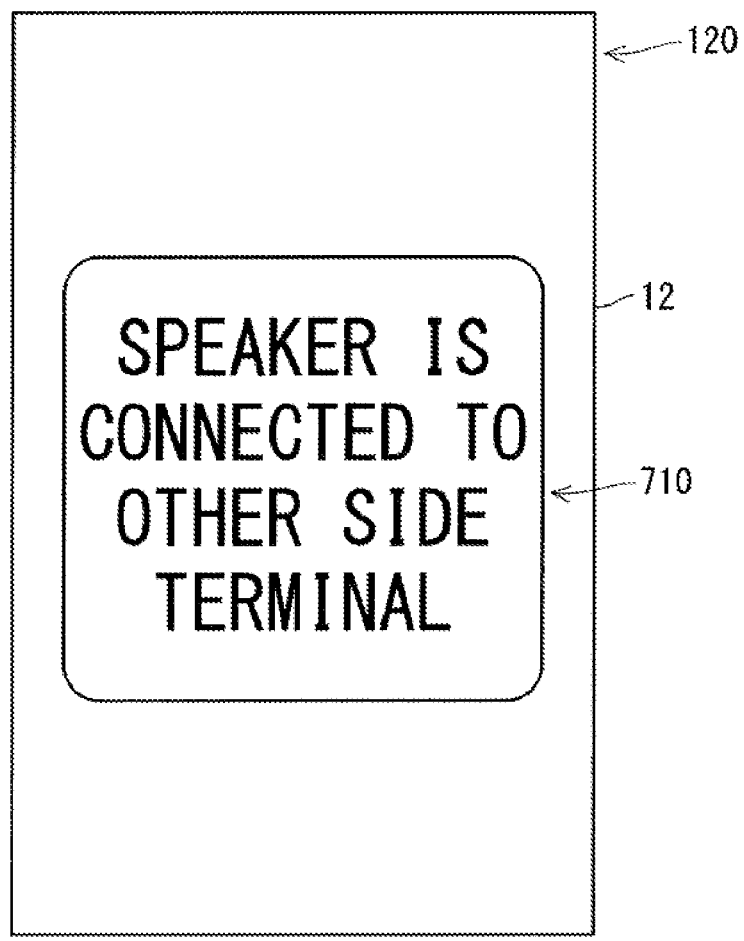
FIG. 46 illustrates a drawing showing one example of a display of the electronic apparatus.

Next, in Step s142, the controller 100 makes the notification unit notify that there is the connection sound output device 800. In Step s142, the controller 100 makes the display 120 display notification information 710 of notifying that there is the connection sound output device 800, for example. FIG. 46 is a drawing illustrating one example of the notification information 710. FIG. 46 illustrates the notification information 710 in a case where the external apparatus connection information includes information indicating a type of the sound output device 800. In the example in FIG. 46, the type of the sound output device 800 is a speaker, and the notification information 710 is information of notifying that the target other side apparatus 10 is connected to the speaker. It is not necessary to execute Step s142.

The controller 100 makes the display 120 display the notification information 710 for a certain period of time, and subsequently generates the control signal transmitted to the target other side apparatus 10 in Step s143. This control signal is a signal of instructing the target other side apparatus 10 to output the arrival sound of the telephone communication from the connection sound output device 800. When the controller 100 generates the control signal, the instruction receiving apparatus 10 performs the transmission of the telephone communication to the target other side apparatus 10 and transmits the generated control signal to the target other side apparatus 10.

In the target other side apparatus 10 at which the telephone communication from the instruction receiving apparatus 10 has arrived and which has received the control signal, the controller 100 controls the connection sound output device 800 so that the telephone arrival sound is output from the connection sound output device 800 regardless of whether or not the arrival sound external output setting is performed on the subject device.

In this manner, in the present example, when the controller 100 of the instruction receiving apparatus 10 specifies that the sound output device 800 which can be controlled by the target other side apparatus 10 and the target other side apparatus 10 are connected to each other based on the apparatus information, the controller 100 controls the target other side apparatus 10 so that the telephone arrival sound is output from the sound output device 800. When the sound output device 800 is connected to the target other side apparatus 10, there is a high possibility that the target other side user listens to music or the like being output from the sound output device 800. Accordingly, the telephone arrival sound is output from the sound output device 800, thus the target other side user can easily recognize the telephone arrival in the target other side apparatus 10. Thus, the convenience of the electronic apparatus 10 is increased.

Tenth Example

Figure 47:
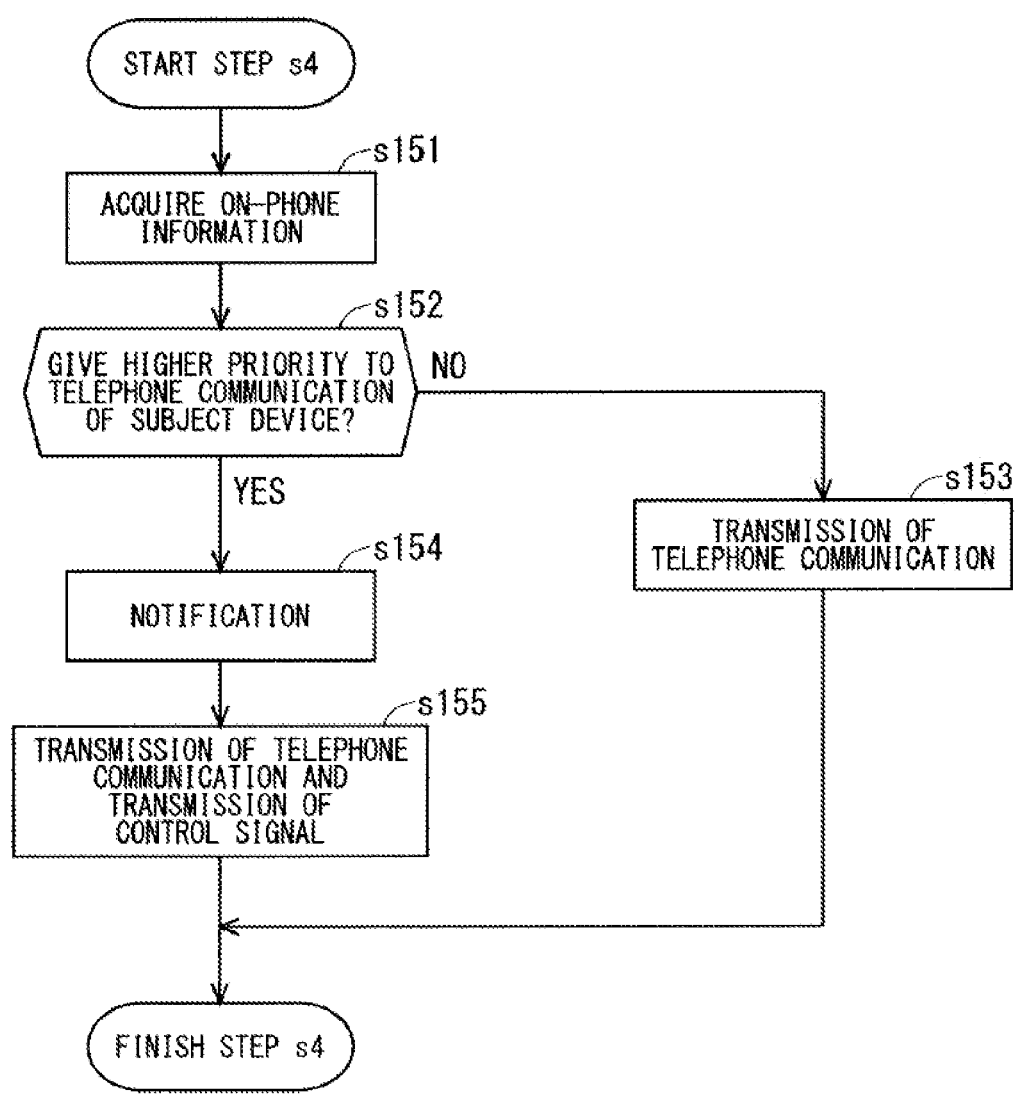
FIG. 47 illustrates a flow chart showing one example of an operation of the electronic apparatus.

FIG. 47 is a flow chart illustrating Step s4 according to the present example. FIG. 47 illustrates Step s4 in a case where the apparatus information includes on-phone information indicating that the target other side apparatus 10 is being in telephone communication. The on-phone information also includes usage phone application information indicating a type of a call application executed by the electronic apparatus 10. The on-phone information is a type of apparatus state information of the electronic apparatus 10.

Set in the present example is a priority order indicating a telephone communication having priority in association with a type of call application in a plural types of call applications which can be executed by the electronic apparatus 10. In the present example, a conventional type call application has higher priority than the IP telephone application.

As illustrated in FIG. 47, in Step s151, when the controller 100 acquires the on-phone information from the apparatus information of the target other side apparatus 10, Step s152 is executed. In Step s152, the controller 100 determines whether or not to give higher priority to the telephone communication in the subject device than the telephone communication being executed by the target other side apparatus 10 based on the acquired on-phone information. In other words, the controller 100 determines whether or not to make the telephone communication in the subject device cut into the telephone communication being executed by the target other side apparatus 10 based on the acquired on-phone information.

In Step s152, the controller 100 specifies a type of call application corresponding to the telephone communication being executed by the target other side apparatus 10 from the usage phone application information included in the on-phone information. In other words, the controller 100 specifies a type of call application currently executed by the target other side apparatus 10 from the usage phone application information. Then, the controller 100 compares the type of specified call application and a type of call application corresponding to the telephone communication which the subject device is to execute from now. That is to say, the controller 100 compares the type of call application being executed by the target other side apparatus 10 and the type of call application being executed by the subject device. When the call application being executed by the subject device is the conventional type call application and the call application being executed by the target other side apparatus 10 is the IP telephone application, the controller 100 determines to give higher priority to the telephone communication in the subject device than the telephone communication being executed by the target other side apparatus 10 In the other case, the controller 100 determines not to give higher priority to the telephone communication in the subject device than the telephone communication being executed by the target other side apparatus 10.

Figure 48:
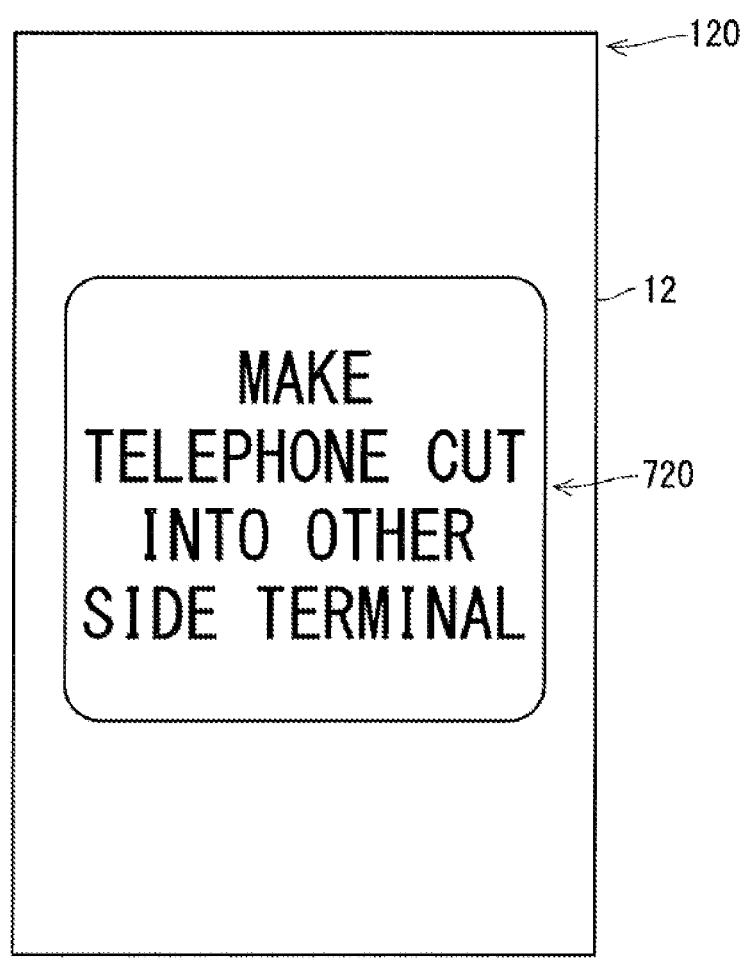
FIG. 48 illustrates a drawing showing one example of a display of the electronic apparatus.

If the determination is YES in Step s152, the controller 100 makes the notification unit notify that the controller 100 determines to give higher priority to the telephone communication in the subject device than the telephone communication being executed by the target other side apparatus 10 in Step s154. In Step s154, the controller 100 makes the display 120 display the notification information 720 of notifying that the controller 100 determines to give higher priority to the telephone communication in the subject device than the telephone communication being executed by the target other side apparatus 10, for example. FIG. 48 is a drawing illustrating one example of the notification information 720. It is not necessary to execute Step s154.

The controller 100 makes the display 120 display the notification information 720 for a certain period of time, and subsequently generates the control signal transmitted to the target other side apparatus 10 in Step s155. This control signal is a signal of instructing the target other side apparatus 10 to perform the telephone communication with the instruction receiving apparatus 10 in place of the telephone communication being executed by the target other side apparatus 10. In other words, this control signal is a signal of instructing the target other side apparatus 10 to make the telephone communication with the instruction receiving apparatus 10 cut into the telephone communication being executed by the target other side apparatus 10. When the controller 100 generates the control signal, the instruction receiving apparatus 10 performs the transmission of the telephone communication to the target other side apparatus 10 and transmits the generated control signal.

In the target other side apparatus 10 at which the telephone communication from the instruction receiving apparatus 10 has arrived and which has received the control signal, the controller 100 determines to perform the telephone communication with the instruction receiving apparatus 10 in place of the telephone communication being executed, and finishes the telephone communication being executed. At this time, the target other side apparatus 10 may make the electronic apparatus 10 on the other side of the telephone communication being executed notify the user of the electronic apparatus 10 on the other side of finish of the telephone communication, and subsequently finish the telephone communication with the electronic apparatus 10 on the other side. For example, the target other side apparatus 10 makes a sound signal transmitted to the electronic apparatus 10 on the other side include a finish sound which means that the telephone communication is finished. When the electronic apparatus 10 on the other side receiving this sound signal outputs a sound from the receiver 150, for example, based on the sound signal, the finish sound is output from the receiver 150. Accordingly, the user of the electronic apparatus 10 on the other side can recognize that the telephone communication with the target other side apparatus 10 is finished. A short sound, for example, is adopted as the finish sound. When the telephone communication of the electronic apparatus 10 on the other side is finished, the target other side apparatus 10 makes a response to the arrival of the telephone communication from the instruction receiving apparatus 10 and performs the telephone communication with the instruction receiving apparatus 10.

In the meanwhile, if the determination is NO in Step s152, the instruction receiving apparatus 10 performs the transmission of the telephone communication in Step s153. At this time, the control signal transmitted in Step s155 is not transmitted to the target other side apparatus 10.

In this manner, in the present example, the controller 100 of the instruction receiving apparatus 10 specifies that the call application (for example, the IP phone application) different from the call application (for example, the conventional type call application) corresponding to the telephone communication of the subject device is executed and the target other side apparatus 10 performs the telephone communication with the other device, based on the on-phone information included in the apparatus information. Then, when the telephone communication of the subject device has higher priority than the telephone communication being executed by the target other side apparatus 10, the controller 100 controls the target other side apparatus 10 so that the target other side apparatus 10 performs the telephone communication with the instruction receiving apparatus 10 in place of the telephone communication being executed.

Accordingly, the user of the instruction receiving apparatus 10 can preferentially speak with the user of the target other side apparatus 10. Thus, the convenience of the electronic apparatus 10 is increased.

Eleventh Example

Figure 49:
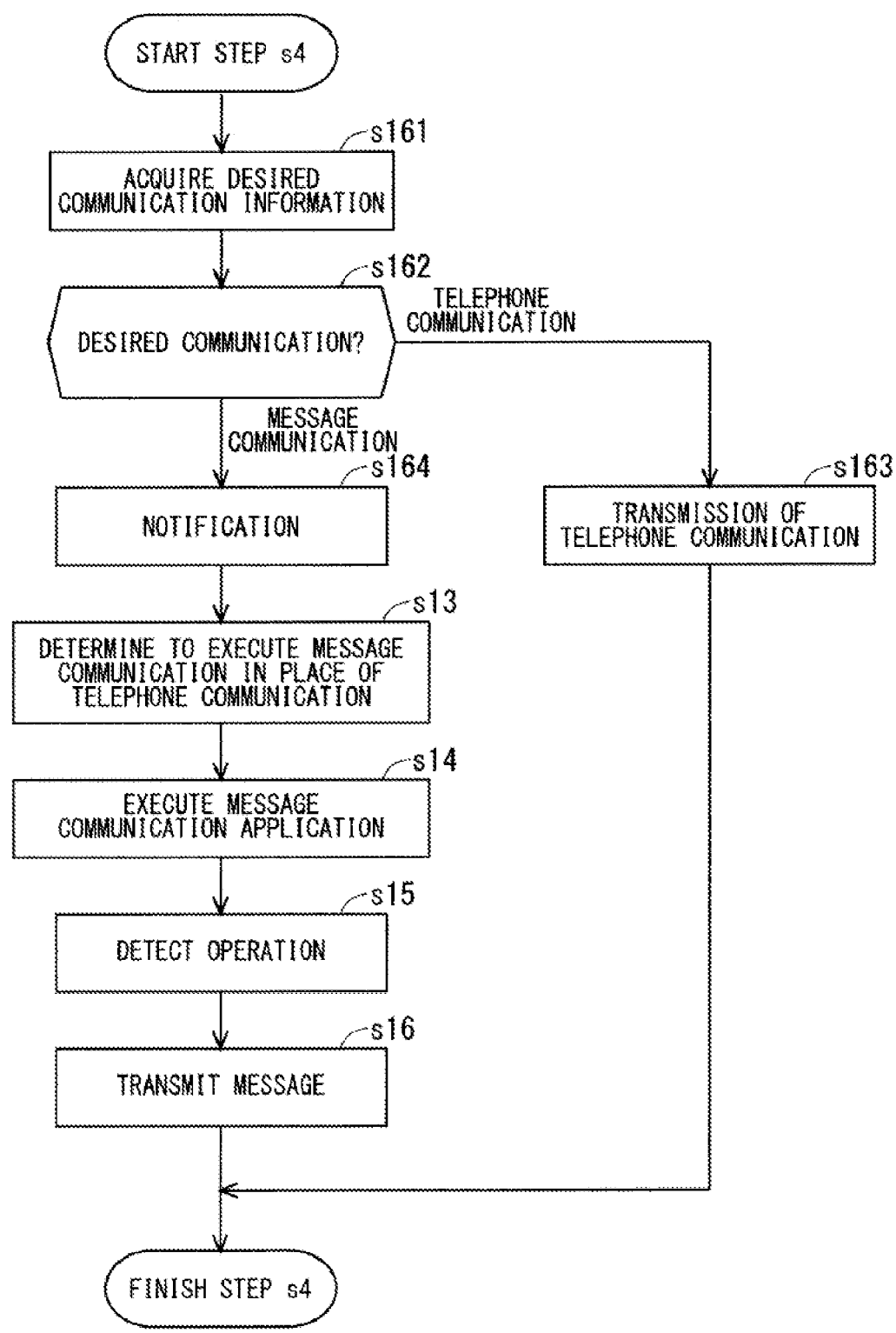
FIG. 49 illustrates a flow chart showing one example of an operation of the electronic apparatus.

FIG. 49 is a flow chart illustrating Step s4 according to the present example. FIG. 49 illustrates Step s4 in a case where the apparatus information of the target other side apparatus 10 includes desired communication information indicating a communication, that is the telephone communication or the message communication, which the target other side apparatus 10 currently desires. The user operates the display surface 12, for example, thereby being able to transmit a notification of the desired communication, that is the telephone communication or the message communication, to the target other side apparatus 10. The target other side apparatus 10 transmits the desired communication information indicating the notification of the communication transmitted by the user as the currently desired communication. The desired communication information is a type of apparatus state information of the electronic apparatus 10. The desired communication information is also considered as a type of setting information of the electronic apparatus 10 in view of the state where the user transmits the notification of the desired communication, that is the telephone communication or the message communication, to the target other side apparatus 10. As illustrated in FIG. 49, in Step s161, the controller 100 acquires the desired communication information from the apparatus information of the target other side apparatus 10. Then, in Step s162, the controller 100 specifies the communication which the target other side apparatus 10 currently desires based on the acquired desired communication information.

When it is specified that the communication which the target other side apparatus 10 currently desires is the telephone communication in Step s162, the instruction receiving apparatus 10 performs the transmission of the telephone communication to the target other side apparatus 10 in Step s163. In the meanwhile, when it is specified that the communication which the target other side apparatus 10 currently desires is the message communication in Step s162, Step s164 is executed.

Figure 50:
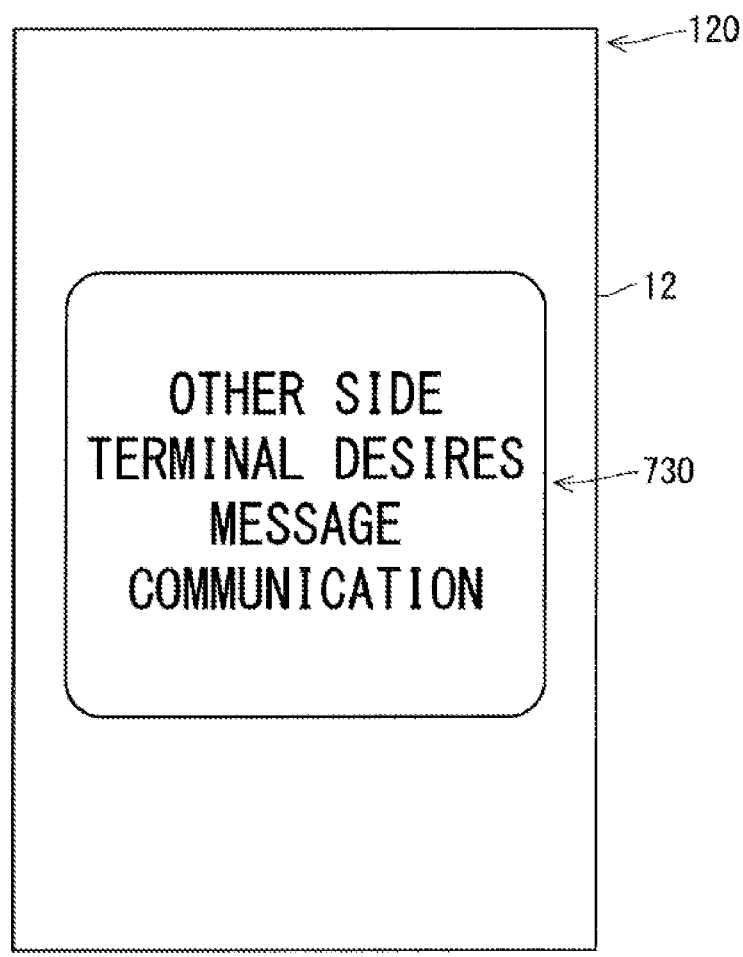
FIG. 50 illustrates a drawing showing one example of a display of the electronic apparatus.

In Step s164, the controller 100 makes the notification unit notify that the target other side apparatus 10 currently desires the message communication. In Step s164, the controller 100 makes the display 120 display notification information 730 of notifying that the target other side apparatus 10 currently desires the message communication, for example. FIG. 50 is a drawing illustrating a display example of the notification information 730. It is not necessary to execute Step s164.

When the controller 100 makes the display 120 display the notification information 730 for a certain period of time, Steps s13 to s16 described above are executed, and the message is transmitted from the instruction receiving apparatus 10. In this manner, in the present example, when the controller 100 of the instruction receiving apparatus 10 specifies that the target other side apparatus 10 desires the message communication based on the apparatus information of the target other side apparatus 10, the controller 100 determines to execute the message communication. Accordingly, the target other side apparatus 10 can perform the desired communication, selecting from the telephone communication and the message communication. Thus, the convenience of the electronic apparatus 10 is increased.

The notification unit of the instruction receiving apparatus 10 notifies that the target other side apparatus 10 desires the message communication to the subject device user, thus the convenience of the electronic apparatus 10 is increased.

Figure 51:
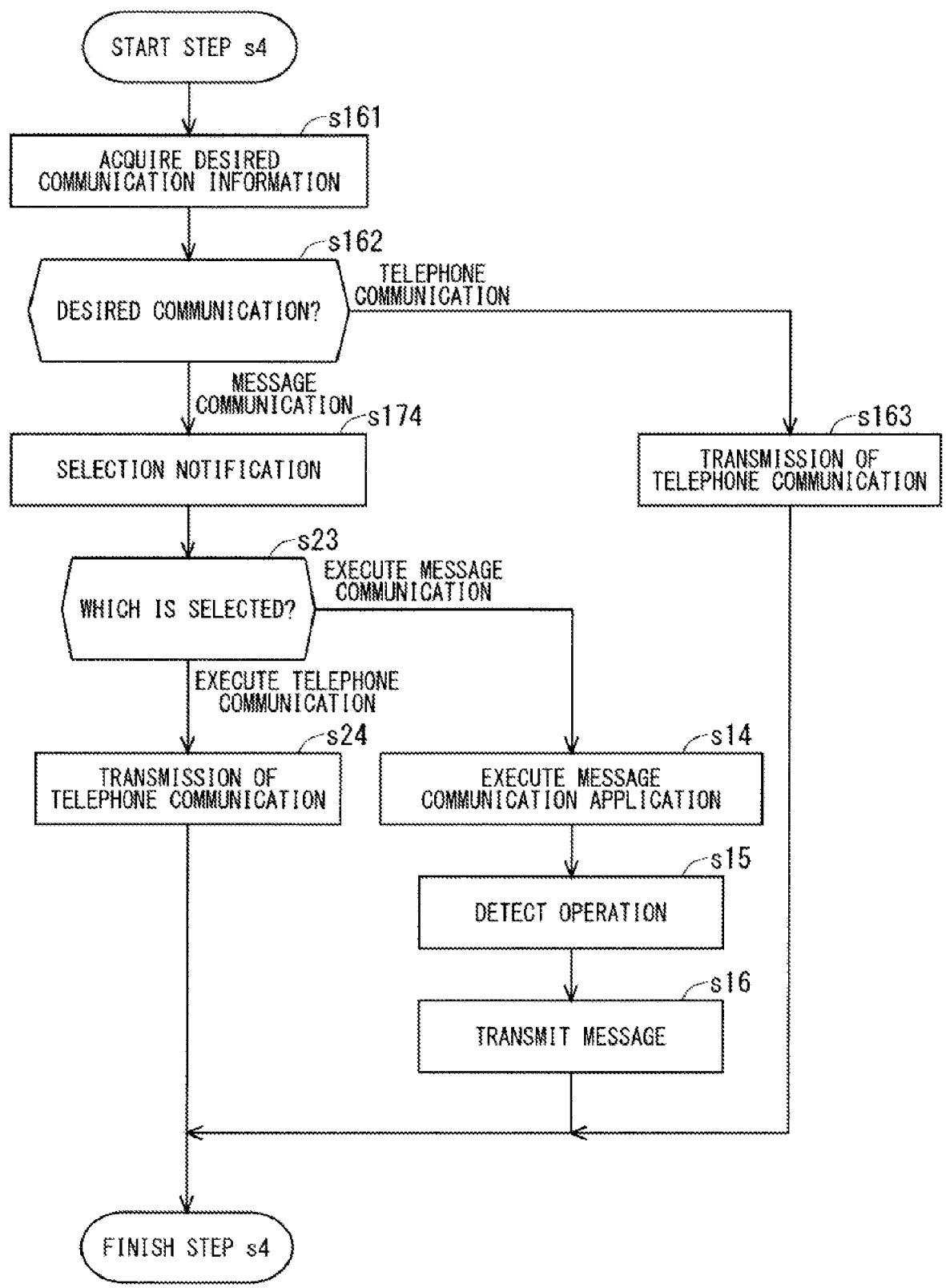
FIG. 51 illustrates a flow chart showing one example of an operation of the electronic apparatus.

FIG. 51 is a flow chart illustrating the other example of Step s4 in a case where the apparatus information of the target other side apparatus 10 includes the desired notification information. As illustrated in FIG. 51, Steps s161 and s162 described above are executed. When it is specified that the communication which the target other side apparatus 10 currently desires is the telephone communication in Step s162, Step s163 described above is executed and the transmission of the telephone communication is performed.

In the meanwhile, when it is specified that the communication which the target other side apparatus 10 currently desires is the message communication in Step s162, Step s174 is executed. In Step s174, the controller 100 makes the notification unit notify that the subject device user selects one of the execution of the telephone communication and the execution of the message communication. In Step s174, the controller 100 makes the display 120 display a selection screen 750 for the subject device user to select one of the execution of the telephone communication and the execution of the message communication, for example.

Figure 52:
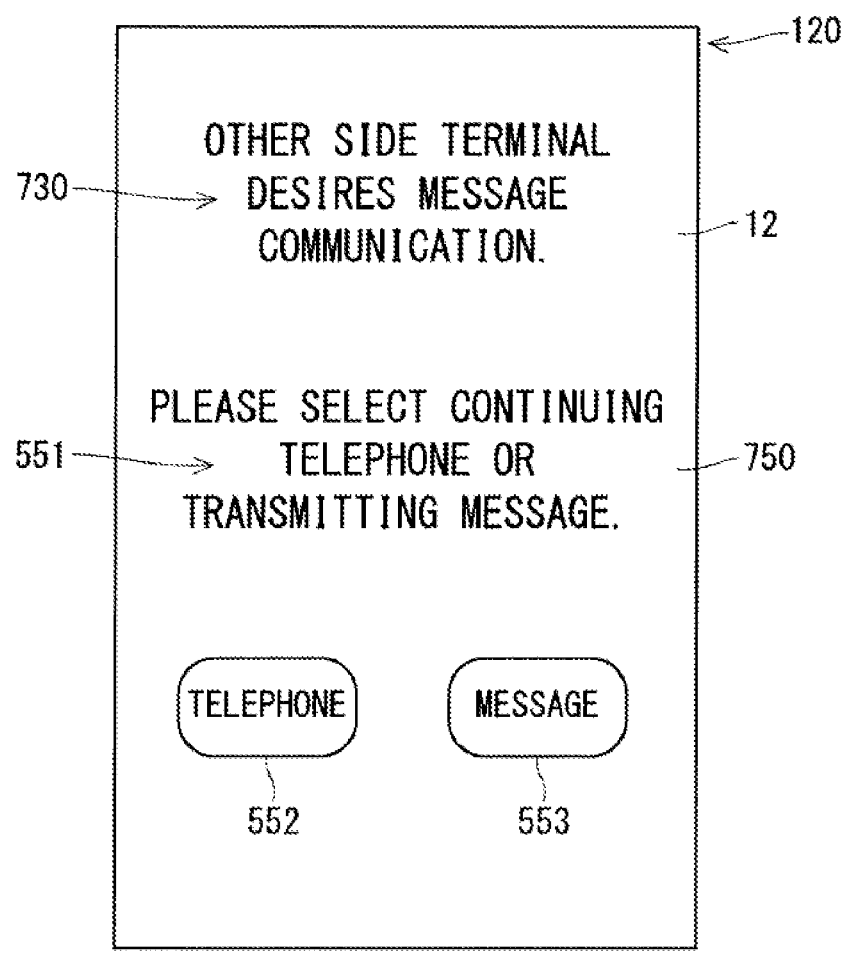
FIG. 52 illustrates a drawing showing one example of a display of the electronic apparatus.

FIG. 52 is a drawing illustrating one example of the selection screen 750. As illustrated in FIG. 52, the selection screen 750 includes, for example, the notification information 730 described above, instruction information 551, and selection buttons 552 and 553. The selection screen 750 needs not include the notification information 730.

After the selection screen 750 is displayed in Step s174, Step s23 described above is executed. When it is determined that the execution of the telephone communication is selected in Step s23, Step s24 described above is executed, and the transmission of the telephone communication is performed. In the meanwhile, when it is determined that the execution of the message communication is selected in Step s23, the instruction receiving apparatus 10 executes Steps s14 to s16 described above and transmits the message.

In this manner, in the example in FIG. 51, when the target other side apparatus 10 desires the message communication, the user of the instruction receiving apparatus 10 can select whether the instruction receiving apparatus 10 performs the telephone communication or the message communication. Thus, the convenience of the electronic apparatus 10 is increased.

Twelfth Example

As described above, identification information for the telephone communication such as a phone number is allocated to the electronic apparatus 10. This identification information is referred to as the "telephone identification information". In the telephone communication, a transmission source device and a transmission destination device are specified by the telephone identification information.

The same telephone identification information is allocated to the plurality of electronic apparatuses 10 in some cases. Considered herein is a case where the same telephone identification information is allocated to the electronic apparatuses 10A and 10B illustrated in FIG. 33 described above. As described above, the electronic apparatus 10A can communicate with the electronic apparatus 10B using a near field wireless communication system, for example. The telephone identification information allocated to the electronic apparatuses 10A and 10B is referred to as "the telephone common identification information" in some cases.

The user operates the display surface 12 of the electronic apparatus 10A, for example, thereby being able to set the electronic apparatus 10A whether or not the electronic apparatus 10A performs the arrival notification of the telephone communication in which the telephone common identification information is used. This setting is referred to as "the arrival notification execution setting in the electronic apparatus 10A" hereinafter. The user operates the display 120B of the electronic apparatus 10B, for example, thereby being able to set the electronic apparatus 10B whether or not the electronic apparatus 10B performs the arrival notification of the telephone communication in which the telephone common identification information is used. This setting is referred to as "the arrival notification execution setting in the electronic apparatus 10B" hereinafter.

In the present example, the electronic apparatus 10A is a main terminal and the electronic apparatus 10B is a sub terminal. The electronic apparatus 10A which is the main terminal transmits the apparatus information including other terminal presence information indicating that there is the electronic apparatus 10B to which the telephone identification information, which is the same as that of the electronic apparatus 10A, is allocated to the server device 50 or the other electronic apparatus 10. The other terminal presence information includes the apparatus state information indicating a state of the electronic apparatus 10B and a state of the electronic apparatus 10A, for example. The electronic apparatus 10A communicates with the electronic apparatus 10B using the near field wireless communication system, thereby being able to recognize the state of the electronic apparatus 10B. Examples of the apparatus state information are described hereinafter. The electronic apparatus 10B which is the sub terminal does not transmit the apparatus information. Accordingly, in the present example, the instruction receiving apparatus 10 can acquire the apparatus information of the electronic apparatus 10A but cannot acquire the apparatus information of the electronic apparatus 10B.

FIG. 53 is a flow chart illustrating Step s4 according to the present example. As illustrated in FIG. 53, in Step s181, the controller 100 of the instruction receiving apparatus 10 acquires the other terminal presence information from the apparatus information of the target other side apparatus 10A. Then, the controller 100 specifies that the same telephone identification information is allocated to the electronic apparatuses 10A and 10B based on the acquired other terminal presence information. In other words, the controller 100 specifies that there are the electronic apparatuses 10A and 10B to which the same telephone identification information is allocated based on the acquired other terminal presence information.

Next, in Step s182, the controller 100 determines whether or not there is the electronic apparatus 10, that is the electronic apparatus 10A or 10B, having priority on the execution of the telephone arrival notification based on the apparatus state information included in the acquired other terminal presence information.

Considered, for example, is a case where the apparatus state information indicates whether or not the electronic apparatus 10A is being operated by the user and whether or not the electronic apparatus 10B is being operated by the user. In this case, when the controller 100 specifies that only one of the electronic apparatuses 10A and 10B is being operated by the user based on the apparatus state information, the controller 100 determines that there is the electronic apparatus 10 having priority on the execution of the telephone arrival notification. When the controller 100 specifies that only the electronic apparatus 10A in the electronic apparatuses 10A and 10B is being operated by the user based on the apparatus state information, the controller 100 determines the electronic apparatus 10A to be the electronic apparatus 10 made to transmit the arrival notification. In the meanwhile, when the controller 100 specifies that only the electronic apparatus 10B in the electronic apparatuses 10A and 10B is being operated by the user based on the apparatus state information, the controller 100 determines the electronic apparatus 10B to be the electronic apparatus 10 made to transmit the arrival notification. When the controller 100 specifies that both the electronic apparatuses 10A and 10B are being operated by the user or when the controller 100 specifies that any of the electronic apparatuses 10A and 10B is not being operated by the user based on the apparatus state information, the controller 100 determines that there is no electronic apparatus 10 having priority on the execution of the telephone arrival notification.

Considered as the other example is a case where the apparatus state information indicates whether or not the electronic apparatus 10A is being in communication and whether or not the electronic apparatus 10B is being in communication. In this case, when the controller 100 specifies that only one of the electronic apparatuses 10A and 10B is not being in communication based on the apparatus state information, the controller 100 determines that there is the electronic apparatus 10 having priority on the execution of the telephone arrival notification. When the controller 100 specifies that only the electronic apparatus 10A in the electronic apparatuses 10A and 10B is not being in communication based on the apparatus state information, the controller 100 determines the electronic apparatus 10A to be the electronic apparatus 10 made to transmit the arrival notification. In the meanwhile, when the controller 100 specifies that only the electronic apparatus 10B in the electronic apparatuses 10A and 10B is not being in communication based on the apparatus state information, the controller 100 determines the electronic apparatus 10B to be the electronic apparatus 10 made to transmit the arrival notification. When the controller 100 specifies that both the electronic apparatuses 10A and 10B are being in communication or when the controller 100 specifies that any of the electronic apparatuses 10A and 10B is not being in communication based on the apparatus state information, the controller 100 determines that there is no electronic apparatus 10 having priority on the execution of the telephone arrival notification.

Considered as the other example is a case where the apparatus state information indicates a remaining battery level of the battery 240 of the electronic apparatuses 10A and 10B. In this case, when the controller 100 specifies that the remaining battery level of one of the electronic apparatuses 10A and 10B is larger than that of the other one of them based on the apparatus state information, the controller 100 determines that there is the electronic apparatus 10 having priority on the execution of the telephone arrival notification. When the controller 100 specifies that the remaining battery level of the electronic apparatus 10A is larger than that of the electronic apparatus 10B based on the apparatus state information, the controller 100 determines the electronic apparatus 10A to be the electronic apparatus 10 made to transmit the arrival notification. In the meanwhile, when the controller 100 specifies that the remaining battery level of the electronic apparatus 10B is larger than that of the electronic apparatus 10A based on the apparatus state information, the controller 100 determines the electronic apparatus 10B to be the electronic apparatus 10 made to transmit the arrival notification. When the controller 100 specifies that the remaining battery level of the electronic apparatuses 10A and 10B is the same based on the apparatus state information, the controller 100 determines that there is no electronic apparatus 10 having priority on the execution of the telephone arrival notification.

When it is determined that there is the electronic apparatus 10 having priority on the execution of the telephone arrival notification in Step s182, Step s184 is executed. In Step s184, the controller 100 generates a control signal of instructing that only the electronic apparatus 10 in the electronic apparatuses 10A and 10B determined to be made to perform the telephone arrival notification in Step s182 executes the telephone arrival notification. Then, in Step s182, the instruction receiving apparatus 10 performs the transmission of the telephone communication to the electronic apparatuses 10A and 10B, and transmits the generated control signal to the electronic apparatuses 10A and 10B. The transmission of the telephone communication to the electronic apparatuses 10A and 10B is considered as the transmission of the telephone communication using the telephone common identification information allocated to the electronic apparatuses 10A and 10B.

The electronic apparatuses 10A and 10B which have received the control signal from the instruction receiving apparatus 10 and at which the telephone communication from the instruction receiving apparatus 10 has arrived determine whether or not to perform the telephone arrival notification based on the received control signal. When the control signal indicates that the electronic apparatus 10A executes the telephone arrival notification, the electronic apparatus 10A determines to execute the telephone arrival notification and performs the telephone arrival notification regardless of contents of the arrival notification execution setting in the subject device. In the meanwhile, when the control signal indicates that the electronic apparatus 10B executes the telephone arrival notification, the electronic apparatus 10B determines to execute the telephone arrival notification and performs the telephone arrival notification regardless of contents of the arrival notification execution setting in the subject device.

In the meanwhile, when it is determined that there is no electronic apparatus 10 having priority on the execution of the telephone arrival notification in Step s182, the instruction receiving apparatus 10 performs the transmission of the telephone communication to the electronic apparatuses 10A and 10B in Step s183. At this time, the control signal transmitted in Step s184 is not transmitted.

In this manner, in the present example, when the controller 100 of the instruction receiving apparatus 10 specifies that there are the electronic apparatuses 10A and 10B having the same telephone identification information based on the apparatus information, the controller 100 determines the electronic apparatus 10 made to perform the arrival notification of the telephone communication. Accordingly, the instruction receiving apparatus 10 can make the appropriate electronic apparatus 10 perform the telephone arrival notification. Thus, the convenience of the electronic apparatus 10 is increased.

As described above, when the electronic apparatus 10, that is the electronic apparatus 10A or 10B, operated by the user performs the telephone arrival notification, the user of the electronic apparatuses 10A and 10B can receive the telephone arrival notification from the electronic apparatus 10 which the user operates. Thus, the user can easily recognize the telephone arrival notification.

As described above, when the electronic apparatus 10, that is the electronic apparatus 10A or 10B, which is not being in communication performs the telephone arrival notification, the user of the electronic apparatuses 10A and 10B can receive the telephone arrival notification from the electronic apparatus 10 which is not used in the telephone communication, for example. Thus, the convenience of the electronic apparatus 10 is increased.

As described above, when the electronic apparatus 10, that is the electronic apparatus 10A or 10B, which has a larger remaining battery level performs the telephone arrival notification, the user of the electronic apparatuses 10A and 10B can receive the telephone arrival notification from the electronic apparatus 10 having the larger remaining battery level. Thus, reduced is a possibility that a communication between the user of the electronic apparatuses 10A and 10B and the user of the instruction receiving apparatus 10 is disconnected halfway through a conversation due to the reduction in the remaining battery level of the electronic apparatus 10 which the user of the electronic apparatuses 10A and 10B uses.

In the example described above, the instruction receiving apparatus 10 determines the electronic apparatus 10 made to perform the arrival notification of the telephone communication based on the state of the electronic apparatuses 10A and 10B, but may determine the electronic apparatus 10 made to perform the arrival notification of the telephone communication based on a capacity of the electronic apparatuses 10A and 10B. In this case, the other terminal presence information includes apparatus capacity information indicating a capacity of the electronic apparatus 10B and a capacity of the electronic apparatus 10A. Then, in Step s182, the controller 100 determines whether or not there is the electronic apparatus 10, that is the electronic apparatuses 10A or 10B, having priority on the execution of the telephone arrival notification based on the apparatus capacity information included in the acquired other terminal presence information.

Considered, for example, is a case where the apparatus capacity information indicates a size of the display surface included in the electronic apparatuses 10A and 10B. In this case, when the controller 100 specifies that the display surface of one of the electronic apparatuses 10A and 10B is smaller than that of the other one of them based on the apparatus capacity information, the controller 100 determines that there is the electronic apparatus 10 having priority on the execution of the telephone arrival notification. When the controller 100 specifies that the display surface 12 of the electronic apparatus 10A is smaller than the display surface (the display surface of the display 120B) of the electronic apparatus 10B based on the apparatus capacity information, the controller 100 determines the electronic apparatus 10A to be the electronic apparatus 10 made to transmit the arrival notification. In the meanwhile, when the controller 100 specifies that the display surface of the electronic apparatus 10B is smaller than the display surface 12 of the electronic apparatus 10A based on the apparatus capacity information, the controller 100 determines the electronic apparatus 10B to be the electronic apparatus 10 made to transmit the arrival notification. In the example in FIG. 33, the display surface of the electronic apparatus 10B is smaller than the display surface 12 of the electronic apparatus 10A, thus the electronic apparatus 10B is determined to be the electronic apparatus 10 made to perform the arrival notification. When the size of the display surface of the electronic apparatuses 10A and 10B is the same, the controller 100 determines that there is no electronic apparatus 10 having priority on the execution of the telephone arrival notification.

Considered as the other example is a case where the apparatus capacity information indicates a battery capacity of the battery 240 of the electronic apparatuses 10A and 10B. In this case, when the controller 100 specifies that the battery capacity of one of the electronic apparatuses 10A and 10B is larger than that of the other one of them based on the apparatus capacity information, the controller 100 determines that there is the electronic apparatus 10 having priority on the execution of the telephone arrival notification. When the controller 100 specifies that the battery capacity of the electronic apparatus 10A is larger than that of the electronic apparatus 10B based on the apparatus capacity information, the controller 100 determines the electronic apparatus 10A to be the electronic apparatus 10 made to transmit the arrival notification. In the meanwhile, when the controller 100 specifies that the battery capacity of the electronic apparatus 10B is larger than that of the electronic apparatus 10A based on the apparatus capacity information, the controller 100 determines the electronic apparatus 10B to be the electronic apparatus 10 made to transmit the arrival notification. In the example in FIG. 33, for example, if the battery capacity of the electronic apparatus 10A is larger than that of the electronic apparatus 10B, the electronic apparatus 10A is determined to be the electronic apparatus 10 made to perform the arrival notification. When the battery capacity of the electronic apparatuses 10A and 10B is the same, the controller 100 determines that there is no electronic apparatus 10 having priority on the execution of the telephone arrival notification.

In this manner, the instruction receiving apparatus 10 determines the electronic apparatus 10 made to perform the arrival notification of the telephone communication from the electronic apparatuses 10A and 10B based on the capacity of the electronic apparatuses 10A and 10B to which the same telephone identification information is allocated, thus the instruction receiving apparatus 10 can make the appropriate electronic apparatus 10 perform the telephone arrival notification. Thus, the convenience of the electronic apparatus 10 is increased.

When the electronic apparatus 10 having the smaller display surface, in the electronic apparatuses 10A and 10B, performs the telephone arrival notification, for example, the user of the electronic apparatuses 10A and 10B can speak with the user of the instruction receiving apparatus 10 using the electronic apparatus 10 having the smaller display surface while seeing information such as a video displayed in the electronic apparatus 10 having the larger display surface.

When the electronic apparatus 10 having the larger battery capacity, in the electronic apparatuses 10A and 10B, performs the telephone arrival notification, the user of the electronic apparatuses 10A and 10B can receive the telephone arrival notification from the electronic apparatus 10 having the larger battery capacity. Thus, reduced is a possibility that a communication between the user of the electronic apparatuses 10A and 10B and the user of the instruction receiving apparatus 10 is disconnected halfway through a conversation due to the reduction in the remaining battery level of the electronic apparatus 10 which the user of the electronic apparatuses 10A and 10B uses.

Thirteenth Example

The electronic apparatus 10 cannot acquire the apparatus information of the other side apparatus 10 with which the electronic apparatus 10 intends to perform the telephone communication in some cases. For example, as illustrated in FIG. 7 described above, when the electronic apparatus 10 receives the apparatus information of the other side apparatus 10 from the server device 50, the electronic apparatus 10 cannot acquire the apparatus information of the other side apparatus 10 due to a failure of the network 2 or the like in some cases. Even when the electronic apparatus 10 receives the apparatus information of the other side apparatus 10 from the other side apparatus 10 via the network 2 without the server device 50, the electronic apparatus 10 cannot acquire the apparatus information of the other side apparatus 10 due to a failure of the network 2 or the like in some cases. Also when the user can perform a setting not to transmit the apparatus information to the electronic apparatus 10, the electronic apparatus 10 cannot acquire the apparatus information of the other side apparatus 10 in some cases.

The controller 100 of the instruction receiving apparatus 10 performs processing different from Step s4 described above in response to the transmission instruction in Step s1 when the controller 100 cannot acquire the apparatus information of the target other side apparatus 10. For example, the controller 100 of the instruction receiving apparatus 10 may determine to execute the telephone communication when the controller 100 cannot acquire the apparatus information of the target other side apparatus 10. In this case, the instruction receiving apparatus 10 does not generate the control signal as described above, but performs the transmission of the telephone communication to the target other side apparatus 10.

As the other example, the controller 100 of the instruction receiving apparatus 10 may determine to execute the message communication in place of the telephone communication when the controller 100 cannot acquire the apparatus information of the target other side apparatus 10. In this case, the processing similar to that in Steps s14 to s16 described above is executed, and the message is transmitted from the instruction receiving apparatus 10.

As the other example, the controller 100 of the instruction receiving apparatus 10 may make the notification unit notify that the subject device user selects one of the execution of the telephone communication and the execution of the message communication when the controller 100 cannot acquire the apparatus information of the target other side apparatus 10. In this case, the controller 100 makes the display 120 display a selection screen 760 for the subject device user to select one of the execution of the telephone communication and the execution of the message communication, for example.

Figure 54:
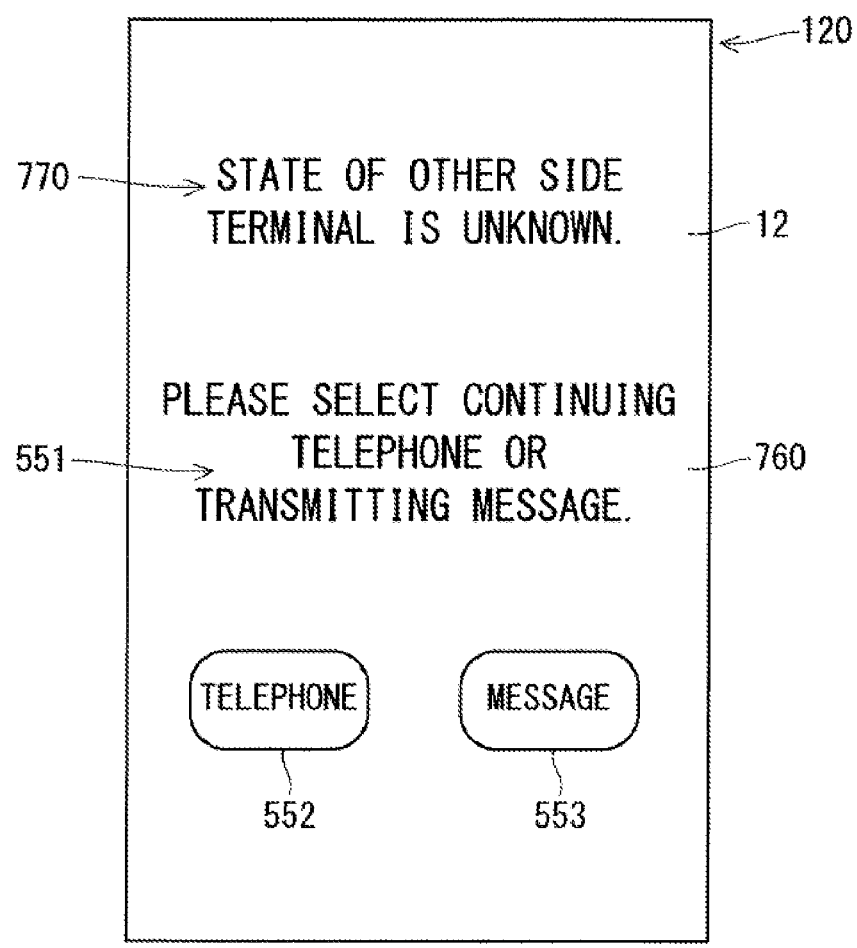
FIG. 54 illustrates a drawing showing one example of a display of the electronic apparatus.

FIG. 54 is a drawing illustrating one example of the selection screen 760. As illustrated in FIG. 54, the selection screen 760 includes notification information 770 of notifying that a state of the target other side apparatus 10 is unclear by reason that the instruction receiving apparatus 10 cannot acquire the apparatus information of the target other side apparatus 10, for example. The selection screen 760 includes the instruction information 551 and the selection buttons 552 and 553 described above. In the instruction receiving apparatus 10, executed after the selection screen 760 is displayed is processing similar to that subsequent to Step s23 illustrated in FIG. 12 described above. The selection screen 760 needs not include the notification information 770.

The instruction receiving apparatus 10 may determine to execute the telephone communication after displaying the notification information 770 for a certain period of time when the instruction receiving apparatus 10 cannot acquire the apparatus information of the target other side apparatus 10. The instruction receiving apparatus 10 may determine to execute the message communication after displaying the notification information 770 for a certain period of time when the instruction receiving apparatus 10 cannot acquire the apparatus information of the target other side apparatus 10.

While the processing system 1 has been described above in detail, the above description is in all aspects illustrative and not restrictive. The various modifications described above are applicable in combination as long as they are not mutually inconsistent. It is understood that numerous modifications which have not been exemplified can be devised without departing from the scope of the present disclosure.

The invention claimed is:

1. An electronic apparatus, comprising:
an antenna configured for wireless communication; and
at least one processor configured to
receive apparatus information regarding a target apparatus that is different than the electronic apparatus, wherein the apparatus in formation includes information indicating a state of the target apparatus, and,
in response to an operation to initiate a telephone communication with the target apparatus,
determine whether or not the telephone communication with the target apparatus is appropriate based on the apparatus information,
when determining that the telephone communication with the target apparatus is appropriate, execute the telephone communication to the target apparatus, and
when determining that the telephone communication with the target apparatus is not appropriate, display a first input to initiate the telephone communication and a second input to initiate a message communication instead of the telephone communication,
wherein, when the telephone communication is executed by a first application while the apparatus information indicates that the target apparatus is engaged in a second telephone communication with a third apparatus by a second application which has lower priority than the first application, the at least one processor controls the target apparatus so that the target apparatus performs the telephone communication with the electronic apparatus in place of the second telephone communication with the third apparatus.

2. The electronic apparatus according to claim 1, wherein the apparatus information includes information indicating a setting of the target apparatus.

3. The electronic apparatus according to claim 2, wherein the at least one processor determines that a telephone communication with the target apparatus is not appropriate when the apparatus information indicates that the target apparatus is operating in a manner mode.

4. The electronic apparatus according to claim 2, wherein the at least one processor determines that a telephone communication with the target apparatus is not appropriate when a current time is within a predetermined time from an alarm time indicated in the apparatus information.

5. The electronic apparatus according to claim 1, wherein the apparatus information includes information registered in the target apparatus.

6. The electronic apparatus according to claim 5, wherein the at least one processor, when executing the telephone communication to the target apparatus, controls an arrival notification of the telephone communication in the target apparatus based on schedule information included in the apparatus information.

7. The electronic apparatus according to claim 6, wherein the at least one processor displays, on a display of the electronic apparatus, a notification of a current plan of the target apparatus based on the schedule information.

8. The electronic apparatus according to claim 5, wherein the at least one processor, when determining that the telephone communication with the target apparatus is not appropriate, displays, on a display of the electronic apparatus, a notification that execution of the telephone communication is not appropriate based on schedule information included in the apparatus information.

9. The electronic apparatus according to claim 1, wherein, when the apparatus information indicates that the target apparatus comprises first and second devices that share an identifier for telephone communication, the at least one processor selects one of the first and second devices to perform an arrival notification of the telephone communication based on a state or a capacity of the first and second devices.

10. The electronic apparatus according to claim 9, wherein, when the apparatus information indicates that a battery capacity of one of the first and second devices is larger than a battery capacity of the other one of the first and second devices, the at least one processor selects the one of the first and second devise with the larger battery capacity to perform the arrival notification.

11. An electronic apparatus comprising:
an antenna configured for wireless communication; and
at least one processor configured to
receive apparatus information regarding a target apparatus that is different than the electronic apparatus, wherein the apparatus information includes information indicating a state of the target apparatus, and,
in response to an operation to initiate a telephone communication with the target apparatus,
determine whether or not the telephone communication with the target apparatus is appropriate based on the apparatus information,
when determining that the telephone communication with the target apparatus is appropriate, execute the telephone communication to the target apparatus, and
when determining that the telephone communication with the target apparatus is not appropriate, display a first input to initiate the telephone communication and a second input to initiate a message communication instead of the telephone communication,
wherein the at least one processor determines that the telephone communication with the target apparatus is appropriate when the apparatus information indicates that the target apparatus is being charged and the target apparatus can transfer an arrival of the telephone communication to another device, and
wherein the at least one processor controls the target apparatus to transfer the arrival of the telephone communication to the another device.

12. The electronic apparatus according to claim 11, wherein the at least one processor determines that the telephone communication with the target apparatus is not appropriate when the apparatus information indicates that the target apparatus is being charged and the target apparatus cannot transfer the telephone communication to another device.

13. An electronic apparatus comprising:
an antenna configured for wireless communication; and
at least one processor configured to
receive apparatus information regarding a target apparatus that is different than the electronic apparatus, and,
in response to an operation to initiate a telephone communication with the target apparatus,
    determine whether or not the telephone communication with the target apparatus is appropriate based on the apparatus information,
    when determining that the telephone communication with the target apparatus is appropriate, execute the telephone communication to the target apparatus, and
    when determining that the telephone communication with the target apparatus is not appropriate, display a first input to initiate the telephone communication and a second input to initiate a message communication instead of the telephone communication,
    wherein, when the apparatus information indicates that the target apparatus comprises first and second devices that share an identifier for telephone communication, the at least one processor selects one of the first and second devices to perform an arrival notification of the telephone communication based on a state or a capacity of the first and second devices, and
    wherein, when the apparatus information indicates that only one of the first and second devices is being operated, the at least one processor selects the one of the first and second devices that is being operated to perform the arrival notification.

14. An electronic apparatus comprising:
an antenna configured for wireless communication; and
at least one processor configured to
receive apparatus information regarding a target apparatus that is different than the electronic apparatus, and,
in response to an operation to initiate a telephone communication with the target apparatus,
    determine whether or not the telephone communication with the target apparatus is appropriate based on the apparatus information,
    when determining that the telephone communication with the target apparatus is appropriate, execute the telephone communication to the target apparatus, and
    when determining that the telephone communication with the target apparatus is not appropriate, display a first input to initiate the telephone communication and a second input to initiate a message communication instead of the telephone communication,
    wherein, when the apparatus information indicates that the target apparatus comprises first and second devices that share an identifier for telephone communication, the at least one processor selects one of the first and second devices to perform an arrival notification of the telephone communication based on a state or a capacity of the first and second devices, and
    wherein, when the apparatus information indicates that only one of the first and second devices is not currently in communication, the at least one processor selects the one of the first and second devices that is not currently in communication to perform the arrival notification.

15. An electronic apparatus comprising:
an antenna configured for wireless communication; and
at least one processor configured to
receive apparatus information regarding a target apparatus that is different than the electronic apparatus, and,
in response to an operation to initiate a telephone communication with the target apparatus,
    determine whether or not the telephone communication with the target apparatus is appropriate based on the apparatus information,
    when determining that the telephone communication with the target apparatus is appropriate, execute the telephone communication to the target apparatus, and
    when determining that the telephone communication with the target apparatus is not appropriate, display a first input to initiate the telephone communication and a second input to initiate a message communication instead of the telephone communication,
    wherein, when the apparatus information indicates that the target apparatus comprises first and second devices that share an identifier for telephone communication, the at least one processor selects one of the first and second devices to perform an arrival notification of the telephone communication based on a state or a capacity of the first and second devices, and
    wherein, when the apparatus information indicates that a display surface of one of the first and second devices is smaller than a display surface of the other one of the first and second devices, the at least one processor selects the one of the first and second devices with the smaller display surface to perform the arrival notification.

* * * * *